(12) United States Patent
Kanev et al.

(10) Patent No.: US 7,991,191 B2
(45) Date of Patent: Aug. 2, 2011

(54) CLUSTERING-SCHEME-ENCODED INTERFACES PROVIDING ORIENTATION FEEDBACK

(75) Inventors: Kamen Kanev, Hamamatsu (JP); Shigeo Kimura, Kanazawa (JP)

(73) Assignees: Sires Ltd., Sendai-shi (JP); James W. Judge, Nishinomiya-shi (JP)

( * ) Notice: Subject to any disclaimer, the term of this patent is extended or adjusted under 35 U.S.C. 154(b) by 0 days.

(21) Appl. No.: 12/772,507

(22) Filed: May 3, 2010

(65) Prior Publication Data

US 2010/0215281 A1    Aug. 26, 2010

Related U.S. Application Data

(63) Continuation of application No. 10/559,607, filed on Dec. 5, 2005, now Pat. No. 7,711,139.

(60) Provisional application No. PCT/JP2004/016909, filed on Nov. 8, 2004.

(30) Foreign Application Priority Data

Nov. 14, 2003    (JP) .................................. 2003-385983

(51) Int. Cl.
*G06K 9/00*    (2006.01)
*G06K 19/06*    (2006.01)

(52) U.S. Cl. .......... 382/100; 382/235; 235/494
(58) Field of Classification Search .......... 382/100, 382/112, 135–140, 168, 181, 194, 232, 255, 382/274, 276, 282, 287–295, 305, 306, 315.321; 326/101; 235/454, 494
See application file for complete search history.

(56) References Cited

U.S. PATENT DOCUMENTS

| | | | |
|---|---|---|---|
| 5,138,197 A * | 8/1992 | Kuwana | 326/101 |
| 5,245,165 A * | 9/1993 | Zhang | 235/454 |
| 6,273,340 B1 * | 8/2001 | Rivailler | 235/494 |
| 6,418,244 B2 * | 7/2002 | Zhou et al. | 382/306 |
| 7,035,427 B2 * | 4/2006 | Rhoads | 382/100 |

* cited by examiner

*Primary Examiner* — Seyed Azarian
(74) *Attorney, Agent, or Firm* — James W. Judge

(57) ABSTRACT

Clustering-definition-based encoding schemes printed as a computer-oriented digital layer onto a physical surface whereby the surface functions as an interface enabling, via a simple image-acquisition device scanning a minimal field required to establish the clustering definition, the provision, to a suitable data processing and human-oriented display means, of feedback on the orientation of the image-acquisition device relative to the digital layer overall.

4 Claims, 25 Drawing Sheets

| X0 Y0 | X1 Y3 | X2 Y6 | X3 Y9 | X4 Y12 | X5 Y15 | X6 Y18 | X7 Y21 |
|---|---|---|---|---|---|---|---|
| X4 Y1 | X5 Y4 | X6 Y7 | X7 Y10 | X8 Y13 | X9 Y16 | X10 Y19 | X11 Y22 |
| X8 Y2 | X9 Y5 | X10 Y8 | X11 Y11 | X12 Y14 | X13 Y17 | X14 Y20 | X15 Y23 |
| X12 Y3 | X13 Y6 | X14 Y9 | X15 Y12 | X16 Y15 | X17 Y18 | X18 Y21 | X19 Y24 |
| X16 Y4 | X17 Y7 | X18 Y10 | X19 Y13 | X20 Y16 | X21 Y19 | X22 Y22 | X23 Y25 |
| X20 Y5 | X21 Y8 | X22 Y11 | X23 Y14 | X24 Y17 | X25 Y20 | X26 Y23 | X27 Y26 |

| X0 Y0 | X1 Y3 | X2 Y6 | X3 Y9 | X4 Y12 | X5 Y15 | X6 Y18 | X7 Y21 |
|---|---|---|---|---|---|---|---|
| X4 Y1 | X5 Y4 | X6 Y7 | X7 Y10 | X8 Y13 | X9 Y16 | X10 Y19 | X11 Y22 |
| X8 Y2 | X9 Y5 | X10 Y8 | X11 Y11 | X12 Y14 | X13 Y17 | X14 Y20 | X15 Y23 |
| X12 Y3 | X13 Y6 | X14 Y9 | X15 Y12 | X16 Y15 | X17 Y18 | X18 Y21 | X19 Y24 |
| X16 Y4 | X17 Y7 | X18 Y10 | X19 Y13 | X20 Y16 | X21 Y19 | X22 Y22 | X23 Y25 |
| X20 Y5 | X21 Y8 | X22 Y11 | X23 Y14 | X24 Y17 | X25 Y20 | X26 Y23 | X27 Y26 |

(a)

| X0 Y0 | X1 Y3 | X2 Y6 | X3 Y9 | X4 Y12 | X5 Y15 | X6 Y18 | X7 Y21 |
|---|---|---|---|---|---|---|---|
| X4 Y1 | X5 Y4 | X6 Y7 | X7 Y10 | X8 Y13 | X9 Y16 | X10 Y19 | X11 Y22 |
| X8 Y2 | X9 Y5 | X10 Y8 | X11 Y11 | X12 Y14 | X13 Y17 | X14 Y20 | X15 Y23 |
| X12 Y3 | X13 Y6 | X14 Y9 | X15 Y12 | X16 Y15 | X17 Y18 | X18 Y21 | X19 Y24 |
| X16 Y4 | X17 Y7 | X18 Y10 | X19 Y13 | X20 Y16 | X21 Y19 | X22 Y22 | X23 Y25 |
| X20 Y5 | X21 Y8 | X22 Y11 | X23 Y14 | X24 Y17 | X25 Y20 | X26 Y23 | X27 Y26 |

|  |  |  |  |  |
|---|---|---|---|---|
| 0,0 | 1,0 | 2,0 | 3,0 | 4,0 |
| 0,1 | 1,1 | 2,1 | 3,1 | 4,1 |
| 0,2 | 1,2 | 2,2 | 3,2 | 4,2 |
| 0,3 | 1,3 | 2,3 | 3,3 | 4,3 |
| 0,4 | 1,4 | 2,4 | 3,4 | 4,4 |

(a)

|  |  |  |  |  |
|---|---|---|---|---|
| 0 | 1 | 2 | 3 | 4 |
| 2 | 3 | 4 | 5 | 6 |
| 4 | 5 | 6 | 7 | 8 |
| 6 | 7 | 8 | 9 | 10 |
| 8 | 9 | 10 | 11 | 12 |

(b)

|  |  |  |  |  |
|---|---|---|---|---|
| 0 | 0 | 0 | 1 | 1 |
| 0 | 1 | 1 | 1 | 1 |
| 1 | 1 | 1 | 0 | 1 |
| 1 | 0 | 1 | 0 | 1 |
| 1 | 0 | 1 | 1 | 0 |

(c)

|  |  |  |  |  |
|---|---|---|---|---|
| 0 | 2 | 4 | 6 | 8 |
| 1 | 3 | 5 | 7 | 9 |
| 2 | 4 | 6 | 8 | 10 |
| 3 | 5 | 7 | 9 | 11 |
| 4 | 6 | 8 | 10 | 12 |

| | | 111 | | |
|---|---|---|---|---|
| 0 | 0 | 1 | 1 | 1 |
| 0 | 1 | 1 | 0 | 0 |
| 0 | 1 | 1 | 1 | 1 |
| 1 | 1 | 0 | 0 | 1 |
| 1 | 1 | 1 | 1 | 0 |

(e)

| 0,0 | 1,2 | 2,4 | 3,6 | 4,8 |
|---|---|---|---|---|
| 2,1 | 3,3 | 4,5 | 5,7 | 6,9 |
| 4,2 | 5,4 | 6,6 | 7,8 | 8,10 |
| 6,3 | 7,5 | 8,7 | 9,9 | 10,11 |
| 8,4 | 9,6 | 10,8 | 11,10 | 12,12 |

(f)

| 0,0 | 0,0 | 0,1 | 1,1 | 1,1 |
|---|---|---|---|---|
| 0,0 | 1,1 | 1,1 | 1,0 | 1,0 |
| 1,0 | 1,1 | 1,1 | 0,1 | 1,1 |
| 1,1 | 0,1 | 1,0 | 0,0 | 1,1 |
| 1,1 | 0,1 | 1,1 | 1,1 | 0,0 |

CLUSTERING-SCHEME-ENCODED INTERFACES PROVIDING ORIENTATION FEEDBACK

BACKGROUND OF THE INVENTION

1. Technical Field

The present invention relates to print-based surface-encoding schemes; more particularly the invention relates to novel clustering-definition-based encoding schemes printed onto a physical surface whereby the surface can function as an interface providing orientation feedback.

2. Description of the Related Art

The technology for making the information coded as bit data and an electronic document correlate and unify within a printed document is known well.

The concept of 1-dimensional or 2-dimensional barcodes and the usage for acquiring the positional information on a document based on the information added to the printed document is disclosed (refer to Patent References 1-8, for example).

An invention which unifies barcodes of different dimensions is also disclosed (for example, Patent Reference 9). As a specific example, a digital information carrier wherein 1-dimensional and 2-dimensional layers are unified is shown there.

A barcode of 1-dimensional and 2-dimensional layers having a multilayer structure is also disclosed (for example, Patent References 10 and 11).

It is also disclosed how to integrate a barcode in an image or a secret document (for example, Patent References 12-19).

A data coding method performed using an illustration symbol is also disclosed (for example, Patent References 20 and 21).

A method for coding by using at least two sorts of symbols and arranging these symbols in a matrix shape on various media wherein a document display is possible (for example, Patent Reference 22) is also disclosed. As a specific example it is shown how to use a monochrome lattice-like pattern.

The method of combining a plurality of 2-dimensional dot codes using different colors is also disclosed (for example, Patent References 23-26).

Dot Code

A technology based on a self-synchronous type of symbols called "glyphs" is also disclosed (for example, Non-Patent Literature 1). It is indicated that glyph positions provide for the glyph clocking mechanism, and that glyph orientations provide for information to be digitally encoded.

In addition, a method for showing positional information using glyphs over the whole predetermined region of a document is also disclosed (for example, Patent Reference 27). It is indicated that each glyph is shown by a line segment inclined to the left or to the right that provides for 1 bit of information. Furthermore, other glyphs which can code 2 bits of data are disclosed (for example, Patent Reference 28). It is indicated that such glyphs are expressed in a triangular shape and have four different directions, this providing for 2 bits of information per glyph.

In any of the prior art, however, the problem of recognition errors is not completely overcome. Reasons for recognition errors can be classified into several cases which will be explain here.

Patent Reference 1: U.S. Pat. App. Pub. No. 2002/0027165
Patent Reference 2: U.S. Pat. No. 6,418,244
Patent Reference 3: U.S. Pat. No. 6,176,427
Patent Reference 4: U.S. Pat. No. 5,617,358
Patent Reference 5: U.S. Pat. No. 6,070,805
Patent Reference 6: U.S. Pat. No. 5,742,041
Patent Reference 7: U.S. Pat. No. 6,043,899
Patent Reference 8: Japanese Unexamined Pat. App. Pub. No. H07-306904
Patent Reference 9: U.S. Pat. No. 6,398,117
Patent Reference 10: Japanese Nat'l. Stage Pub. of Int'l. App. WO96/18972
Patent Reference 11: U.S. Pat. No. 5,525,798
Patent Reference 12: U.S. Pat. No. 5,525,798
Patent Reference 13: U.S. Pat. No. 6,256,398
Patent Reference 14: U.S. Pat. No. 5,522,623
Patent Reference 15: U.S. Pat. App. Pub. No. 2002/0060396
Patent Reference 16: European Pat. No. 1 154 373
Patent Reference 17: Japanese Unexamined Pat. App. Pub. No. 2001-320573
Patent Reference 18: Japanese Unexamined Pat. App. Pub. No. 2002-36763
Patent Reference 19: Japanese Unexamined Pat. App. Pub. No. 2002-63142
Patent Reference 20: French Pat. No. 2,809,210
Patent Reference 21: U.S. Pat. No. 6,460,766
Patent Reference 22: U.S. Pat. No. 6,273,340
Patent Reference 23: European Pat. No. 1 178 428
Patent Reference 24: Japanese Unexamined Pat. App. Pub. No. 2000-293644
Patent Reference 25: Japanese Unexamined Pat. App. Pub. No. 2000-293645
Patent Reference 26: Japanese Unexamined Pat. App. Pub. No. 2000-293646
Patent Reference 27: U.S. Pat. No. 6,327,395
Patent Reference 28: U.S. Pat. No. 5,245,165
Non-Pat. Document 1: Hecht D., "Printed Embedded Data Graphical U.S.er Interfaces," *Computer*, March 2001, pp. 47-55

Ghost Dots

It means appearance of noise and stains, such as blots that occur at the time of printing. When a digital information carrier is constituted by dots, this has significant impact and it is commonly addressed by defining a lattice for arranging and removing image objects.

Recognition Errors Due to Display Distortion

This occurs when an image object is displayed or recognized while deviating from the ideal form at the time of displaying or reading a digital information carrier. Specifically, at the time of displaying the cause is variation in the sending and printing speed, and at the time of reading the cause is variation in the scanning speed of a scanner, tilt of a camera, etc. This influence becomes significant, especially with multiple image objects, such as two dimensional codes. In addition to display distortion, when coding bit data in the color of an image object, the gap from the ideal color, that is, the color difference, similarly leads to recognition errors.

Recognition Errors Due to Incorrect Recognition of the Coordinate System

Incorrect information will be generated, for example, if a digital information carrier is read while the document is upside down and it is decoded without taking that into account. This becomes especially problematic when highly symmetrical image objects are used.

Other Recognition Errors

When there is an image object that is partially difficult to recognize in the recognition range, the whole image object in the recognition range may become impossible to decode, or may be incorrectly recognized. This becomes especially problematic when acquiring one piece of information from a group consisting of a plurality of image objects in a predetermined range.

When attempting to increase the amount of retained information of a digital information carrier, the display density of the image becomes high, and the possibility of the above-mentioned incorrect recognition increases. In addition, it is also problematic when measures performed in order to avoid incorrect recognition reduce the display flexibility of a digital information carrier, or complicate the processing for acquiring information and reduce the processing speed.

Therefore, a digital information carrier which can easily display large volume of information, has low possibility of incorrect recognition, and is easy to process at high speed is called for.

BRIEF SUMMARY OF THE INVENTION

The objective of this invention is to provide a digital information carrier which solves these problems and to provide a method and a system for handling it.

The present invention blends cluster information carrier comprising of image objects joined together to other viewable contents (a character, an image, background, etc.) of a document, accesses the digital information carrier by an image recognition means, such as partial scanning, unifies a printed document and an electronic document seamlessly, and provides a method for finding positional information on the document and for performing processing commutative with the written contents of the document.

The digital information carrier, concerning the 1st aspect of this invention, offered in order to solve the above-mentioned problems comprises of a plurality of image objects as constituent elements, contains a cluster information carrier constituted by at least two image objects where the cluster information carrier is characterized by having bit data correlated to the relative relationship of at least two image objects used as constituent elements.

Here, a digital information carrier is an aggregate of image objects obtained by coding bit data where an image object consists of aggregates of image pixels.

In addition, relative relationship means the relationship of the forms of a plurality of image objects, such as difference of forms or colors, the longest principal diameter ratio, etc., and the relationship of the positioning of a plurality of image objects, such as distance between the centers of gravity, a relative angle, etc.

Since it is possible to specify many relationships as a relative relationship as mentioned above, it is possible to have more bits of data correlated to one cluster information carrier than to have bits of data correlated to each constituent image object. That is, it is possible to display a lot of information by one cluster information carrier. For this reason, the amount of configuration image objects in a digital information carrier decreases, and lowering the display density of an image is realized. Therefore, the influence of a ghost dots etc. decreases since it becomes hard be recognized incorrectly, and a digital information carrier that is displayed and processed with a fast recognition speed is realized.

In addition, since large volume of information can be displayed with one cluster information carrier a lot of information can be displayed in small image display domains. Therefore high resolution and precision can be achieved when the digital information carrier displays positional information.

Further, general image processing can be done by form extraction methods based on existing technologies concerning image recognition of a cluster structures. This ensures higher image-processing speed and minimizes the possibility for incorrect recognition. Therefore, a high-density display can be attained and the digital information carrier that supports larger volumes can be realized.

The digital information carrier concerning the 2nd aspect of this invention, offered in order to solve the above-mentioned problems is the digital information carrier concerning the 1st aspect of this invention, including relative relationship to which bit data does not correlate and can be arbitrary constituted among the relative relationships of the image objects constituting the cluster information carrier.

The digital information carrier concerned creates a cluster information carrier which displays the same bit data while having different forms by making arbitrary the relative relationships to which bit data does not correlate. For this reason, high flexibility can be obtained in a display form. Therefore, display distortion can be avoided and embodiments based on selection of forms which are easy to display, or forms which are easy to distinguish from a ghost dot and are easy to be recognized can be realized. Furthermore, when a digital information carrier is integrated in an existing document display, an embodiment based on a form that does not stand out can be selected.

Digital information carrier concerning the 3rd aspect of this invention offered in order to solve the above-mentioned problems is the digital information carrier concerning the 1st or 2nd aspect of this invention, and at least one of the image objects serving as a constituent element of one cluster information carrier that serves as a constituent element of other cluster information carriers.

In the digital information carrier concerned, different cluster information carriers share some of the image objects. For this reason, cluster information carrier is displayed with high density. Therefore, digital information carrier supporting larger volumes is realized.

Digital information carrier concerning the 4th aspect of this invention offered in order to solve the above-mentioned problems comprises a plurality of image objects as constituent elements and contains a cluster information carrier constituted by at least two image objects, and the cluster information carrier is characterized by having the judgment conditions of whether these at least two image objects constitute a cluster information carrier correlated to the relative relationship of the at least two image objects used as constituent elements, and by having bit data correlate using the cluster information as the unit.

Here, the whole processing for carrying out judgment is called a cluster function.

In the digital information carrier concerned, before decoding generates bit data, it is specified about each image object which constitutes digital information carrier whether it is the object of decoding. For this reason, it is easy to identify a ghost dot and incorrect recognition is not likely to occur. In addition, different judgment conditions can be set in the judgment of the same cluster information carrier. For this reason, it is realized to set a different cluster function for every display mode. Specifically, it is realized to set a cluster function suitable for a print or a cluster function suitable for electronic display. Occurrence of incorrect recognition is further suppressed by setting the optimal cluster function for every display mode like this.

Digital information carrier concerning the 5th aspect of this invention offered in order to solve the above-mentioned problems is the digital information carrier concerning the 4th aspect of this invention, and the cluster information carrier to be judged has bit data correlated to the relative relationship of a plurality of image objects which are constituent elements.

It is realized to have many bit data correlated to one cluster information carrier in the digital information carrier concerned. For this reason, the amount of constituent image objects of a digital information carrier decreases, and it is realized to lower the display density of an image. Therefore, the influence of a ghost dot etc. decreases and a digital information carrier which is not likely to be recognized incorrectly, is easy to display and with a fast recognition speed is realized.

Furthermore, since it is confirmed in the stage of judging it being a cluster information carrier that the relative relationship is a predetermined relationship, a digital information carrier with which incorrect recognition is especially not likely to occur is realized.

Digital information carrier concerning the 6th aspect of this invention offered in order to solve the above-mentioned problems is the digital information carrier concerning one of the 1st-5th inventions of this application, and predetermined information is given to the relative arrangement of the cluster information carriers.

A possibility that a ghost dot has a specific relative arrangement with other image objects is low as mentioned above. For this reason, when information is contained in the relative arrangement of the cluster information carriers like the digital information carrier concerned, it is identified easily that it is a ghost dot in the process of generating that information. Therefore, a digital information carrier with which incorrect recognition does not easily take place is offered.

In addition, since the information will be double-checked when the bit data held by the cluster information carriers are also given to the relative arrangement, a digital information carrier with which incorrect recognition especially does not easily take place is offered.

Furthermore, since the amount of information per unit display area will increase when different information from the bit data held by cluster information carriers is given, a high-density display is attained and a digital information carrier supporting that of larger volume is offered.

In addition, since it also becomes possible to unify the bit data held by a plurality of cluster information carriers and create one information when coding one information by combining cluster information carriers and the relative arrangement, a digital information carrier supporting that of larger volume is offered. Moreover, since one information is created by combining a plurality of decoding processes, it becomes a digital information carrier wherein informational secrecy is improved.

Digital information carrier concerning the 7th aspect of this invention offered in order to solve the above-mentioned problems is the digital information carrier concerning the 6th aspect of this invention, and the information given to the relative arrangement is the information concerning the unifying rule for unifying the bit data correlating to a plurality of cluster information carriers and generating one information.

In the cluster information carrier concerned, since the cluster information carrier has the bit data used as the basis of one information and the relative arrangement has the information about the unifying rule, there is a very large amount of information which the digital information carrier can display. Therefore, a digital information carrier supporting that of larger volume is realized. In addition, the thing which is a group of the minimum units in decoding of the cluster information carrier, etc. and can build one information under a predetermined unifying rule is called a logical block.

Digital information carrier concerning the 8th aspect of this invention offered in order to solve the above-mentioned problems is the digital information carrier concerning the 6th or 7th aspect of this invention, and the information concerning either the coordinate axis or the direction of the cluster information carrier arrangement is given to the relative arrangement of the cluster information carriers.

With the cluster information carrier concerned, attribution of the coordinate axis or the direction is realized only by recognizing the relative arrangement. For this reason, it is not necessary to make the additional information about the coordinate axis or the direction correlated to the cluster information carriers, and the amount of information which the cluster information carriers can code increases relatively. Therefore, a digital information carrier supporting that of larger volume is realized.

In addition, even if symmetry of the cluster information carrier itself is high, recognition of the coordinate axis or the direction is easily attained. Generally, the cluster information carrier having higher symmetry has higher display ease, and is not likely to be recognized incorrectly as cluster information carrier. For this reason, if the one having high symmetry of the cluster information carrier itself and the information on the coordinate axis or the direction is given to the relative arrangement, a digital information carrier which is not likely to be recognized incorrectly will be realized.

Digital information carrier concerning the 9th aspect of this invention offered in order to solve the above-mentioned problems is the digital information carrier concerning the 8th aspect of this invention, and the arrangement interval of the above-mentioned cluster information carriers arranged 2-dimensionally is set for every coordinate axis.

If the coordinate axis is incorrectly recognized, it will become very difficult to acquire the right information. For this reason, recognition of the coordinate axis is especially important in order to avoid incorrect recognition. In the cluster information carrier concerned, since the coordinate axis is attributed easily only by recognizing the arrangement interval, a digital information carrier which is especially not likely to be recognized incorrectly is realized.

Digital information carrier concerning the 10th aspect of this invention offered in order to solve the above-mentioned problems is the digital information carrier concerning the 8th or 9th aspect of this invention, and among d number of cluster information carriers (wherein $d \geqq 4$) which are arranged consecutively, e number of cluster information carriers which fulfill the conditions of $e<d/2$ are arranged out of alignment in the direction which intersects perpendicularly to the arrangement direction formed of the remaining d-e number of cluster information carriers, and the information concerning the coordinate axis is given to the arrangement direction and the information concerning the direction is given to the gap of misalignment.

When the digital information carrier concerned has a 1-dimensional arrangement, it is realized to judge whether it is the arrangement of the forward direction or the arrangement of the backward direction by setting always constant the gap direction to the arrangement direction formed of the remaining d-e number of cluster information carriers.

In addition, when the digital information carrier concerned has a 2-dimensional arrangement, by making the arrangement direction formed of the remaining d-e number of cluster information carriers to agree with one coordinate axis and by enabling judgment of which the positive direction of this coordinate axis is by the gap direction, it is realized to also recognize about the other coordinate axis unambiguously.

Thus, by setting the gap direction appropriately, before decoding each cluster information carrier, the coordinate axis and the direction are attributed easily from the arrangement interval. For this reason, a digital information carrier which is not likely to be recognized incorrectly is realized.

Digital information carrier concerning the 11th aspect of this invention offered in order to solve the above-mentioned problems is characterized in that configuration of a logical block formed by unifying a plurality of unit information carriers which are the minimum unit at the time of decoding bit data from a digital information carrier is enabled, that one information is given to the arrangement formed by unifying some constituent elements in the logical block, and that configuration of a new logical block is enabled by replacing at least one constituent element of the logical block with a unit information carrier adjacent to the logical block.

Here, a unit information carrier is a cluster information carrier or an image object. In addition, a logical block is a group of unit information carriers, it is possible to build one information under a predetermined unifying rule, and, generally it refers to the thing wherein unit information carriers are arranged in the shape of a matrix. In addition, a group of the bit data formed by decoding each unit information carrier constituting a logical block may also be called a logical block.

Since the replacement of unit information carrier which constitutes the logical block concerning this invention is permitted, the form of a logical block may change at any time. Since it differs from a conventional logical block at this point, it is also called a virtual block. Therefore, in the subsequent explanation, a logical block may be used in a meaning including a conventional logical block and a conventional virtual block.

Since the form of a virtual block can change as mentioned above, when the recognition range which is the scope of recognition of digital information carrier moves according to the movement of an input device, it is also realized to form a new virtual block suitably by repeating replacement and to follow the movement of the recognition range. Therefore, the situation where recognition becomes impossible temporarily with the movement of the recognition range is not likely to occur, and a digital information carrier which is not likely to be recognized incorrectly is realized.

In addition, even if a part of the image object in the recognition range becomes impossible to recognize, it is also realized to avoid this and to form a virtual block. For this reason, predetermined information is realized even when it is not necessarily good in the stage of recognizing an image. Therefore, a digital information carrier which can constitute the virtual block concerned is impervious to disturbance, and is not likely to be recognized incorrectly.

Digital information carrier concerning the 12th aspect of this invention offered in order to solve the above-mentioned problems is the digital information carrier concerning the 11th aspect of this invention, and a logical block (virtual block) is constituted from more unit information carriers than the number of elements of the arrangement to which one information is given.

In the digital information carrier concerned, it is realized to use unit information carrier which is not involved in the configuration of one information as redundant carrier. For this reason, even if it becomes impossible recognizing a part of unit information carrier in a virtual block, it may be able to complement with redundant carrier. In addition, the number of the redundant carriers in a virtual block may be set according to a display mode. Specifically, since the possibility of incorrect recognition is high with a digital information carrier created with a common printer of low dpi etc., the number of redundant carriers is set to many, and since the possibility of incorrect recognition is low with a digital information carrier created with a high-quality printing machine etc., the number of redundant carriers is set to a few. In addition, although it is easy to avoid incorrect recognition when the number of redundant carriers increases, since the number of constituent elements of a virtual block increases, the processing load for acquiring one information increases.

Digital information carrier concerning the 13th aspect of this invention offered in order to solve the above-mentioned problems is the digital information carrier concerning the 11th or 12th aspect of this invention, and unit information is the information which can identify the arrangement coordinates of any constituent element of the logical blocks (virtual block).

In the digital information carrier concerned, it is realized to acquire the positional information by recognizing a virtual block, and further, even if the recognition range moves minutely, it is realized to continuously offer suitable positional information.

Digital information carrier concerning the 14th aspect of this invention offered in order to solve the above-mentioned problems contain a bit matrix V formed by arranging, in matrix form, array elements $b_m$ (m=0 to n−1) of a reference-bit array B having a predetermined array length n, wherein bit data is correlated to the bit matrix V; so that two matrix elements v(i, j) and v(i+1,j) neighboring one (i-axis) of the two array axes of the bit matrix V satisfy $v(i,j)=b_m$ $v(i+1,j)=b_{m+1}$; and so that two matrix elements v(i,j) and v(i,j+1) neighboring the other array axis (j-axis) of the bit matrix V satisfy, letting the amount by which the array elements $b_m$ are offset toward the j-axis be a, $v(i,j)=b_m$ $v(i,j+1)=b_{m+a}$, wherein the amount of offset a toward the j-axis is an integer equal to or greater than 2.

Regardless of which arrangement element is used as the starting point of the bit matrix V concerned which is obtained by decoding digital information carrier, the bit arrangement obtained by unifying the constituent elements of the logical block wherein the number of arrangement of the main scanning direction is a configures a partial arrangement of the reference bit arrangement. For this reason, it is realized to form a logical block using an arbitrary place as the starting point, and it enables to avoid the matrix element which was not recognized well and to build a logical block. Therefore, it is avoided that recognition incapability of a part makes recognition of the whole recognition range difficult, the recognition speed improves as a result, and the possibility of incorrect recognition also falls.

Digital information carrier concerning the 15th aspect of this invention offered in order to solve the above-mentioned problems is the digital information carrier concerning the 14th aspect of this invention, and it is made possible to form the same partial arrangement as that of the bit arrangement B for reference by setting the positive direction of the i-axis as the main scanning direction and the positive direction of the j-axis as the sub-scanning direction about the logical block which is a partial matrix of the bit matrix V wherein any one matrix element v (i,j) is used as the starting point and the arrangement length on the side of the i-axis is set to the amount of gaps a, and by unifying some of the constituent elements of the logical block (virtual block).

Digital information carrier which can constitute the virtual block which forms the same bit arrangement as the partial arrangement of the bit arrangement B for reference in such unifying uses an arbitrary place as the starting point, and constituting a virtual block is realized. For this reason, since the judgment of whether it constitutes a block compared with the conventional logical block is performed quickly, the recognition speed is high, and a digital information carrier with which incorrect recognition does not easily take place is realized.

In addition, the virtual block formed by setting the arrangement length on the side of the i-axis to a can form a matrix. Since it is matrix form, recognition becomes easy. Therefore, a digital information carrier with which incorrect recognition does not easily take place is realized.

The digital information carrier concerning the 16th aspect of this invention offered in order to solve the above-mentioned problems is the digital information carrier concerning the 15th aspect of this invention, and the bit arrangement B for reference is constituted so that the partial arrangement of the predetermined length obtained by arbitrary offset differs from others mutually.

This way, the logical block built can acquire one offset value by comparing with the bit arrangement B for reference the arrangement obtained by unifying constituent elements. If this offset value is used as the positional information which specifies which portion of the digital information carrier the logical block is, it is easily realized to acquire the positional information by recognizing the image concerning the logical block in the recognition range.

Digital information carrier concerning the 17th aspect of this invention offered in order to solve the above-mentioned problems is the digital information carrier concerning the 15th or 16th aspect of this invention, and configuration of a new logical block (virtual block) is enabled by replacing the matrix element v (i, j) which serves as the end of the main scanning direction arrangement which constitutes a logical block (virtual block) on the condition that either of the matrix elements v (i−a, j+1) and v (i+a, j−1) is adjacent to the logical block (virtual block).

The virtual block newly built this way may change its form with replacement. For this reason, forming a virtual block is realized while avoiding those of which recognition is difficult among the image objects recognized. Therefore, a digital information carrier equipped with the concerning configuration does not easily produce incorrect recognition.

Digital information carrier concerning the 18th aspect of this invention offered in order to solve the above-mentioned problems is the digital information carrier concerning one of the 15th-17th inventions of this application, and configuration of a new logical block (virtual block) is enabled by removing the matrix element which constitutes the first of the bit arrangement from a logical block (virtual block), and by complementing the matrix element adjacent to the matrix element which constitutes the last of this bit arrangement on the side of the main scanning direction.

In addition, digital information carrier concerning the 19th aspect of this invention offered in order to solve the above-mentioned problems is the digital information carrier concerning one of the 15th-17th inventions of this application, and configuration of a new logical block (virtual block) is enabled by removing the matrix element which constitutes the last of the bit arrangement from a logical block (virtual block), and by complementing the matrix element adjacent to the matrix element which constitutes the first of this bit arrangement on the opposite side of the main scanning direction.

Any virtual block built this way may change its form. For this reason, forming a virtual block is realized while avoiding those of which recognition is difficult among the image objects recognized. Therefore, a digital information carrier equipped with the concerning configuration dos not easily produce incorrect recognition.

Display medium concerning the 20th aspect of this invention offered in order to solve the above-mentioned problems is the one for displaying the digital information carrier concerning for one of the 1st-19th inventions of this application. As long as the medium can display in the mode which can detect a digital information carrier, it may not only be paper or a film but may be any sort of medium.

In addition, display device concerning the 21st aspect of this invention is the one for displaying the digital information carrier concerning for one of the 1st-19th inventions of this application. The device refers to one for displaying a digital information carrier by display elements, such as liquid-crystal-display element, CRT, EL display element, digital paper, etc.

In addition, recording medium concerning the 22nd aspect of this invention is the one for recording the digital information carrier concerning for one of the 1st-19th inventions of this application. The display data is data for displaying a predetermined digital information carrier on a display medium or a display device which is made possible to be stored in a recording medium. In addition, this recording medium refers to magnetic recording media, such as FD, a hard disk, magnetic tape, etc., optical recording media, such as CD and DVD, magneto-optical recording media, such as MO, etc.

System for creating digital information carrier concerning the 23rd aspect of this invention offered in order to solve the above-mentioned problems is equipped with an input device for data input, a processing device for processing the inputted data and for generating data concerning digital information carrier consisting of a plurality of image objects, and an output device for outputting data concerning the generated digital information carrier, and the processing device is characterized by comprising conversion means for converting the inputted data into bit data and a generation means for identifying at least two image objects correlating to the bit data converted by the conversion means and the relative relationship of these and for generating image data of cluster information carrier which consists of at least two image objects based on the specified contents.

It is realized by the system concerned to output from the output device a digital information carrier which contains cluster information carrier and can avoid incorrect recognition.

System for creating digital information carrier concerning the 24th aspect of this invention offered in order to solve the above-mentioned problems is the system for creating digital information carrier concerning the 23rd aspect of this invention, and when the amount of data of the bit data obtained by the conversion means is more than the maximum amount of data which one cluster information carrier can display, the bit data after conversion is transformed into a bit arrangement which uses bit data having the data size below the maximum amount of data as an element by the conversion means, and by the generation means, while image data of a plurality of cluster information carriers are generated to correlate to the bit data which serve as each element of the bit arrangement, the display position of a plurality of the image data is determined to correlate to the arrangement relationship of the bit arrangement.

According to the system concerned, a plurality of cluster information carriers are outputted from the output device so that a bit arrangement can be formed from the relative position of those. For this reason, it is realized to generate data having a data size bigger than the maximum amount of data which one cluster information carrier can display as decoded information by recognizing the relative arrangement of a plurality of cluster information carriers.

System for creating digital information carrier concerning the 25th aspect of this invention offered in order to solve the above-mentioned problems is the system for creating digital information carrier concerning the 23rd or 24th aspect of this invention, and the processing device equipped with an input/output part which exchanges a data signals with the input device and the output device, a processing part which processes the data inputted from the input/output part, and a memory part which records the data required in order for the processing part to carry out data processing, the memory part has image data of the cluster information carrier and data concerning the correspondence relationship between the cluster information carrier and the bit data, and the generation means comprise means for selecting cluster information carriers correlating to the bit data converted by the conversion means based on the correspondence relationship data stored in the memory part, reading means for reading the image data correlating to the selected cluster information carriers from the memory part, and determination means for determining the display position of the image data of the read cluster information carriers.

According to the processing device concerned, it is realized to form a cluster information carrier which displays the inputted data by having the processing part suitably exchanging data with the memory part.

Method for creating a digital information carrier concerning the 26th aspect of this invention offered in order to solve the above-mentioned problems is a method for creating a digital information carrier carried out by the processing device which generates the data concerning digital information carrier consisting of a plurality of image objects according to the data inputted into the input device and outputs to the output device, and is characterized by having a conversion step for converting the inputted data into bit data and a generation step for identifying at least two image objects correlating to the bit data converted by the conversion means and the relative relationship of these and for generating the image data of a cluster information carrier which consists of at least two image objects based on the specified contents.

It is realized by performing the method concerned to output from the output device a digital information carrier which contains cluster information carrier and can avoid incorrect recognition.

Method for creating a digital information carrier concerning the 27th aspect of this invention offered in order to solve the above-mentioned problems is the method for creating digital information carrier related to the 26th aspect of this invention, and when the amount of the bit data obtained by the conversion means is bigger than the maximum amount of data which one cluster information carrier can display, the bit data after conversion is converted into a bit arrangement which uses bit data with a data size below the maximum amount of data as an element by the conversion step, and by the generation step, while image data of a plurality of cluster information carriers are generated to correlate to the bit data which serve as each element of the bit arrangement, the display position of a plurality of the image data is determined to correlate to the arrangement relationship of the bit arrangement.

By performing the method concerned, a plurality of cluster information carriers are outputted from the output device so that a bit arrangement can be formed from the relative position of those. For this reason, it is realized to generate data with a size bigger than the maximum amount of data which one cluster information carrier can display by recognizing the relative arrangement of a plurality of cluster information carriers as decoded information.

Method for creating digital information carrier concerning the 28th aspect of this invention offered in order to solve the above-mentioned problems is the system for creating digital information carrier related to the 26th or 27th aspect of this invention, and the processing device is equipped with an input/output part which exchanges a data signal with the input device and the output device, a processing part which processes the data inputted from the input/output part, and a memory part which records the data required in order for the processing part to carry out data processing, the memory part has image data of the cluster information carrier and correspondence relationship data concerning the correspondence relationship between the cluster information carrier and the bit data, and the generation step comprises a step for selecting cluster information carriers correlating to the bit data converted by the conversion step based on the correspondence relationship data stored in the memory part, a reading step for reading the image data correlating to the selected cluster information carriers from the memory part, and a determination step for determining the display position of the image data of the read cluster information carriers.

By performing the method concerned, it is realized to form a cluster information carrier which displays the inputted data by having the processing part suitably exchanging data with the memory part.

System for generation of decoded information for the digital information carrier related to the 29th aspect of this invention offered in order to solve the above-mentioned problems is equipped with an input device for inputting digital information carrier which consists of a plurality of image objects, a processing for generation of the decoded information which the inputted digital information carrier holds, and an output device which outputs the decoded information, and the processing device is characterized by recognition means for recognizing the digital information carrier inputted from the input device as a plurality of image objects, a cluster judging means for determining whether one of a plurality of the image objects makes a group with any other image object and constitutes a cluster information carrier, and a decoded information generation means for decoding bit data from the judged cluster information carrier given that it is judged to constitute a cluster information carrier and for generating decoded information based on the bit data.

By the system concerned, it is realized to carry out processing, such as decoding, etc., to the digital information carrier which contains cluster information carrier inputted from the input device while suppressing the possibility of occurrence of incorrect recognition in the processing device, to generate decoded information having a low possibility of containing incorrect information as a result of the processing, and to have the decoded information outputted from the output device.

System for generation of decoded information for digital information carrier related to the 30th aspect of this invention offered in order to solve the above-mentioned problems is the system for generation of decoded information for the digital information carrier related to the 29th aspect of this invention, and when there is a plurality of cluster information carriers determined by the cluster judging means, a plurality of bit data is generated by decoding a plurality of the cluster information carriers, some of the plurality of the bit data is unified to form a bit arrangement based on the relative arrangement of the plurality of the cluster information carriers, and unit information is generated as decoded information from the bit arrangement by the means for generation of decoded information.

According to the system concerned, unit information distributed and retained by a plurality of cluster information carriers can be generated. For this reason, it is realized to have a bigger amount of data than the maximum amount of data which one cluster information carrier can display, been displayed on digital information carrier.

In addition, although the method for unifying bit data based on the relative arrangement may be set beforehand, the optimal unifying method may be determined in the process for generating the decoded information by this system.

System for generation of decoded information for digital information carrier related to the 31st aspect of this invention offered in order to solve the above-mentioned problems is the system for generation of decoded information for the digital information carrier related to the 29th or 30th aspect of this invention, the processing device has a processing part which handles data processing and a memory part which records data required for data processing, and with the cluster judging means, the relative relationship of a plurality of image objects serves as a judgment condition and this condition is stored in the memory part.

A ghost dot integrated without having a relative relationship with other image objects is eliminated effectively by adopting the judgment condition concerned. Therefore, a system that can avoid incorrect recognition is realized.

System for generation of decoded information for digital information carrier related to the 32nd aspect of this invention offered in order to solve the above-mentioned problems is the system for generation of decoded information for digital information carrier concerning the 31st aspect of this invention, and cluster information carrier that has bit data correlating to the relative relationship of a plurality of image objects which are its constituent elements, the memory part has the correspondence relationship data between the relative relationship and bit data, and means for generation of decoded information include decoding means for decoding bit data from cluster information carrier based on the correspondence relationship data stored in the memory part.

Even if there is a cluster information carrier which contains a ghost dot as a constituent element by incorrect recognition, since bit data is correlated to the relative relationship of a plurality of image objects, the possibility of bit data being decoded is low. Therefore, mistakenly decoded information is not likely to be generated. In addition, since it is possible to have many data bits correlated to one cluster information carrier, large scale carriers and improvement in display density of the digital information carrier are realized.

System for generation of decoded information for digital information carrier related to the 33rd aspect of this invention offered in order to solve the above-mentioned problems is the system for generation of decoded information for digital information carrier concerning one of the 29th-32nd inventions of this application, and is equipped with judging means of image quality for evaluating how much the display state of a plurality of image objects constituting cluster information carriers judged by the cluster judging means is out of alignment from the ideal display state of the cluster information carriers and for judging whether it would be decoded by the means for generation of decoded information based on the result of the evaluation.

Display state here refers to shape distortion, color deviance, etc., and the reasons for this display state being out of alignment from the ideal display state can attributed to the processing of digital information carrier in the output device (for example, scanning gap of a printer), the reasons attributed to the input state in the input device (for example, a large tilt angle of a camera), the reasons attributed to the processing in the input device (for example, low contrast and no color difference).

The system concerned evaluates the gap from the ideal display state as cluster information carrier by a plurality of image objects. For this reason, it is possible to set better evaluation criteria compared with the case where evaluation is per image object, thus evaluation accuracy improves. In addition, this is effective for improvement in evaluation accuracy when display area is also large, and this is important when the object of evaluation has image distortion. Furthermore, when the same content as the judgment conditions (cluster function) for judging whether it constitutes cluster information carrier is the object of evaluation, quantifying the sufficiency rate of the judgment conditions can be used as an evaluation threshold of the gap, and thus high evaluation accuracy is realized.

In addition, in the system concerned, when the evaluation result of the gap is bad, it is directed not to consider the cluster information carrier as a decoding object. It is because the possibility of producing incorrect recognition is still high, even if it is judged to constitute a cluster information carrier in the judgment of whether to constitute cluster information carriers, that is, the cluster function. For this reason, the system in which incorrect recognition is especially not likely to occur can be easily is realized.

System for generation of decoded information for digital information carrier related to the 34th aspect of this invention offered in order to solve the above-mentioned problems is the system for generation of decoded information for the digital information carrier performed by a processing device which generates decoded information obtained by processing the digital information carrier inputted into the input device inputting digital information carrier which consists of a plurality of image objects and which outputs the decoded information, and the processing device is characterized by being equipped with a recognition step for recognizing the digital information carrier inputted from the input device as a plurality of image objects, a cluster judging step for determining whether one of a plurality of the image objects groups with any other image object and constitutes a cluster information carrier, and a step for decoding bit data from the judged cluster information carrier given that it is judged to constitute a cluster information carrier and for generating decoded information based on the bit data.

By adopting the method concerned, it is realized to carry out processing, such as decoding, etc., to the digital information carrier which contains cluster information carrier inputted from the input device while suppressing the possibility of occurrence of incorrect recognition in the processing device, to generate decoded information having a low possibility of containing incorrect information as a result of the processing, and to have the decoded information outputted from the output device.

Method for generation of decoded information for digital information carrier related to the 35th aspect of this invention offered in order to solve the above-mentioned problems is the method for generation of decoded information for the digital information carrier concerning the 34th aspect of this invention, and when there is a plurality of cluster information carriers judged by the cluster judging step, plurality of bit data is generated by decoding a plurality of the cluster information carriers, some of a plurality of the bit data is unified to form a bit arrangement based on the relative arrangement of a plurality of the cluster information carriers, and unit information is generated as decoded information from the bit arrangement by the decoded information generation step.

By adopting the method concerned, one information distributed and retained by a plurality of cluster information carriers is generated. For this reason, it is realized to have bigger amount of data than the maximum amount of data which one cluster information carrier can display, been displayed on digital information carrier.

In addition, although the method for unifying bit data based on the relative arrangement may be set beforehand, the optimal unifying method may be determined in the process for generating the decoded information by this system.

Method for generation of decoded information for digital information carrier related to the 36th aspect of this invention offered in order to solve the above-mentioned problems is the method for generation of decoded information for the digital information carrier concerning the 34th or 35th aspect of this invention, the processing device has the processing part which handles data processing and the memory part which records data required for data processing by the processing part, and at the cluster judging step, the relative relationship of a plurality of image objects serves as the judgment condition and this judgment condition is stored in the memory part.

The ghost dot integrated without having a relative relationship with other image objects is eliminated effectively by adopting the judgment condition concerned. Therefore, the system with which incorrect recognition does not easily take place is realized.

Method for generation of decoded information for digital information carrier related to the 37th aspect of this invention offered in order to solve the above-mentioned problems is the method for generation of decoded information for the digital information carrier concerning the 36th aspect of this invention, and cluster information carrier that has bit data correlating to the relative relationship of a plurality of image objects which are its constituent elements, the memory part has the correspondence relationship data concerning the correspondence relationship between the relative relationship and bit data, and a decoded information generation step includes a decoding step for decoding bit data from cluster information carrier based on the correspondence relationship data stored in the memory part.

Even if there is a cluster information carrier which contains a ghost dot as a constituent element by incorrect recognition, by bit data being correlating to the relative relationship of a plurality of image objects, a possibility of bit data being decoded becomes low. Therefore, the mistakenly decoded information is not likely to be generated. In addition, since it is realized to have many bit data correlated to one cluster information carrier, the improvement in display density of digital information carrier and making it larger-scaled are realized.

Method for generation of decoded information for digital information carrier related to the 38th aspect of this invention offered in order to solve the above-mentioned problems is the method for generation of decoded information for the digital information carrier concerning one of the 34th-37th aspects of this invention, and is equipped with a display state judging step for evaluating how much the display state of a plurality of image objects constituting cluster information carriers judged by the cluster judging step is out of alignment from the ideal display state of the cluster information carriers and for judging whether it would be decoded by the generation of decoded information step based on the result of the evaluation.

The method concerned evaluates the gap from the ideal display state as cluster information carrier by a plurality of image objects. For this reason, it is possible to set better evaluation criteria compared with the case where evaluation is per image object, thus evaluation accuracy improves. In addition, this is effective for evaluation accuracy improvement when the display area is also large, and this is important when the object of evaluation has image distortion. Furthermore, when the same contents as the judgment conditions (cluster function) for judging whether it constitutes cluster information carrier is the object of evaluation, quantifying the sufficiency rate of the judgment conditions can be used as an evaluation threshold of the gap, and thus high evaluation accuracy is realized.

In addition, by the method concerned, when the evaluation result of the gap is bad, it is directed not to consider the cluster information carrier as decoding object. It is because the possibility of producing incorrect recognition is still high, even if it is judged to constitute a cluster information carrier in the judgment of whether to constitute cluster information carriers, that is, the cluster function For this reason, the system in which incorrect recognition is especially not likely to occur can be easily is realized.

Program related to the 39th aspect of this invention offered in order to solve the above-mentioned problems is a program for having a computer perform the method for creating digital information carrier concerning the 26th or 28th aspect of this invention.

Program related to the 40th aspect of this invention offered in order to solve the above-mentioned problems is a program for having a computer perform the method for generation of decoded information for digital information carrier concerning one of the 34th-38th inventions of this application.

Recording medium related to the 41st aspect of this invention offered in order to solve the above-mentioned problems is a recording medium which has recorded the program for having a computer perform the method for creating digital information carrier concerning the 26th or 28th aspect of this invention with computer reading possible.

Recording medium related to the 42nd aspect of this invention offered in order to solve the above-mentioned problems is a recording medium which has recorded the program for having a computer perform the method for generation of decoded information for digital information carrier concerning one of the 34th-38th inventions of this application with computer reading possible.

According to one of the modes of this invention, digital information carrier contains cluster information carrier which has bit data correlating to the relative relationship of a plurality of image objects. This cluster information carrier can hold more bit data rather than the case where bit data is correlated to each of the constituents of the plurality of image objects. For this reason, the number of constituent image objects of digital information carrier decreases, and lowering the display density of an image is realized. Therefore, the influence of ghost dots etc. decreases, false recognition becomes unlikely and digital information carrier that is easy to display and has a fast recognition speed is realized. In addition, high position resolution can be achieved for the digital information, since many data bits can be displayed on a few image display regions.

In addition, according to another mode of this invention, judgment on whether one image object which is a constituent element of digital information carrier constitutes a cluster information carrier with other image objects is performed, and decoding is performed only when it is judged to constitute a cluster information carrier in this judgment. For this reason, it is easy to identify a ghost dot displayed because it is almost irrelevant to other image objects. Therefore, a digital information carrier with which incorrect recognition does not easily take place is realized.

In addition, according to yet another mode of this invention, information is also given to the relative arrangement of cluster information carrier. Since cluster information carriers are not easily influenced by ghost dots as mentioned above, the information contained in the relative arrangement of the cluster information carriers is not easily influenced by the ghost dots either. Therefore, digital information carrier with which incorrect recognition does not easily take place is realized. In addition, since the information which the cluster information carrier has and the information which the relative arrangement has are essentially independent, digital information carriers which have mutually independent information and digital information carrier with which unit information is generated by associating mutual information are realized. For this reason, the information retention mode of the whole digital information carrier increases.

Therefore, digital information carrier wherein information retention density and the possibility of incorrect recognition are adjusted according to the display mode or the usage can be created.

In addition, according to yet another mode of this invention, a new logical block (virtual block) can be constituted by replacing at least one of the constituent elements of the logical block (virtual block) formed by unifying a plurality of unit information carriers which are the minimum unit at the time of decoding a digital information carrier with a unit information carrier adjacent to the logical block (virtual block). Unlike the logical block by prior art wherein the block form was fixed in the shape of a matrix, the new logical block (virtual block) formed by replacement this way has a high form flexibility of the block. For this reason, even if some unit information carriers recognized as image are not suitable for decoding, a logical block (virtual block) can be easily constituted so that it does not contain these. Therefore, a digital information carrier for which the possibility of non-recognition or of incorrect recognition is very low is realized. In addition, the range needed as a recognition range becomes narrower in comparison to the case of adopting a logical block from prior art wherein the block form was fixed, and therefore it becomes possible to set fewer cluster information carriers in the recognition range. Therefore, image processing needed for position recognition can be performed in a shorter time.

Zhou et al. is directed to barcodes; the subject matter of the present invention is quite distinct from barcodes. As described in the paragraph beginning in line 59 of column 6, Zhou et al. requires "anchor bits" or, alternatively, a pixel based two-dimensional bitmap.

One- and two-dimensional barcodes are absolute-position-dependent—a limitation that the present invention overcomes. A barcode carries in itself the information that is its purpose to provide. Graphical-object clusters according to the present invention need not store such information in the clusters themselves, but nonetheless provide information (primary information) as to their relative location on the graphical-object bearing surface.

A barcode provides no information about its own position; it demands information about its own position. A barcode does not teach anything as to its position relative to the object on which it appears; a barcode demands of the scanning device that its position be identified. Graphical-object clusters according to the present invention, via a predetermined minimum field-of-view (viewport), provide coordinate information on where the CCD or other data-capturing device is relative to the entire encoded surface—indeed, the clusters could identify a barcode's position relative to the rest of the object on which the barcode appears.

Furthermore, Graphical-object clusters according to the present invention enable robust data recovery impossible with barcodes such as in Zhou et al.

BRIEF DESCRIPTION OF THE SEVERAL VIEWS OF THE DRAWINGS

FIG. 26 illustrates an example of the virtual block to which form flexibility is given.

FIG. 27 represents a virtual block and a recognition range are displayed on an example of the bit matrix formed by decoding digital information carrier.

FIG. 28 represents a virtual block and a matrix element that can be mutually replaced with the recognition range are displayed on an example of the bit matrix formed by decoding digital information carrier.

FIG. 34-1 is a conceptual figure for explaining operation (first half) of the digital information carrier generation system 11.

FIG. 34-2 is a conceptual figure for explaining operation (second half) of the digital information carrier generation system 11.

FIG. 36-1 is a flowchart conceptually showing an example of operation of the digital information carrier decoding system 21 (first half, part 1).

FIG. 36-2 is a flowchart conceptually showing an example of operation of the digital information carrier decoding system 21 (first half, part 2).

FIG. 36-3 is a flowchart conceptually showing an example of operation of the digital information carrier decoding system 21 (first half, part 3).

FIG. 37-1 is a flowchart conceptually showing an example of operation of the digital information carrier decoding system 21 (second half, part 1).

FIG. 37-2 is a flowchart conceptually showing an example of operation of the digital information carrier decoding system 21 (second half, part 2).

FIG. 37-3 is a flowchart conceptually showing an example of operation of the digital information carrier decoding system 21 (second half, part 3).

LEGEND

Figure 1:
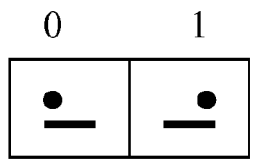
FIG. 1 illustrates an example of a cluster information carrier which consists of one dot and one line segment.

11: Digital information carrier generation system
101: Input device
102: Processing device
102a: Input/output part
102b: Processing part
102c: Memory part
103: Output device
111: Paper-like medium
112: Paper-like medium
21: Digital information carrier decoding system
201: Input device
202: Processing device
202a: Input/output part
202b: Processing part
202c: Memory part
203: Output device

DETAILED DESCRIPTION OF THE INVENTION

The digital information carrier concerning this invention is explained in detail hereafter.

A dot and a line segment can be mentioned as the simplest image objects. Therefore, in order to make understanding easy, these are used as examples also in the explanation of cluster information carrier concerning the invention of this application.

Figure 2:
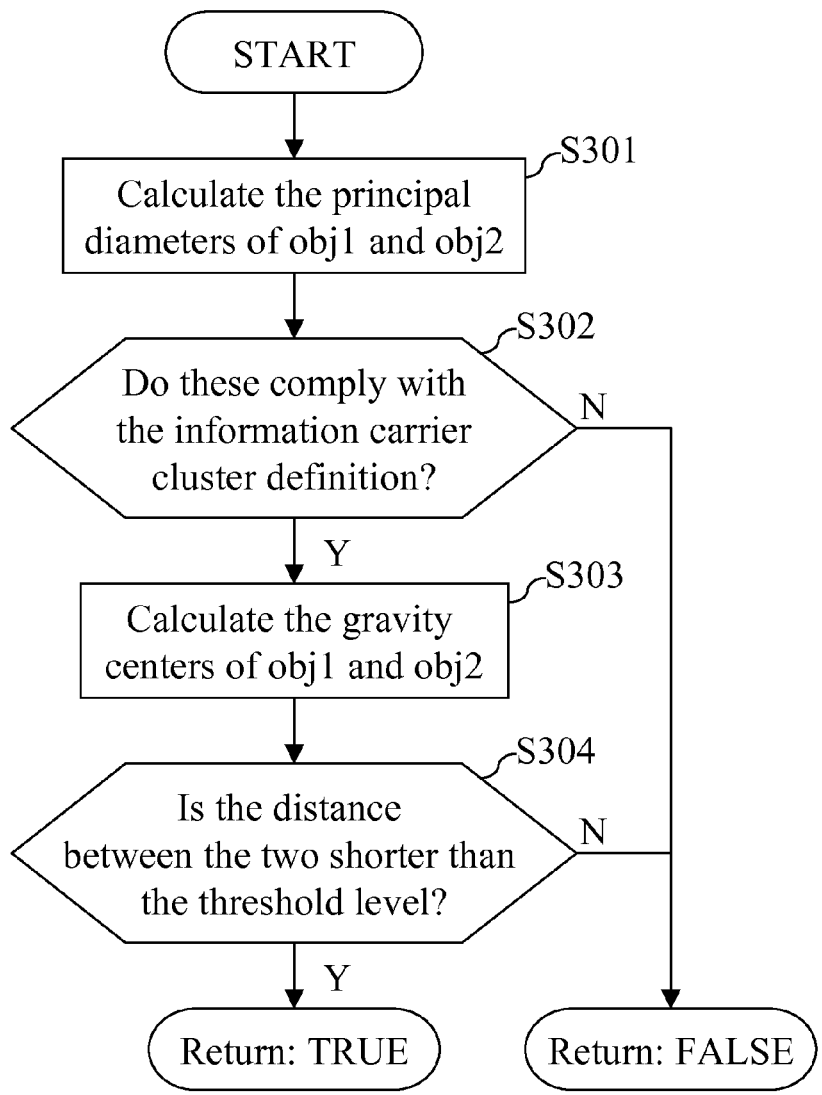
FIG. 2 is a flowchart showing an example of operation of the cluster function for judging the cluster information carrier shown in FIG. 1.

FIG. 1 is the figure showing an example of cluster information carrier which consists of one dot and one line segment, and FIG. 2 is the flow chart showing an example of the operation of the cluster function for judging a cluster information carrier shown in FIG. 1.

A cluster information carrier as shown in FIG. 1 which consist of one dot and one line segment and a cluster function as shown in FIG. 2 are examined.

Each image object is recognized using a very general image-processing method, and the principal diameters and the center of gravity of the object are calculated. When the principal diameters are the same, the image object is a circle, that is, a dot, and when there is sufficient difference in the principal diameters, it is recognized as being a line segment.

With this cluster function, input parameters are two image objects obj1 and obj2, and an output value is a TRUE or a FALSE value.

Suppose that by definition only two different image objects, that is, a dot and a line segment, are contained in one cluster information carrier here. Therefore, when calculating the principal diameters for each of the inputted obj1 and obj2 (Step S301), it can be determined whether the object is a dot or a line segment, respectively.

Then, for the two concerned image objects, under consideration for constituting or not a cluster information carrier, it is determined whether they are of the same kind (a dot and a dot, or a line segment and a line segment) (Step S302).

If they are found to be of the same kind at Step S302, it is determined by the clustering function that these image objects do not constitute a cluster information carrier, and a FALSE value is outputted.

On the other hand, when they are determined not to be of the same kind at Step S302, the distance between the centers of gravity is calculated for the two image objects (Step S303), and this distance is compared with the threshold specified beforehand.

Then, a judgment whether the distance between the centers of gravity of the two image objects of different type, that is, a dot and a line segment, is closer than the threshold is made (Step S304).

When it is judged that this distance is closer than the threshold at Step S304, these image objects are judged by the cluster function that they constitute a cluster information carrier, and a TRUE value is outputted. On the other hand, a FALSE value is outputted when it is judged that they are further apart than the threshold.

According to the cluster function as shown in FIG. 2, when the image objects concerning the judgment processing satisfy the definition of clustering, it is judged to constitute cluster information carrier.

Here, besides the authenticity judging, specific processing of a judgment may be performed based on the display distortion value as a cluster, in other words, the measured value obtained by measuring the error rate value for the cluster information carrier.

This measured rate value quantitatively shows how close the cluster information carrier concerning the present judgment processing is to the ideal cluster information carrier by the definition of clustering. If cluster information carrier shown in FIG. 1 is used as an example, the ratio of the longest among the principal diameters (the longest principal diameter) P in the dot contained in one cluster information carrier and the longest among the principal diameters S in the line segment must be close to ⅓. When the longest principal diameter ratio of the dot and the line segment shifts away from 1 and comes closer to ⅓, the numerical value of P/S-⅓ comes closer to zero. In addition, the condition may be set so that the distance D between the center of gravity of the dot and the line segment must be smaller than S/2. When the dot and the line segment are arranged in a mutually suitable position at this time, the numerical value of D-S/2 comes closer to zero. These two expression formulas may be combined, and the sum of the two absolute values may be used as a measure value of the display distortion for judging whether to constitute a cluster information carrier. Specifically, it can be judged to constitute cluster information carrier on the condition that the measure value is smaller than the predetermined threshold. In addition, although a very simple example was shown as a calculation method of display distortion in order to make understanding easy here, the invention of this application is not restricted to the above-mentioned content, and distortion calculation may be carried out using other methods. The obtained measurement value of display distortion is used also in decoding of digital information carrier as mentioned later.

Once cluster information carrier is recognized, encoded bit data is decoded as follows.

First, the center-of-gravity position of the line segment belonging to a cluster information carrier is set as the center of the cluster information carrier, and image processing is performed so that the center is moved to the origin for decoding processing.

Next, rotation processing of the image is performed for the cluster information carrier so that the line segment belonging to cluster information carrier is arranged on the X-axis.

Then, the coordinates in the coordinate system which uses the center of gravity of the line segment as an origin are derived for the dot belonging to the cluster information carrier. When the X coordinate value and the Y coordinate value of the dot are the same, it is decoded to "1", and when the X coordinate value differs from the Y coordinate value, it is decoded to "0."

In addition, decoding processing may be performed without performing the conversion processing of the above-mentioned cluster information carriers substantially but only by doing the confirmation work of coordinates, and then a recognition system can be realized at low computational cost in this case.

Figure 3:
FIG. 3 illustrates an example of the arrangement of cluster information carrier shown in FIG. 1.

An example of an arrangement of the cluster information carriers shown in FIG. 1 is shown in FIG. 3. In this case, the decoded bit arrangement is "101000." Here, in decoding this cluster information carrier arrangement, since each cluster information carrier has asymmetrical form regarding 180-degree rotations, the first cluster information carrier of the arrangement is determined unambiguously. For this reason, a bit arrangement in a reverse order (like "000101") can not be mistakenly obtained. Therefore, asymmetrical cluster information carrier arrangement can be directly used for linear coding, and the coordinate range is regulated only by the length of the bit arrangement at this time.

Figure 4:
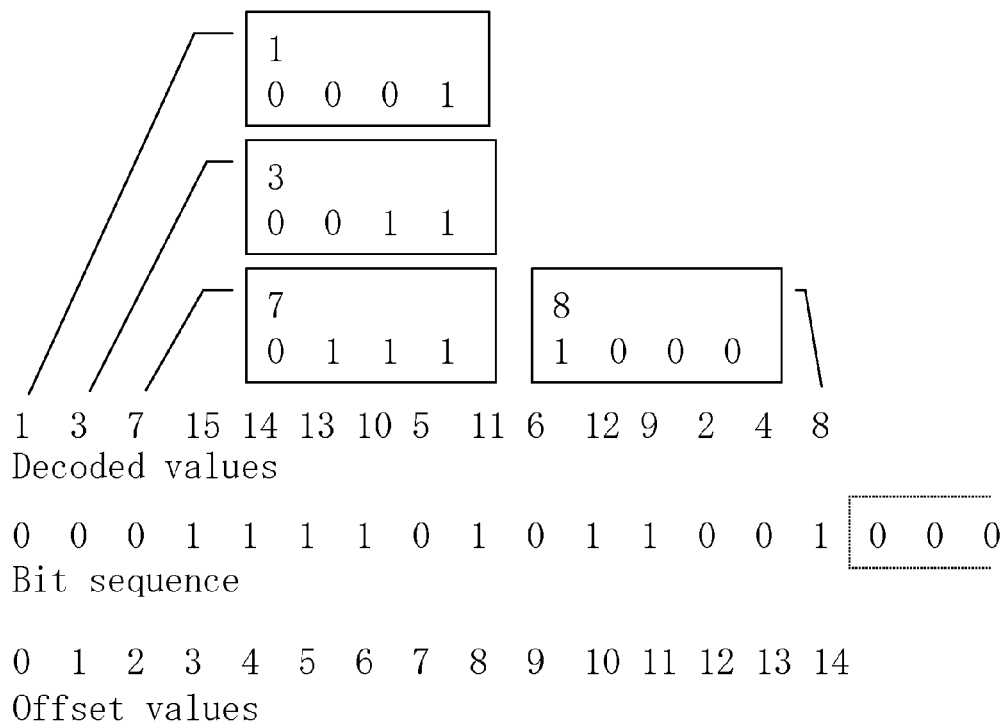
FIG. 4 conceptually shows the relationship of the numerical value converted reference bit arrangement and the partial arrangement having an arrangement length of 4 obtained by suitably offsetting the reference bit arrangement into the decimal system and the offset value.

Next, linear coding which generates unit information from this bit arrangement is explained using FIG. 4.

FIG. 4 is the figure conceptually showing the relationship of the numerical value converted reference bit arrangement and the partial arrangement having an arrangement length of 4 obtained by suitably offsetting the reference bit arrangement into the decimal system and the offset value.

Here, priority is given to the ease of understanding, and the explanation is given using a reference bit arrangement having an arrangement length of only 15 as shown in FIG. 4.

If the reference bit arrangement which consists of 15 bits shown in FIG. 4 is selected with arbitrary consecutive 4 bits as a partial arrangement, 15 partial arrangements of those other than "0000" can be obtained. For offset 0, the partial arrangement is "0001" which is "1" in the decimal system. Similarly, for offset 1, the partial arrangement is "0011" which is "3" in the decimal system, and for offset 2, the partial arrangement is "0111" which is "7" in the decimal system. In addition, since this reference bit arrangement is of a circular type, the bit after the 15th bit returns to the beginning of the arrangement. The partial arrangement which uses the 13th to the 15th bit as a starting point is actually obtained by appending the first three bits of the arrangement, that is, "000", to the end of the arrangement. For example, for offset 14, the partial arrangement is "1000" which is "8" in the decimal system.

Here, it should be noted that there is no overlapping arrangement in the 15 partial arrangements selected from the reference bit arrangement. For this reason, the positional information of the 15 coordinate values can be coded with the offset value from the 1st bit of the reference bit arrangement having the arrangement length of 15.

Figure 5:
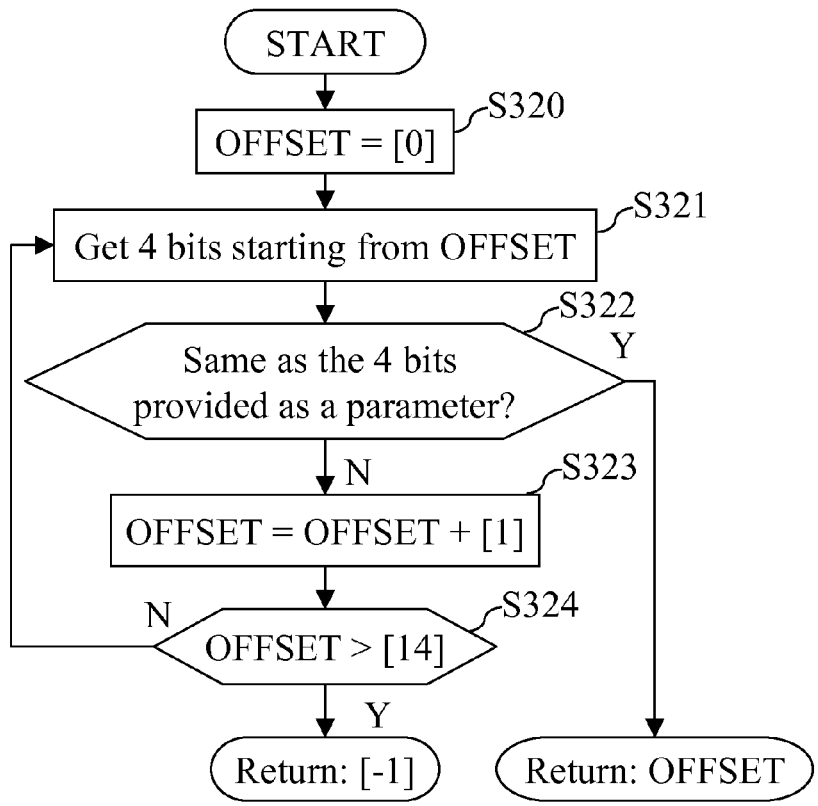
FIG. 5 is a flowchart showing the outline of the processing for deriving an offset value from the partial arrangement having an arrangement length of 4.

The derivation of an offset value is explained in detail using FIG. 5. The flow chart shows the outline of the processing for deriving an offset value from the partial arrangement having an arrangement length of 4.

First, "0" is set as an offset value of the initial stage for extracting a partial arrangement from the reference bit arrangement (Step S320). Then, the partial arrangement having an arrangement length of 4 which uses the offset value as a starting point is generated (Step S321).

The partial arrangement is compared with the bit arrangement having the arrangement length of 4 and provided as a parameter for processing (Step S322), and when it is judged to be the same, the offset value is outputted and the processing concerning FIG. 5 is finished.

On the other hand, when it is judged not to be the same, the offset value is increased by "1" (Step S323), and the offset value after the increase is checked whether it is smaller than 14 (Step S324). If it is smaller, it moves on to Step S321 and the processing after generation of the partial arrangement is performed.

On the other hand, when it not smaller than 14 at Step S324, it means that the partial arrangement which uses any of the offset values as the starting point is not the same as the bit arrangement concerning the processing. Therefore, an error value (for example, −1) is outputted and the processing concerning FIG. 5 is finished.

This is illustrated still in more detail below. If four consecutive cluster information carriers are recognized during the image recognition of the predetermined range of digital information carrier, the positional information is acquired from the bit arrangement obtained by decoding them. For example, if the bit arrangement is "1101", since the numerical value in the decimal system is "13", the offset value will be "5", and it will be determined that the coordinate of the recognition range is "5." The bit arrangement having the bit length shown here is just an illustration, and the method related to this invention can be applied without device dependency to bit arrangement having an arbitrary bit lengths.

The 1-dimensional bit arrangement obtained by the above-mentioned decoding of digital information carrier to which linear coding was applied is easily extended into 2-dimension. This extension is explained using FIG. 6 and FIG. 7.

Figure 6:
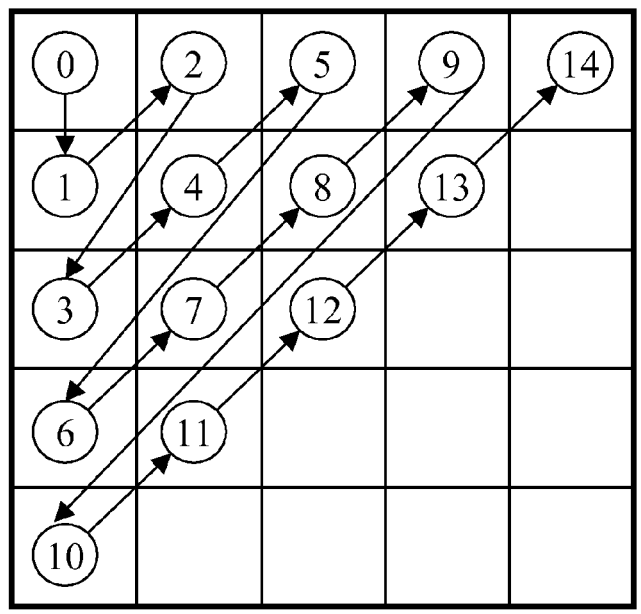
FIG. 6 illustrates an example which expresses 2-dimensions using a 1-dimensional arrangement.

FIG. 6 is the figure showing an example which expresses 2-dimensions using a 1-dimensional arrangement.

Figure 7:
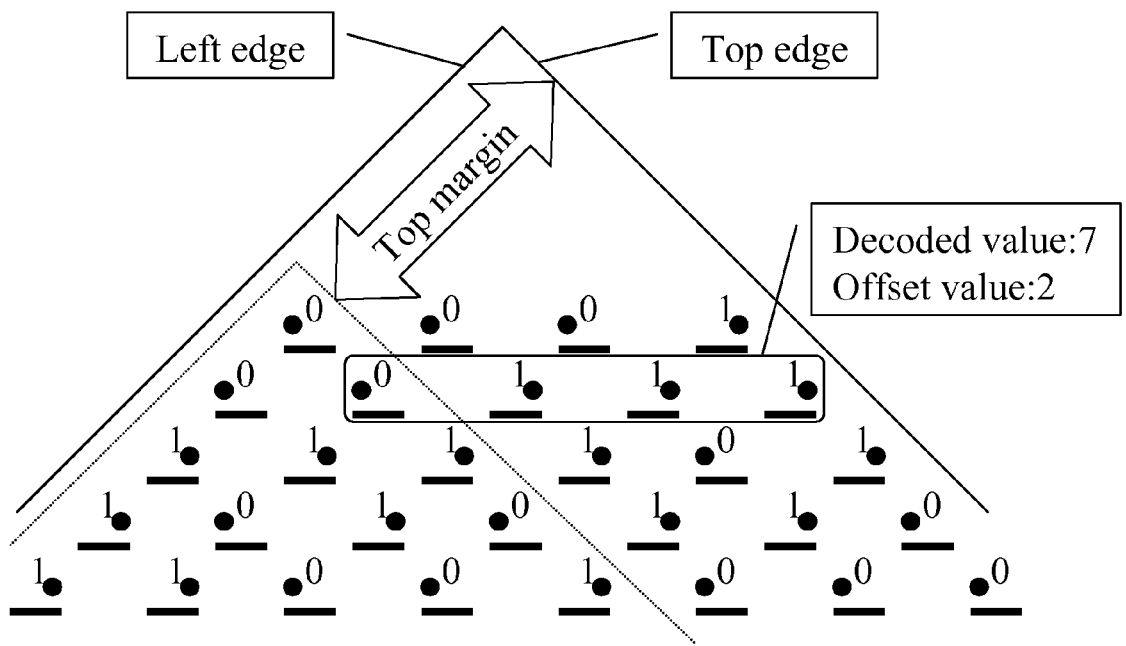
FIG. 7 illustrates an example of a digital information carrier coded under the rule related to FIGS. 1 and 4 using the expression method of FIG. 6.

FIG. 7 is the figure showing an example of digital information carrier coded under the rule concerning FIGS. 1 and 4 using the expression method of FIG. 6.

For example, all positions in 2-dimensions can be identified by assigning numbers to the entire surface by the method shown in FIG. 6. An example which actually encodes the upper left triangular region in FIG. 6 is shown in FIG. 7. Note that the triangular region in FIG. 7 is rotated by 45 degrees to the right for convenience.

There is a method for expressing 1-dimension by one digital information carrier and using two such digital information carriers as another method for expressing 2-dimension. This other method is explained using FIG. 8 and FIG. 9.

Figure 8:
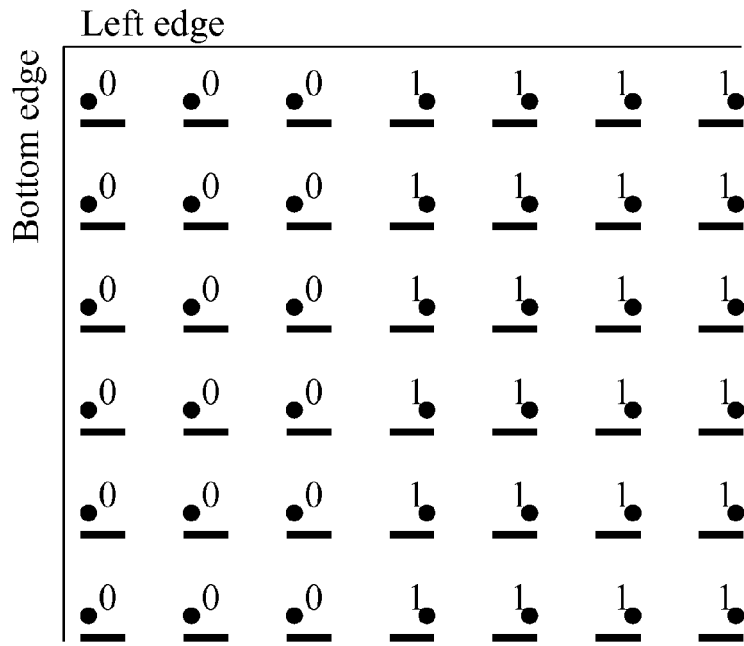
FIG. 8 illustrates an example where a plurality of 1-dimensional arrangements in the X-axis direction formed by arranging digital information carriers coded under the rule related to FIGS. 1 and 4, are arranged in the Y-axis direction.

FIG. 8 is the figure showing an example wherein a plurality of 1-dimensional arrangements formed by arranging digital information carriers coded under the rule concerning FIGS. 1 and 4 in the X-axis direction are arranged in the Y-axis direction.

Figure 9:
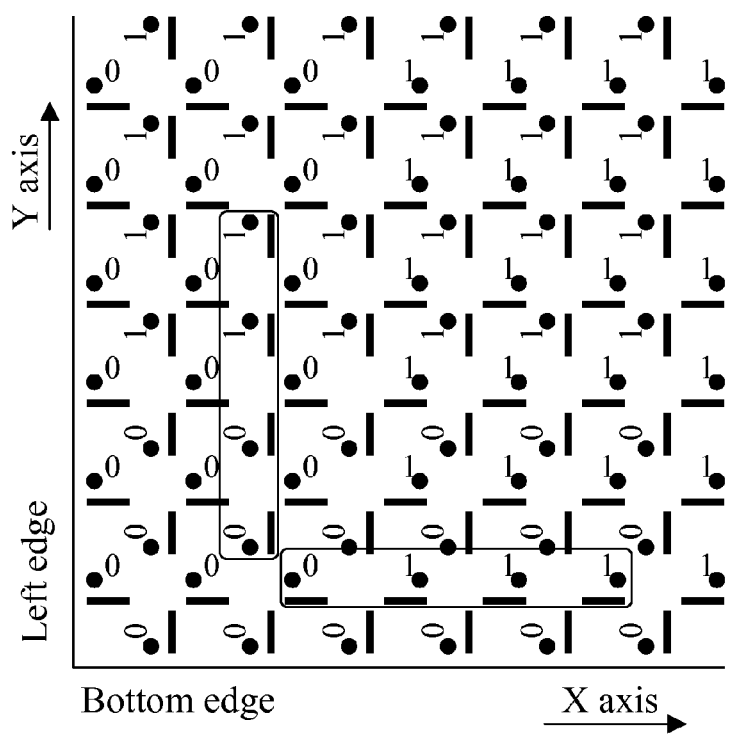
FIG. 9 illustrates an example of a plurality of 1-dimensional arrangements in the Y-axis direction formed by arranging digital information carriers coded under the rule related to FIGS. 1 and 4 are arranged in the X-axis direction in the digital information carrier of FIG. 8.

FIG. 9 is the figure showing an example wherein a plurality of 1-dimensional arrangements formed by arranging digital information carriers coded under the rule concerning FIGS. 1 and 4 in the Y-axis direction are arranged in the X-axis direction in the digital information carrier of FIG. 8.

As shown in FIG. 8, 1-dimensional digital information carriers are arranged in a plurality of rows with a predetermined interval. Next, the digital information carrier is rotated by 90 degrees, and the same 1-dimensional digital information carriers are further arranged. This way, the digital information carrier as shown in FIG. 9 is obtained.

With this digital information carrier, it becomes possible by decoding two sorts of codes independently to regulate every position on the surface. For example, the bit arrangement formed by decoding four cluster information carriers surrounded by the horizontally elongated rectangle is "0111", and its offset value "2" shows the X coordinate value. Similarly, the bit arrangement formed by decoding four cluster information carriers surrounded by the vertically elongated rectangle is "0011", and its offset value "1" shows the Y coordinate value. Once the direction (which is the positive direction) of the bit arrangement is recognized here, attribution of each axis will be easily performed from the relationship of the positive direction of two axes of coordinates, X and Y.

When cluster information carrier can have information worth of 2 bits or can have four different numerical values, it also becomes possible for one cluster information carrier to have 2-dimensional information directly. An example is shown in FIG. 10 and FIG. 11.

Figure 10:
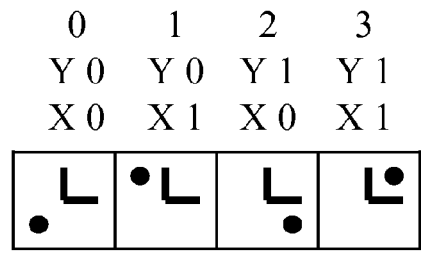
FIG. 10 illustrates an example of cluster information carrier which can have information worth 2 bits.

FIG. 10 is the figure showing an example of cluster information carrier which can have the information worth of 2 bits.

Figure 11:
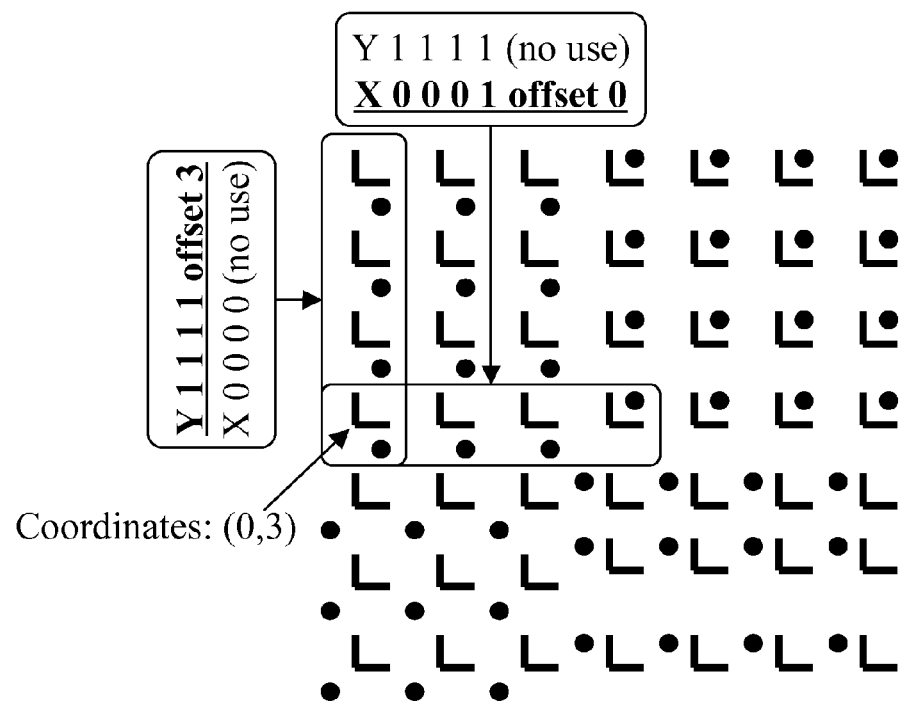
FIG. 11 illustrates an example of a digital information carrier formed by arranging cluster information carriers shown in FIG. 10 in 2-dimensions based on the rule of FIG. 4.

FIG. 11 is the figure showing an example of digital information carrier formed by arranging cluster information carriers shown in FIG. 10 in 2-dimensions based on the rule of FIG. 4.

In the cluster information carrier shown as an example here, two line segments which form one image object show the X-axis and the Y-axis which intersect at the origin. Decoding of the cluster information carrier is performed by recognizing the coordinate of the dot in the coordinate system by this X-axis and Y-axis. In this example, the X(Y) coordinate value is "0" when the numerical value which shows coordinate by focusing on the Y (X) coordinates is negative, and decoding is performed as "1" in the case where it is positive. An example of a digital information carrier coded by this method is shown in FIG. 11.

An example of decoding the positional information in this region is shown. At the place where four consecutive cluster information carriers horizontally surrounded in FIG. 11 are selected, when the bit data which is obtained by decoding each cluster information carrier are unified, two 4-bit arrangements in the X-axis direction and the Y-axis direction are acquired. The bit arrangement showing the X-axis direction is "0001", and the bit arrangement showing the Y-axis direction is "1111." If an offset value is calculated for these bit arrangements based on FIG. 5, "0" will be obtained for the X-axis direction, and it will be recognized as the X coordinate value being "0."

On the other hand, it should be noted that the offset value of the Y-axis direction cannot be used for showing the coordinate value of the Y-axis direction.

For this reason, in order to acquire the Y coordinate value, cluster information carriers of four consecutive in the vertical direction with the first cluster information carrier of the four cluster information carriers consecutive in the horizontal direction mentioned above as the head is selected, and two bit arrangements are obtained by unifying the bit data obtained by decoding these. In this case, the bit arrangement correlating to the coordinate value only from the Y-axis is obtained contrary to the case of the X-axis direction. Specifically, as shown in FIG. 11, "1111" is obtained in the Y-axis direction, and "3" is obtained as the Y coordinate value.

In the case of an asymmetrical cluster information carrier which was used for the above-mentioned explanation, it is very easy to attribute the X-axis and the Y-axis. On the other hand, the symmetry of the constituent image object is high and the symmetry as cluster information carrier is also high for this reason, although the configuration is relatively simplified, the coordinate axis may not be easily recognized from the arrangement of its cluster information carrier. In addition, the solution means for the ambiguity about the recognition of the coordinate system which occurs in cluster information carrier with such high symmetry is explained in detail later.

Figure 12:
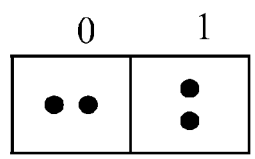
FIG. 12 illustrates an example of a cluster information carrier having high symmetry of the form and having a maximum of 1-bit of information.
Figure 13:
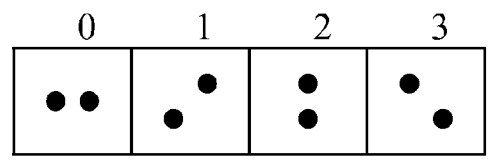
FIG. 13 illustrates an example of a cluster information carrier having high symmetry of the form and having a maximum of 2-bits of information.
Figure 14:
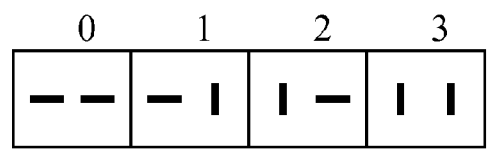
FIG. 14 illustrates an example of a cluster information carrier having high symmetry of the form and having a maximum of 2-bits of information.
Figure 15:
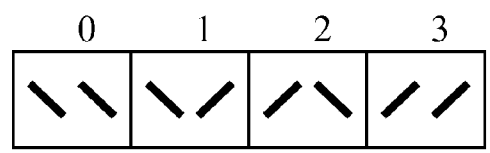
FIG. 15 illustrates an example of a cluster information carrier having high symmetry of the form and having a maximum of 2-bits of information.

An example of cluster information carrier with a highly symmetrical form is shown in FIGS. 12-15. An example of cluster information carrier which can contain 1-bit information formed by using two image objects of dot form is shown in FIG. 12. An example of cluster information carrier which can contain 2-bit information formed by using the same two dot forms is shown in FIG. 13. Examples of cluster information carrier which can contain 2-bit information formed by using two line segments are shown in FIGS. 14 and 15, respectively. An example of digital information carrier formed by arranging cluster information carriers regulated in FIG. 15 on a plane is shown in FIG. 16.

Figure 16:
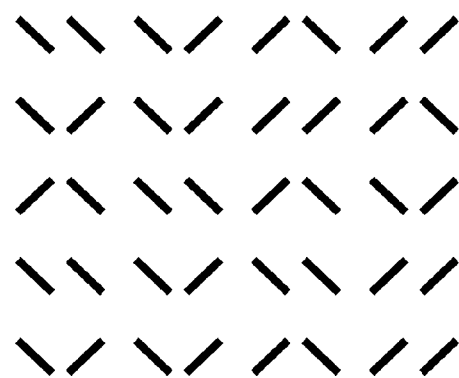
FIG. 16 illustrates an example of digital information carrier formed by arranging cluster information carriers specified in FIG. 15 on a plane.

This digital information carrier shown in FIG. 16 resembles a digital information carrier coded by glyphs at a glance. However, since the digital information carrier concerning the invention of this application is formed based on the principle which completely differs from glyphs as explained so far, the resemblance on appearance is nothing but simply superficial. When carefully examined, it is understood immediately that the cluster information carrier concerning this application has not been disclosed by any prior art.

Figure 17:
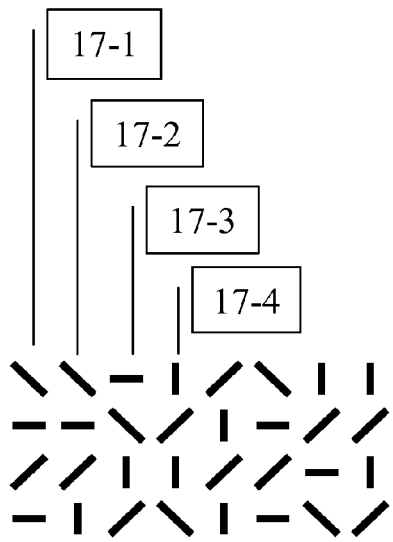
FIG. 17 illustrates an example of digital information carrier wherein two sorts of cluster information carrier shown in FIGS. 14 and 15 are used together.

FIG. 17 is an example of digital information carrier wherein two sorts of cluster information carriers shown in FIGS. 14 and 15 are used together.

In the digital information carrier shown in FIG. 17, the distance between the centers of gravity of each constituent image object is constant, and it is unknown which two image objects constitute a cluster information carrier at a glance. However, by using the object sort determined by the direction of an image object rather than using the distance between two image objects for the judgment of whether to constitute a cluster information carrier, it becomes possible to make a judgment easily. In reality, in the case of judging using the maximum proximity distance between two image objects, it will be judged that the maximum proximity distance between the image object 17-2 which is in the first row of the second column when considering the image object of the upper left corner as the first row of the first column and the image object 17-3 adjacent on the right is smaller than the threshold, and will be judged that these image objects constitute one cluster information carrier. However, by judging by the image object sort, these image objects will be separated and will be judged that they constitute cluster information carriers with the adjacent image object of the same sort, respectively. Specifically, the image object by the diagonal line segment shown as image object 17-1 and the image object 17-2 constitute one cluster information carrier, and the image object by the vertical or horizontal line segment shown as image object 17-3 and the image object 17-4 constitutes one cluster information carrier.

The cluster function for performing such a judgment is set so that the minimum angle of the principal axes which make maximum length for each is calculated for two image objects concerning the judgment. The two image objects are recognized to constitute a cluster information carrier when the angle is close to 0 degree or 90 degrees. If this is explained in detail using FIG. 17, the angle of the principal axes which make maximum length for each of the two image objects 17-1 and 17-2 is close to 0 degree and the two line segments are almost parallel, and the angle of the principal axes which make maximum length for each of the two image objects 17-3 and 17-4 is close to 90 degrees and the two line segments intersect almost perpendicularly. On the other hand, with image objects of a different sort, for example, the image objects 17-2 and 17-3, the angle becomes about 45 degrees.

In addition, in the digital information carrier shown in FIG. 17, all the image objects adjacent in the vertical direction are of different sorts, and it has a configuration in which only the image objects adjacent in the horizontal direction can form a cluster information carrier. It can be said that such a configuration is an important configuration in that the horizontal axis and the vertical axis can be judged easily based on the direction of the cluster information carrier.

The image objects which constitute cluster information carrier may be made mutually different only by the size. An example is shown in FIG. 18.

Figure 18:
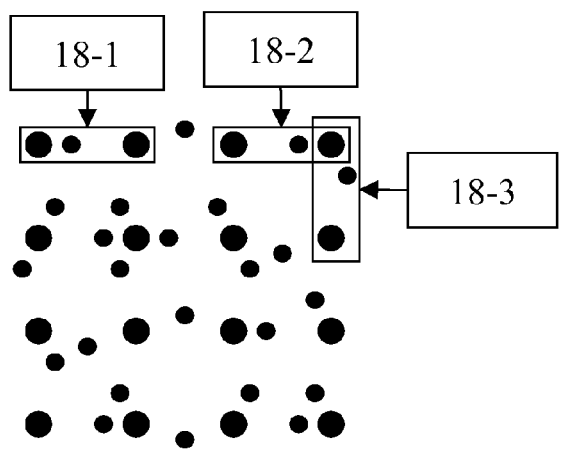
FIG. 18 illustrates an example which makes the image objects constituting a cluster information carrier mutually different only by the size.

FIG. 18 is the figure showing an example which makes the image objects constituting a cluster information carrier mutually different only by the size.

The digital information carrier shown in FIG. 18 is formed by arranging cluster information carriers constituted by image objects of the dot form of two different sizes. The cluster function based on the size of the dot and the threshold of the distance between dots defines a cluster information carrier which consists of two big dots and one small dot as shown in 18-1, 18-2, 18-3 of FIG. 18, etc. In recognition of one cluster information carrier, two dots are first sampled one by one from the recognized image. If it is judged that two sampled dots are the small dot S and the large dot L1, these are judged to belong to one cluster information carrier. Next, the cluster function judges about the small dot S recognized as the first parameter whether it constitutes a cluster information carrier between image objects which are different from the large dot L1 recognized as the second parameter. When the cluster function outputs a TRUE value as a result of the judgment, the dot concerning the judgment is recognized to be the 2nd big dot L2, and it is judged that one cluster information carrier is constituted by L1, S, and L2.

Figure 19:
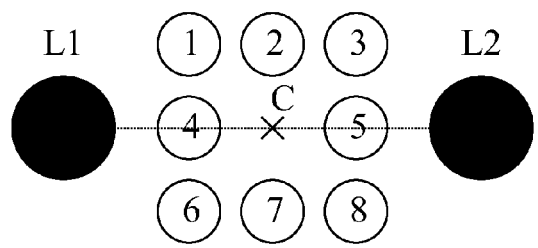
FIG. 19 illustrates an example of the rule for decoding the cluster information carrier concerning FIG. 18.

Here, if the characteristics of the cluster information carrier concerning FIG. 18 is explained, any one dot can serve as a constituent element of a plurality of cluster information carriers. That is, as shown in cluster information carrier 18-2 and cluster information carriers 18-3, cluster information carriers overlap mutually in part. Many advantages are acquired by permitting overlapping like this. The number of image objects needed in order to display a plurality of cluster information carriers decreases, and digital information carrier stops standing out on a document. It is important that this overlapping does not cause interference in coding of data here. Bit data may be coded in the relative arrangement of the image objects which do not overlap among the image objects which constitute cluster information carriers in order to realize such incoherency. FIG. 19 illustrated this. The arrangement of the small dot S between the big dots L1 and L2 is shown in FIG. 19. It is realized to constitute cluster information carrier wherein different numerical values are coded by arranging the small dot S in any of the positions shown by small outline circles of FIG. 19, and when each cluster information carrier is decoded, the numerical value shown in the circle correlating to the position where the small dot S is arranged is acquired.

The decoding method of cluster information carrier shown in FIGS. 18 and 19 is explained below.

First, the line segment which connects the centers of gravity of the big dots L1 and L2 is regulated.

Next, the coordinate of the small dot S are calculated and judged whether it is above the line segment, it is almost on the line segment, or it is below the line segment. When it is above the line segment, it is any of 1, 2, or 3 in FIG. 19, when it is almost on the line segment, it is any of 4 or 5 in FIG. 19, and when it is below the line segment, it is any of 6, 7, and 8.

Then, the distance |L1S| between the big dot L1 and the small dot S and the distance |L2S| between the big dot L2 and the small dot S are calculated and compared, and it is judged in which column the small dot S is.

Here, the maximum amount of information which can be held by a cluster information carrier may be 2 bits or 1 bit instead of 3 bits as shown in FIG. 19. A cluster information carrier which can hold the maximum amount of information of 1 bit is shown in FIG. 20, and a cluster information carrier which can hold the maximum amount of information of 2 bits is shown in FIG. 21.

Figure 21:
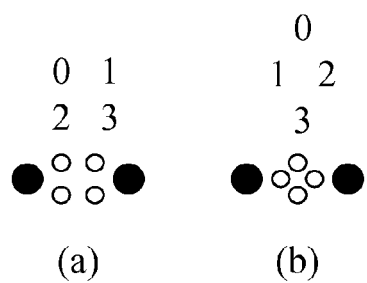
FIG. 21 illustrates an example of a rule for decoding a maximum of 4-bits of information from the cluster information carrier related to FIG. 18.

In reality, the digital information carrier shown in FIG. 18 is constituted by the cluster information carriers shown in FIG. 21, and two sorts of cluster information carriers shown in FIG. 21 are separately used in the direction of the horizontal axis and in the direction of the vertical axis in FIG. 18. For this reason, attribution of the axis is performed easily. The small dot S of the cluster information carriers 18-1 and 18-2 of the direction of the horizontal axis are arranged based on the arrangement configuration of (b) in FIG. 21. On the other hand, the small dot S of the cluster information carrier 18-3 of the direction of the vertical axis is arranged based on the arrangement configuration of (a) in FIG. 21.

Figure 20:
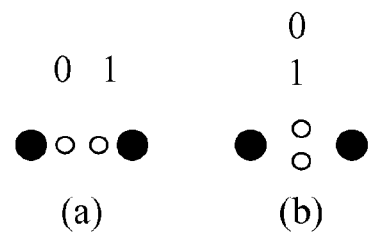
FIG. 20 illustrates an example of a rule for decoding a maximum of 2-bits of information from the cluster information carrier related to FIG. 18.

In addition, although only the cluster information carriers arranged in the direction of the horizontal axis are shown in FIGS. 19-21, the coding in the cluster information carriers of the direction of the vertical axis as shown by the cluster information carrier 18-3 of FIG. 18 is the same as that of the coding shown in FIGS. 19-21 only with the different axes of coordinate.

Figure 22:
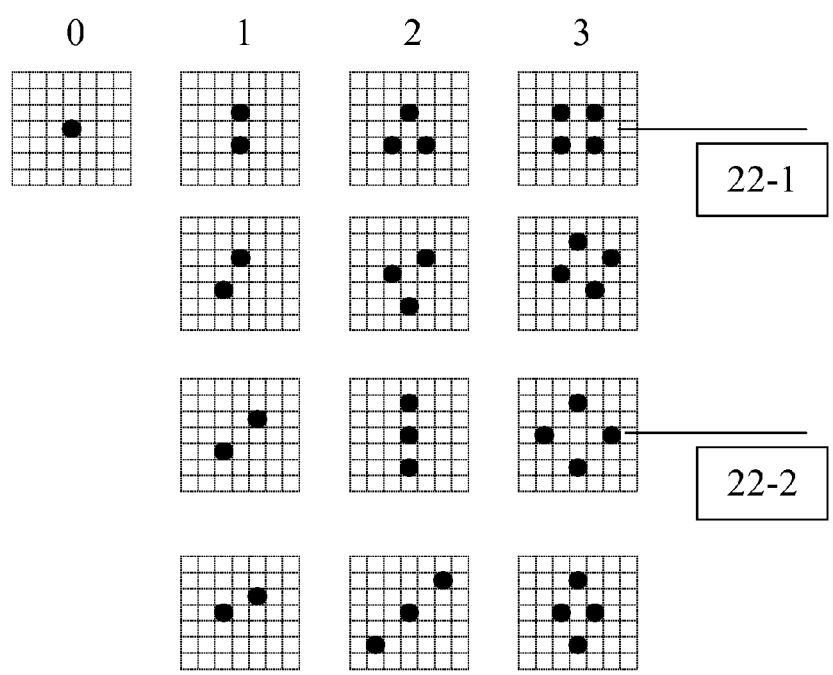
FIG. 22 illustrates an example of cluster information carrier which consists of one to four dots.

In addition, cluster information carriers which consists of different numbers of image objects are also effective, and this is explained using FIG. 22.

FIG. 22 is the figure showing an example of cluster information carrier which consists of one to four dots.

In this example, when cluster information carrier is decoded, the numerical value of 0 to 3 is acquired correlating to the number of constituent dots, and it has 2-bit information as cluster information carrier. In this case, since informational decoding is performed based only on the number of constituent dots, even if it differs as a display form, cluster information carrier which shows the same bit data (the number of bits) may exist. The example of this is shown in FIG. 22. Although some cluster information carriers shown in the direction of a column in FIG. 22 differ in the display form, since they have the same number of dots, when decoded, they show the same number of bits. It is only required for these cluster information carriers that the distance between the centers of gravity of each dot is smaller than the threshold regulated beforehand when a plurality of dots are arranged in the same cluster information carrier, and there are no requirements in the form or the size as cluster information carrier.

In addition, in order to respond to a raster type document display, in each cluster information carrier shown in FIG. 22, the constituent dot objects are arranged on the lattice at equal intervals. As a result, the cluster information carrier 22-1 and the cluster information carriers 22-2 are mutually distinguished by comparing the distance between the center of gravity of the dots.

Figure 23:
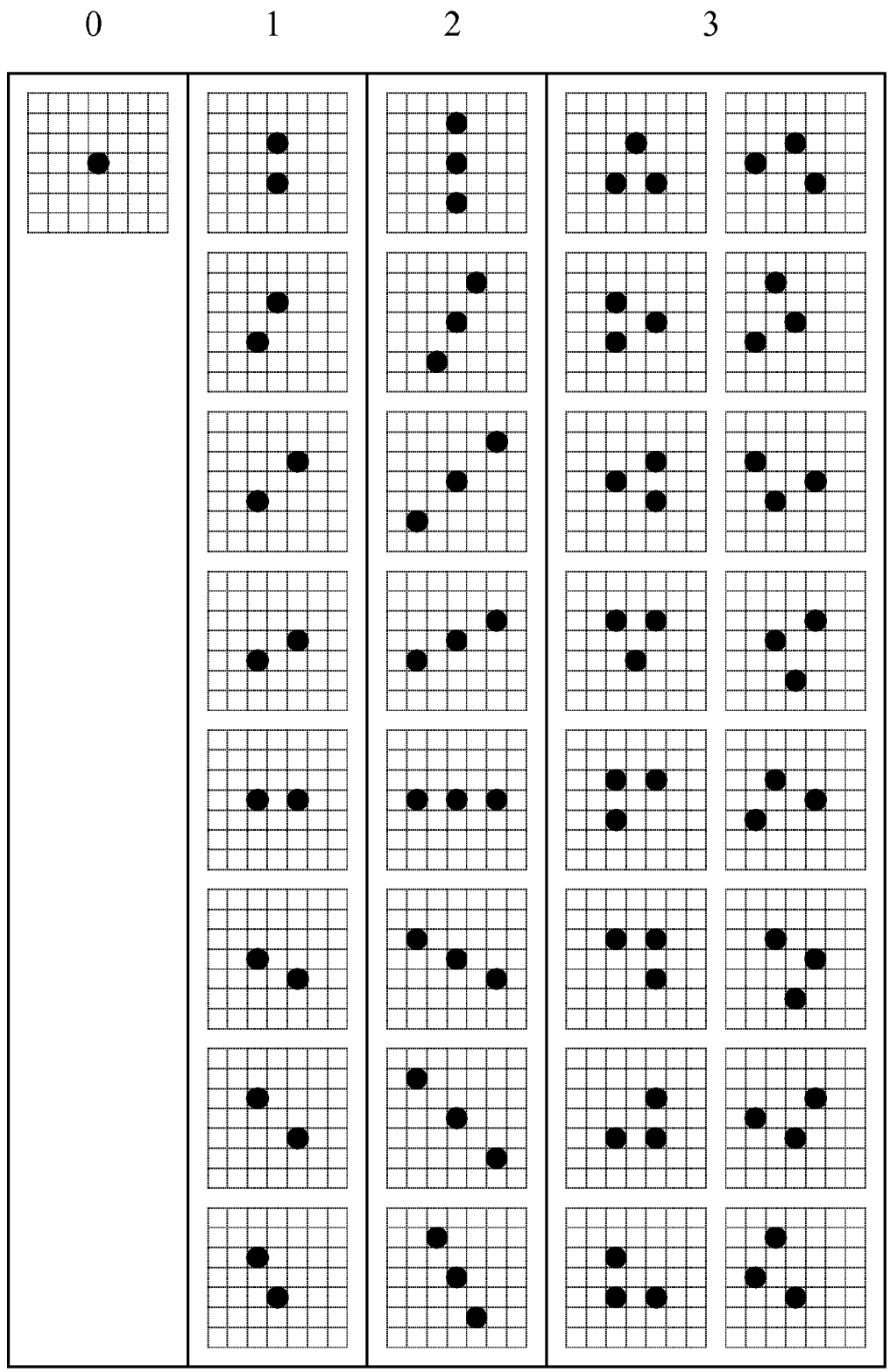
FIG. 23 illustrates an example of cluster information carrier formed by coding bit data in the form of the cluster information carrier.

In addition, coding may be performed based on the form of the cluster information carrier, and this is explained using FIG. 23.

FIG. 23 is the figure showing an example of cluster information carrier formed by coding bit data in the form of the cluster information carrier.

For example, as shown in FIG. 23, three dots may be classified into two groups based on whether the form formed by arranging them is a straight line or not. In the cluster information carrier shown in FIG. 23, the number of dots are 1 and 2 or 3, and decoding is performed based on the number of constituent dot objects and the form as cluster information carrier. Especially when number of dot objects is 3, the numerical value acquired by decoding is "2" in the case where the line which connects the three dots is a straight line, and it is decoded as "3" in the case where it is not a straight line. Here, like the cluster information carriers shown in FIG. 22, it should be noted that cluster information carriers which have the same information is obtained even if those are different in appearance, in spite of carrying out the judgment based on the form.

It is very important for a visually different display form to be selected with a certain amount of flexibility while having the same information. It is because it becomes possible to select the dot arrangement of a suitable form so that the appearance as the whole digital information carrier improves, or to select cluster information carriers of a form which gives less sense of incongruity visually to the existing document display when making bit data integrated to an existing document information.

Next, in order to give more detailed explanation of the invention of this application, a more practical and relatively simplified example is explained. A cluster information carrier constituted by having the distance between the center of gravity of two image objects of dot form which have the minimum distance being below the predetermined threshold is examined. Suppose this cluster information carrier has 2-bit information like the one shown in FIG. 13. Like this case, if the image object and cluster information carrier are simplified, the symmetry of the form of cluster information carrier becomes high. For this reason, it becomes relatively difficult to acquire the information about the coordinate axis or the direction from the form of cluster information carrier.

In such a case, it is desirable to give the information about the coordinate axis or the direction to the relative arrangement of cluster information carrier. Specifically, cluster information carriers may be arranged on a virtual lattice of some sort wherein the lattice interval is regulated beforehand. This arrangement interval of the cluster information carriers, that is, the lattice interval of a virtual lattice, is set to a greater value than the typical distance between the center of gravity of the image objects which constitute cluster information carrier. In addition, the interval of the direction of a row and the interval of the direction of a column are set based on different definitions, and it may be made possible to identify a line and a column easily. When the arrangement interval of the row and the column are set appropriately, even if geometrical modification is performed to the image recognized in the process of decoding processing, the row and the column are identified easily.

Figures 24, 25:
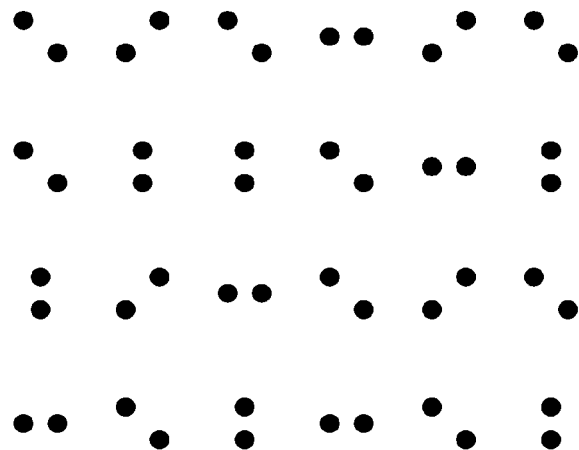
FIG. 24 illustrates an example of digital information carrier wherein the information for identifying the coordinate axis is contained in the arrangement interval of the cluster information.
FIG. 25 illustrates an example of the virtual block concerning the invention of this application.

An example is shown in FIG. 24. The figure is showing an example of digital information carrier wherein the information for identifying the coordinate axis for the arrangement interval of cluster information carriers is contained. In FIG. 24, the lattice interval of which the vertical direction differs from that of the horizontal direction, that is, the vertical lattice interval is greater than the horizontal lattice interval, is applied.

Although how recognition of cluster information carrier is performed has been explained, how cluster information carrier is useful also in the stage of image recognition is explained here.

It is known well that the recognition processing speed of digital information carrier coded in dot form often falls due to the noise and blots on the display called ghost dots. In order to distinguish this ghost dot from a true dot, a virtual lattice of some sort for arranging image objects may be used. For example, when a true dot is arranged on the lattice at a constant interval already regulated, the lattice is recognized first, and a ghost dot is next distinguished from a true dot by the positional relationship of the lattice and the dot.

However, regulating the lattice interval of this virtual lattice is facing a very difficult problem. For example, when quite a large number of ghost dots are contained in a document, recognition of the virtual lattice itself becomes especially difficult. For this reason, exclusion of ghost dots may not be performed appropriately.

On the other hand, by the invention of this application, since the cluster function which judges whether each image object constitutes cluster information carrier is applied before decoding, ghost dots are effectively eliminated in this process.

For example, in image processing, when the image shown in FIG. 24 is recognized, since the dot which has at least one dot nearby may constitute a cluster information carrier, it is classified as a true dot. On the other hand, the dot which has no dot nearby is classified as a ghost dot.

Of course, one ghost dot may exist by chance near the dot which constitutes a cluster information carrier. However, the image objects which constitute a cluster information carrier in this case become three. On the other hand, in the digital information carrier shown in FIG. 24, a cluster information carrier does not consist of three dots. For this reason, it is not recognized that the dots containing the ghost dot constitute a cluster information carrier. And since the cluster function regulates the mutual relationship of the dots which constitute a cluster information carrier, by the clustering function, two true dots are selected from three dots and the ghost dot is eliminated, and an appropriate cluster information carriers may very well be recognized.

In addition, a possibility of finding out a ghost dot in image processing increases by narrowing the true dot interval which constitutes cluster information carrier and by increasing the interval between cluster information carriers.

On the other hand, when a cluster information carrier consists of different image objects, a ghost dot is more efficiently removed in image processing. For example, in the cluster information carrier shown in FIG. 1, only the dots arranged with a predetermined distance from both ends of a line segment can be the true dots. Thus, since the relationship of the image objects which constitute a cluster information carrier is regulated beforehand, a ghost dot is easily discovered by using the relationship. In addition, although a specific mode was used in the above-mentioned explanation in order to promote understanding about the use of such a relationship of image objects, these are only an illustration and the invention of this application is not limited by the above-mentioned explanation.

Return to FIG. 24 again. A cluster information carrier by the dot pattern is shown in FIG. 24 as an example. This dot pattern can hold a maximum of 2 bit per one cluster information carrier, and can be displayed on the surface of any sizes. It is shown below that it is possible to decode the absolute position of the recognition range more efficiently and to display the digital information carrier concerning the positional information in the shape of a carpet using this dot pattern according to this invention.

The concept of a virtual block is explained first.

In some prior art, unifying the bit data decoded from a plurality of image objects and forming a logical block is disclosed. The logical block is effective at the point that it can hold more information than the image object itself can. For example, when an image object itself only shows 0 and 1, with a logical block formed by unifying ten of these, in the case of forming the positional information using the above-mentioned reference bit arrangement, $2^{10}-1$ (=1023) positions can be identified.

The virtual block introduced by the invention of this application is formed by creating a block at a virtual level with a plurality of bit data formed by decoding the smallest unit (it may be a single image object or the above-mentioned cluster information carrier, and may be called "unit information carrier") in decoding. Overlapping between logical blocks is permitted by introducing the concept of a virtual block, control on the level of redundancy is enabled, and recovery is further enabled when the image is incorrectly recognized.

Hereafter, the position recognition using a virtual block is explained in detail using as an example the case where a cluster information carriers is selected as the smallest unit (unit information carrier) in decoding. Position recognition shall be performed based on line shape coding as shown in FIG. 4. That is, a bit arrangement of a predetermined length from a virtual block is formed, and by judging which position this forms of the partial arrangement for the reference bit arrangement, the positional information shall be acquired by the offset value showing the starting point of the partial arrangement.

In addition, the size of a virtual block required for position recognition is selected as follows. First, the number of coordinates required for position recognition is determined from the size of the document on which digital information carrier is displayed and the size of cluster information carrier. Next, the number of cluster information carriers needed in order to carry out position recognition, that is, the bit arrangement length, is determined from the number of coordinates and the amount of information which cluster information carrier can hold. Then, the size of a virtual block is determined by taking into consideration the display arrangement interval of cluster information carriers.

An example of the virtual block concerning the invention of this application is shown in FIG. 25.

A digital information carrier of six rows and eight columns is shown in FIG. 25 as an example. However, in FIG. 25, cluster information carrier which is a constituent element is not shown directly, but the bit numerical value for identifying the coordinate of the X-axis direction and the bit numerical value for identifying the coordinate of the Y-axis direction from the bit data formed by decoding cluster information carrier are calculated, and are equivalent to corresponding arrangement element of the reference bit arrangement.

If the case where the notation Xm/Yn in the top/bottom of the cell is used, the bit numerical value for the X-axis direction obtained from cluster information carrier arranged in the correlating position shows that it is the same as that of the bit numerical value acquired by offsetting by m the reference bit arrangement (the bit numerical value which serves as the m+1st arrangement element of the bit for reference in other words). In addition, the bit numerical value for the Y-axis direction shows that it is the same as that of the bit numerical value acquired by offsetting by n the reference bit arrangement.

Therefore, cluster information carrier concerning FIG. 25 needs to hold the information which can be distinguished in four ways of (the bit numerical value for the X-axis direction, the bit numerical value for the Y-axis direction)=(0, 0), (1, 0), (0, 1), (1, 1), and therefore, it needs to be the something wherein at least 2 bits can be coded.

In addition, the reason for not directly displaying cluster information carrier in FIG. 25 is to make understanding easy.

For this digital information carrier, 12 is selected as the number of cluster information carriers which constitute a virtual block, and a region of a shape of a matrix of three rows and four columns is set as a virtual block. In this case, $2^{12}$ combinations are possible for a virtual block, and it is possible to form a bit arrangement with an arrangement length of 12 from this virtual block. In addition, the maximum number of positional coordinates which can be identified using this bit arrangement and a suitable arrangement for reference is 212-1. Moreover, if row width and column width of cluster information carrier are set to 4:3, the region of three rows and four columns which constitute a virtual block becomes a square.

The bit arrangement with arrangement length of 12 is formed from the virtual block obtained this way as follows.

For the bit numerical value of the X-axis direction, by using the upper left end of the virtual block as the starting point, and using the X-axis positive direction to serve as the main scanning direction and the Y-axis negative direction as the sub-scanning direction, and unifying the bit numerical values of the X-axis direction one by one, a bit arrangement with arrangement length of 12 is formed.

On the other hand, for the bit numerical value of the Y-axis direction, by using the upper left end of the virtual block as the starting point and using the Y-axis negative direction to serve as the main scanning direction and the X-axis positive direction as the sub-scanning direction, a bit arrangement with arrangement length of 12 is formed similarly.

The bit arrangement obtained this way forms a partial arrangement having the arrangement length of 12 in the reference bit arrangement for both the X-axis direction and the Y-axis direction. In addition, this applies even if any square region of three rows and four columns in the matrix shown in FIG. 25 is selected to constitute a virtual block.

For example, the bit arrangement of the X-axis direction obtained from the virtual block 25-1 shown with a dashed line in FIG. 25 makes the partial arrangement with the arrangement length of 12 obtained by offset "0" from the reference bit arrangement, and the bit arrangement of the Y-axis direction also makes the partial arrangement having the arrangement length of 12 obtained by offset "0" from the reference bit arrangement. In addition, in the virtual block 25-2 shown with a solid line, the bit arrangement of the X-axis direction is the partial arrangement of offset "1", and the bit arrangement of the Y-axis direction is the partial arrangement of offset "3."

This way, the virtual block concerning this invention can be built regardless of the cluster information carrier used as the starting point. Thus, it becomes possible for some virtual blocks to overlap each other as shown by the virtual block 25-1 (dashed line), 25-2 (solid line), and 25-3 (dotted line) in FIG. 25. This is the point which differs greatly from prior art. In prior art, the block which shows the positional information constituted on the surface on which digital information carrier is displayed is arranged mainly in the shape of tiles, that is, without overlapping each other, in many cases.

Here, the arrangement of the bit numerical value of each axis of the digital information carrier in FIG. 25 is explained in a little more detail. The bit numerical value vx of the X-axis direction of row p and column q and the bit numerical value vy of the Y-axis direction are expressed as follows, when an upper left end is zero row of zero column and the bit numerical value in the offset m of the reference bit arrangement is bm.

$$vx=b(4*p+q) \quad \text{(Formula 1)}$$

$$vy=b(p+3*q) \quad \text{(Formula 2)}$$

When this is generalized, and when the number of cluster information carriers which constitute a virtual block is N, the number of columns of a virtual block is r, and the integer obtained by rounding up N/r is c, Formula 1 and Formula 2 become as follows, respectively.

$$vx=b(r*p+q) \quad \text{(Formula 3)}$$

$$vy=b(p+c*q) \quad \text{(Formula 4)}$$

That is, in digital information carrier formed by coding the bit numerical value of each axis of p rows and q columns to satisfy formulas 3 and 4, it is realized to form the virtual block which consists of c rows and r columns in arbitrary places.

When the coordinate axis in the above contents is also generalized and is expressed in another way, it becomes as follows.

When the i-axis positive direction is used as the main scanning direction and the j-axis positive direction as the sub-scanning direction, two bit numerical values v (i, j) and v (i+1, j) adjacent in the main scanning direction (the i-axis positive direction) satisfy the following formulas 5 and 6.

$$v(i,j)=bm \quad \text{(Formula 5)}$$

$$v(i+1,j)=bm+1 \quad \text{(Formula 6)}$$

On the other hand, two bit numerical values v (i, j) and v (i, j+1) adjacent in the sub-scanning direction (the j-axis positive direction) satisfy the following formulas 7 and 8, when the arrangement length of the main scanning direction of a logical block is a.

$$v(i,j)=bm \quad \text{(Formula 7)}$$

$$v(i,j+1)=bm+a \quad \text{(Formula 8)}$$

In order to apply to the bit numerical value vx of the X-axis direction, since the main scanning direction for bit arrangement formation is the X-axis positive direction and the sub-scanning direction is the Y-axis negative direction, the i-axis positive direction is set as the X-axis positive direction and the j-axis positive direction as the Y-axis negative direction. In addition, in order to apply to the bit numerical value vy of the Y-axis direction, the i-axis positive direction is set as the Y-axis negative direction and the j-axis positive direction as the X-axis positive direction.

The concept of the virtual block concerned may be extended and the content of the virtual block for showing unit positional information and the form of the virtual block may be separated. This is explained using FIG. 26.

FIG. 26 is the figure showing an example of virtual blocks with flexible forms.

If the concise definition of a virtual block is "a group which can form the predetermined bit arrangement having the arrangement length of 12 by at least one of the bit numerical value of the X-axis direction and the bit numerical value of the Y-axis direction," the four regions which consist of 12 elements surrounded by the bold lines in FIG. 26, that is, 26-1 to 26-4, are all virtual blocks.

If the groups 26-1 and 26-2 surrounded by the bold solid line in FIG. 26 (*a*) are unified using the upper left end as the starting point, the X-axis positive direction as the main scanning direction and the Y-axis negative direction as the sub-scanning direction, the bit arrangements obtained become X16 to X27 and X2 to X13, respectively, and the offset values become consecutive. For this reason, all serve as the partial arrangements of the reference bit arrangement and become virtual blocks.

In addition, if the bit numerical values of the Y-axis direction are unified for the groups 26-3 and 26-4 surrounded by the bold solid lines in FIG. 26 (*b*) and a bit arrangement is formed, they become Y0 to Y11 and Y13 to Y24, respectively.

Since each of these serve as the partial arrangement of the reference bit arrangement, the groups 26-3 and 26-4 become virtual block.

Here, it should be noted that the virtual block for recognizing the bit arrangement of the X-axis direction and the virtual block for recognizing the bit arrangement of the Y-axis direction may be defined independently. For this reason, it is permitted that the bit numerical value about the X-axis direction and the bit numerical value about the Y-axis direction can be decoded from different cluster information carriers in a group of recognized digital information carriers.

Thus, when the bit arrangement of one direction of the coordinate axis is obtained from a virtual block, in order to generate positional information using other reference bit arrangement having a longer arrangement length, this bit arrangement may be used. That is, the positional information may be generated using a plurality of bit arrangements for reference.

In addition, it should also be noted that the form of a virtual block does not have to be a square of three rows and four columns in as this case. This is because the only requirement of a virtual block is to contain a predetermined number of cluster information carriers formed by coding consecutive bit numbers, and the form of the whole block is arbitrary.

Figure 27:
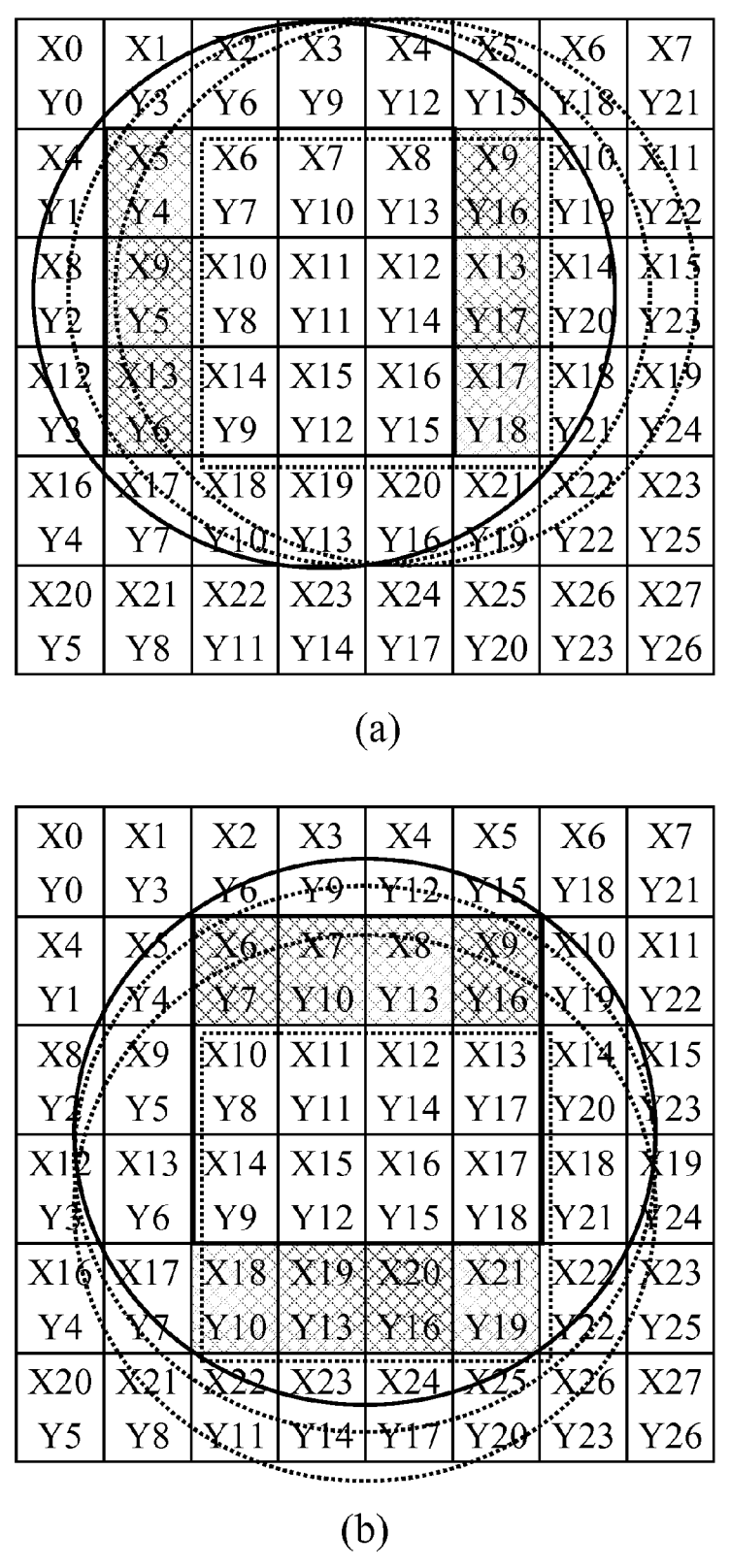
Figure 28:
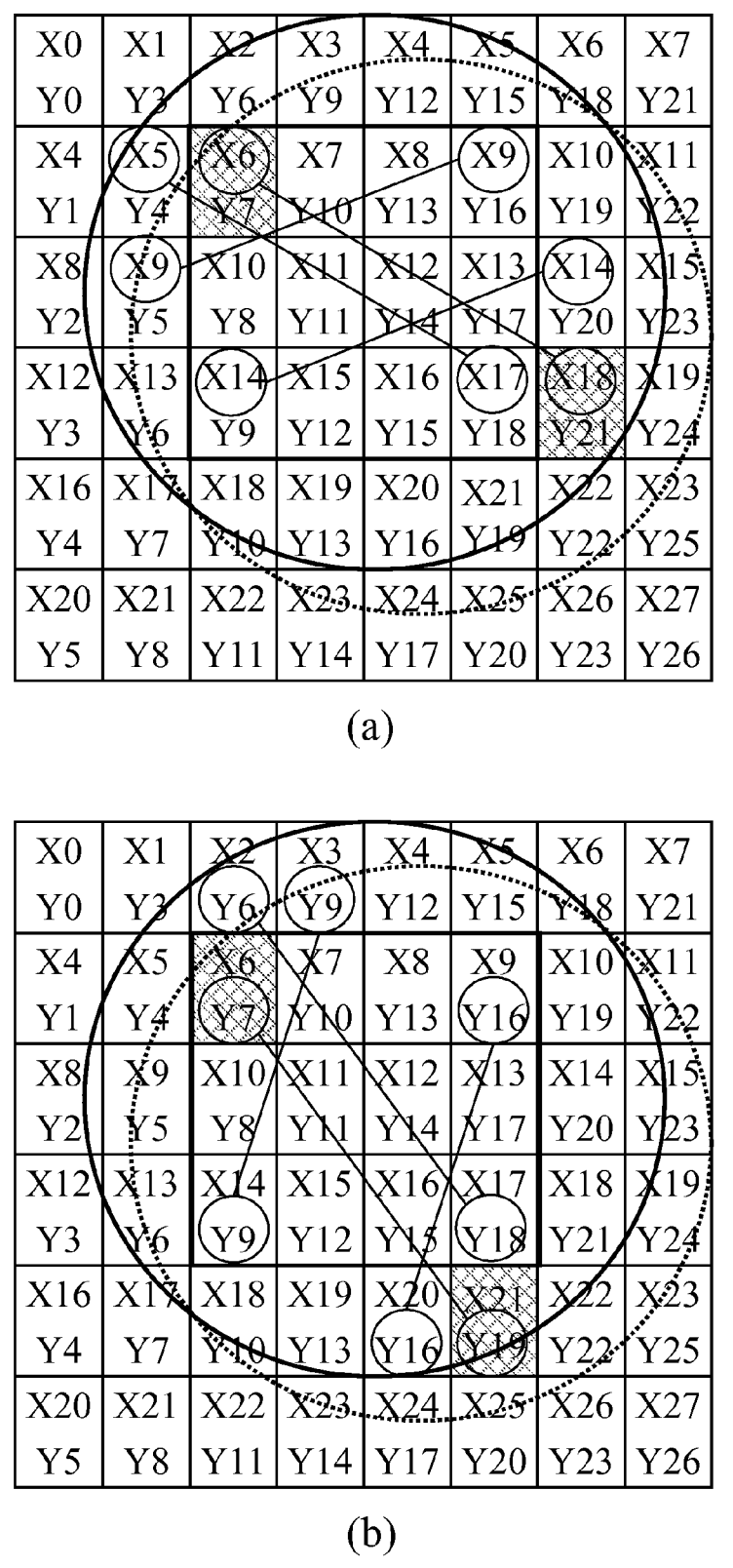

The explanation of a virtual block is further continued using FIGS. 27 and 28.

FIG. 27 is the figure wherein a virtual block and the recognition range are displayed on an example of the bit matrix formed by decoding digital information carrier.

FIG. 28 is the figure wherein virtual block and the matrix element which can be mutually replaced with the recognition range are displayed on an example of the bit matrix formed by decoding digital information carrier.

One of the virtual block regions is shown in FIG. 27 by the bold line. In addition, the circle by the solid line is an example of the recognition range which includes the virtual block. Moreover, the recognition range is a range recognized by a series of image recognition processing, and only the cluster information carriers contained in the recognition range can serve as constituent elements of a virtual block in a series of processing. The recognition range shifts by movement of the input device, and the number of cluster information carriers in the recognition range also shifts in connection with this. For example, the cluster information carrier contained in the recognition range of the solid line of FIG. 27 (*a*) has the shape of a rectangle of three rows and five columns, and the one in the recognition range of the solid line of FIG. 27 (*b*) has the shape of a rectangle of four rows and four columns.

Here, when the recognition range moves a little horizontally in FIG. 27 (*a*) and assumes the position of the dashed line circle, for example, it becomes difficult to recognize the cluster information carrier of X5Y4 and the cluster information carrier of X13Y6 which could be recognized in the recognition range denoted by the solid line circle. In addition, when it moves to the position of the dotted line circle, it becomes difficult to recognize all the cluster information carriers (X5Y4, X9Y5, and X13Y6) of the column on the left end of the virtual block shown by the bold line. For this reason, it becomes difficult to recognize a virtual block having X5Y4 as the starting point, and it also becomes seemingly difficult to acquire the information which is obtained by decoding this virtual block and is related to position recognition.

However, even in this case, by removing the above-mentioned left end column in the virtual block shown by the bold line from the virtual block, and by, instead adding X9Y16, X13Y17, and X17Y18 as the right end column, a new virtual block which uses X6Y7 as a starting point as shown by the dashed line is constructed. For this reason, the one which uses X6 to X17 as elements for the bit arrangement of the X-axis direction and Y7 to Y18 as elements for the bit arrangement of the Y-axis direction is formed by decoding this virtual block, and the information concerning position recognition is acquired based on this. In addition, even if the positional information in this case differs from the positional information acquired from the virtual block formed by using X5Y4 as the starting point which has been recognized in the solid line circle, since the difference is correlated to the movement of the recognition range, this is not problematic.

In addition, the same can be said for the movement of the virtual block accompanying vertical movement, as outlined in FIG. 27 (*b*).

When the recognition range moves to both the X-axis and the Y-axis, as it is shown in FIG. 28, a virtual block moves. When it moves from the recognition range shown with the solid line circle in the direction of the lower right and moves to the recognition range shown with the dashed line circle, it becomes difficult to recognize the cluster information carrier of X6Y7 of the upper left end among the virtual blocks expressed with the bold line. When this cluster information carrier cannot be recognized, the remaining virtual block will include 11 bit numerical values (X7-X17) of the X-axis direction and 11 bit numerical values (Y8-Y18) of the Y-axis direction.

In order to complete the virtual block concerning the X-axis direction here, it is good to complement the cluster information carrier which shows X6 or X18. Thus, in this invention, as shown in FIG. 28 (*a*), it is possible to complement by X18Y21 to reconstruct a virtual block. Similarly, in order to complete the virtual block of the Y-axis direction, X21Y19 is used as shown in FIG. 28 (*a*).

It should be noted that the form of the virtual block is no longer a square of three rows and four columns in these cases. Since the block form is arbitrary for a virtual block, it becomes possible to select a suitable form according to cluster information carrier contained in the recognition range. For this reason, the range needed as a recognition range becomes narrower compared with the case where logical block by prior art in which the block form is fixed is employed, and it is realized to set the number of cluster information carriers contained in the recognition range fewer. Therefore, image processing required for position recognition can be managed in a short time.

It may be possible to also decode 12 or more bit arrangements depending on the place of the recognition range. For example, in the recognition range after movement shown with the dashed line circle, X19Y13, X20Y16, and X21Y19 can be decoded as the X-axis direction, and X14Y20 and X18Y21 can be decoded as the Y-axis direction.

In addition, it may become difficult to recognize cluster information carriers other than those constituting the starting point among the cluster information carriers which serve the angle parts of a virtual block depending on move direction of the recognition range. In forming the bit arrangement of the X-axis direction, correspondence when recognizing becomes difficult this way is shown in FIG. 28 (*a*). In the virtual block shown by the bold line, when it becomes impossible to recognize X9Y16 of the upper right end, a virtual block may be build by using X9Y5 of the direction of the lower left instead of X9Y16. In the newly built virtual block, the consecutive bit arrangements from X6 to X17 are formed by the unifying method until now which uses the X-axis positive direction as the main scanning direction and the Y-axis negative direction as the sub-scanning direction with the upper left end as the starting point. Similarly, the consecutive bit arrangements from X6 to X17 are formed by using X5Y4 of the direction of the upper left in the case where recognition of X17Y18 of the lower right end is difficult, and by using X14Y20 of the direction of the upper right when in the case of X14Y9.

The absolute same is said for the bit arrangement of the Y-axis direction, and the correspondence relationship of the replacement in the virtual block shown by the bold solid line is shown in FIG. 28 (b).

A virtual block reconstructed by the move direction of the recognition range has a part of cluster information carrier serving as the constituent element of the virtual block before movement is replaced this way. For this reason, regardless of the direction of the movement, many constituent elements of the virtual block reconstructed have the constituent elements of the virtual block before movement as overlapping portion. Therefore, in image processing of a new virtual block, many of the data of the virtual block before movement are used, and the loss of the processing based on having reconstructed the virtual block is suppressed to the minimum. On the other hand, in the logical block of the shape of a tile by prior art, the new logical block constituted by movement cannot use the data of the logical block before movement at all.

In addition, when the recognition range moves diagonally and it becomes impossible to recognize three cluster information carriers which constitute an end of a virtual block, the cluster information carriers which became difficult to recognize are not replaced individually, but a new virtual block is built by moving the virtual block as a whole as it is in the shape of a square to the diagonal direction correlating to the movement of the recognition range.

The parameter for which a scan type or a block recognition type image input device is asked is determined by the circular recognition range used in the above-mentioned explanation. For example, in the case of the image input range of a typical rectangle, it is required first to contain the above-mentioned recognition circular. Next, the number of pixels assigned for every cluster information carrier is calculated from the physical resolution of the image input device. This is because the level of recognition errors and the image-processing speed in the image recognition depend on the number of assigned pixels. Specifically, when there is a large number of assigned pixels, since the number of pixels which constitute an image object increases incorrect recognition is not likely to occur but calculation load also increases. On the other hand, although calculation load decreases when a small number of pixels are assigned, since the difference in the number of pixels between an image object and a ghost dot decreases, the rate of occurrence of recognition errors rises.

Although explanation was given above by assuming 12 as the number of cluster information carriers which constitute a virtual block, the number is essentially arbitrary. Even if a virtual block is constituted from ten cluster information carriers, there is no change at all in the arrangement of cluster information carrier. Only the arrangement length of the bit arrangement obtained from the virtual block becomes 10. In addition, by this change, the number of bits which can be used in order to acquire positional information decreases, and the number of coordinates which a digital information carrier can display becomes 210-1 from 212-1.

Or, even if the arrangement length of the bit arrangement used in order to acquire positional information is 10, 12 cluster information carrier arrangements may be read to generate a bit arrangement having the arrangement length of 12 as explained so far. In this case, since it is ok as long as there are partial arrangement of length 10 in order to acquire positional information, the two remaining bit numerical values are used as redundant data. It should be noted that this redundant data can fully be utilized. It is because the arrangement length of the bit arrangement required for decoding and the arrangement length of the recognized cluster information carrier arrangement are completely independent. For this reason, it is possible to increase the number of redundant data further and to improve a display method or an input method which causes incorrect recognition, and to elongate the arrangement length of cluster information carrier arrangement. In addition, the bit numerical values from the cluster information carrier that are used as redundant data are arbitrary. When using the virtual block 25-1 of FIG. 25 as an example, the first two bit numerical values (X0 and X1) about the X-axis direction may be redundant information, or it may be the last two (X10 and X11). Or, it may be the first and the last (X0 and X11). Furthermore, cluster information carriers correlating to the bit numerical values used as redundant data may differ in the X-axis direction and the Y-axis direction.

The redundant data contained in a virtual block can be used for judging the existence of incorrect recognition, or it can be used for correcting when there is incorrect recognition. When the display distortion value of each cluster information carrier is acquired, redundant data can also be set so that the one having the highest reliability level in the cluster information carrier with redundant data is included in the cluster information carrier arrangement to actually acquire positional information. In addition, correcting recognition errors is realized also by combining the data obtained from the recognized cluster information carrier in the recognition range and in the range outside of a virtual block with redundant data. For example, if there is one which shows the same bit numerical value as any of the cluster information carriers that constitute a virtual block and are in a cluster information carrier in the range outside of a virtual block, the cluster information carrier with highest reliability may be used for identifying positional information by measuring the amount of distortion of each cluster information carrier.

This is explained using FIG. 27 (a). X9Y5 and X9Y16 are contained in the recognition range shown with the solid line, and X9 is contained in the cluster information carriers as the bit numerical value of the X-axis direction. In this case, as a result of decoding of the two cluster information carriers, when two different numerical values are obtained, although they both should be a numerical value which means X9, it is necessary to judge which value is closer to the truth. At this time, it is good to consider true the decoded bit numerical value that corresponds to the smaller distortion value of both cluster information carriers. In addition, cluster information carrier which was not used for decoding may be presumed to have low reliability and this cluster information carrier should not be used for decoding the bit of the Y-axis direction. In a specific explanation, when X9Y16 has a higher distortion value, the bit of the X-axis direction is decoded using X9Y5, and for decoding the bit of the Y-axis direction, X20Y16 which has the same bit numerical value of the Y-axis direction in the recognition range is used instead of using X9Y16.

In addition, in order to regulate the direction of the bit arrangement decoded and recognized, such redundant data may be used. This point is explained using FIG. 29.

Figures 29, 30:
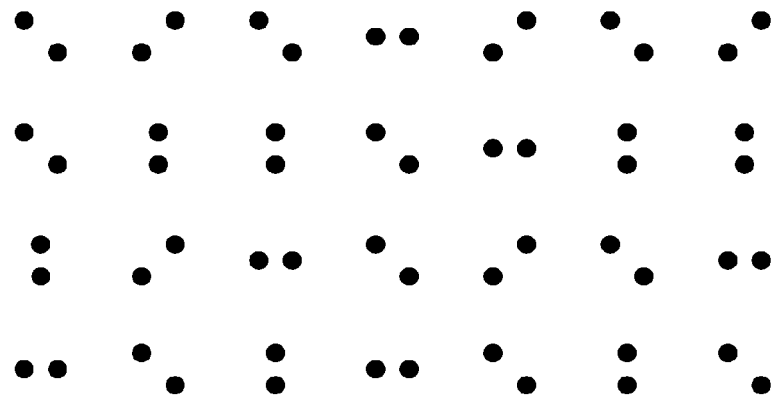
FIG. 29 illustrates an example of digital information carrier which uses cluster information carrier having high symmetry and does not have directional dependency in the cluster information carrier interval.
FIG. 30 illustrates another example of the virtual block concerning the invention of this application.

FIG. 29 is showing an example of a digital information carrier which uses cluster information carrier with high symmetry and which does not have directional dependency in the cluster information carrier interval.

Even if a virtual block is decoded and a bit arrangement is obtained, in the case of a digital information carrier as shown in FIG. 29, it is impossible to perform attribution of the X-axis direction and the Y-axis direction. In order to solve such ambiguity, the cluster information carrier arrangement is first obtained by the predetermined method and the virtual block of the unknown direction is recognized. Next, the bit arrangement of a predetermined length, required in order to obtain positional information from the bit arrangement formed by decoding the arrangement is extracted, and positional information is acquired. The procedure is as shown in FIG. 5, and the offset value in the case where the bit arrangement constitutes the partial arrangement of the reference bit arrangement is obtained as the information showing the position. Then, it is confirmed whether the bit arrangement which consists of the whole cluster information carrier arrangements also containing redundant data other than the bit arrangement used in order to acquire positional information constitutes the partial arrangement in the reference bit arrangement. In the case where it does not constitute a partial arrangement, the recognition direction of the virtual block may be unsuitable so the obtained bit arrangement is the reverse of the original bit arrangement meaning that the reversed bit arrangement matched the partial arrangement of the bit reference arrangement by chance. Thus, in such a case, the bit arrangement obtained from the virtual block is reversed, and the same confirmation work is performed. That is, by performing comparison with the reference bit arrangement using a bit arrangement longer than the necessary minimum arrangement length in order to acquire positional information, deriving wrong offset values from the reversed bit arrangement obtained due to the unsuitable recognition direction and thus false position recognition can be avoided.

In addition, when the bit arrangement containing redundant data also constitutes the partial arrangement, the bit arrangement is obtained from a virtual block similarly in the direction of an axis which intersects perpendicularly this time, and positional information is acquired while confirming the direction. Since attribution of the axis is not performed for the information about the set of coordinates acquired this way, it is unknown which the X-axis is. However, since the positive direction of each coordinate axis has been determined by the above-mentioned technique, from this information the X-axis can be unambiguously identified. This is because the axis on the right-hand side of each configuration vector is the X-axis and the axis on the left-hand side is the Y-axis for the same starting point and both axes shown in a vector shape. This way, the coordinates of each axis are correctly understood.

However, the coordinates acquired this way are preliminary coordinates which are not the final coordinates showing the position of the recognition range, and it is needed to perform conversion according to the coordinate system of the document. This point is explained using FIG. 30. that shows another example of the virtual block concerning the invention of this application.

As shown in FIG. 30, the bit arrangements of the X-axis direction are completely identical for the virtual block 30-1 shown by the dotted line and the virtual block 30-2 shown by the solid line. And thus, these give identical X coordinate values. From this, the line segment which connects the cluster information carrier of the upper left end of each virtual block is recognized to be parallel to the Y-axis. The line segment which connects the cluster information carrier of the upper left end of each of the virtual block 30-2 shown by the solid line and the virtual block 30-3 shown by the dashed line is similarly recognized to be parallel to the X-axis. Therefore, it can be said that the two line segments shown in FIG. 30 visualize the initial stage coordinate system obtained by the arrangement of cluster information carriers which has been explained as an example here.

The relationship of the coordinates (X, Y) acquired by decoding and correlating matrix arrangement (R, C), that is, the coordinates on a document, is calculated as follows based on Formulas 1 and 2.

$$R=(3*X-Y)/11 \qquad \text{(Formula 9)}$$

$$C=(4*Y-X)/11 \qquad \text{(Formula 10)}$$

By applying the formula concerned, the arrangement position of the center of gravity of the cluster information carrier of the upper left end of the decoded virtual block is identified. Once the position of the center of gravity is identified, the center of the recognition range, the direction, and other parameters are easily found by using the existing technology.

It has been explained so far by using cluster information carriers arranged in three rows and four columns as a virtual block. But, it is not restricted to this arrangement. A virtual block may have any number of arrangements and any arrangement form. However, the coefficient of Formulas 9 and 10 also change according to the size of a virtual block. When the size of a virtual block is c rows and r columns, specifically, it is as follows.

$$R=(c*X-Y)/(c*r-1) \qquad \text{(Formula 11)}$$

$$C=(r*Y-X)/(c*r-1) \qquad \text{(Formula 12)}$$

In addition, although explanation has been given using cluster information carriers as the constituent elements of a virtual block, some or all of the constituent elements may be image objects.

Furthermore, arrangement of cluster information carriers is performed independently of the virtual block arrangement, and it may be made so that the arrangement relationship carry information independently of the virtual block. An example is shown in FIG. 31.

Figure 31:
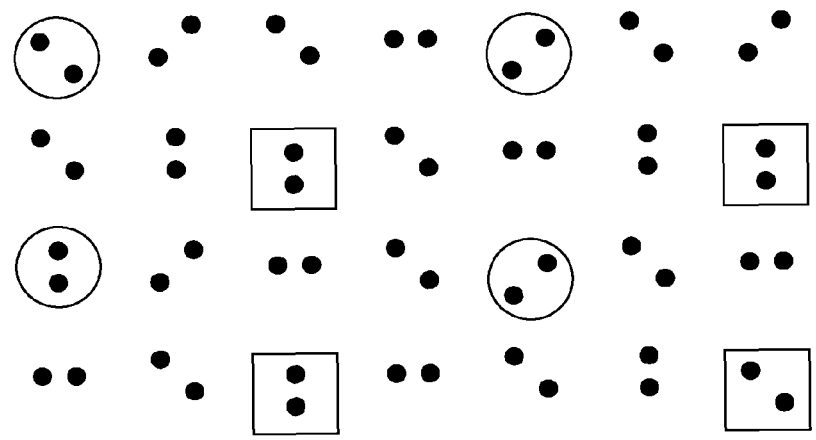
FIG. 31 illustrates an arrangement wherein cluster information carriers surrounded with a rectangle or a circle are arranged out of alignment a little downward than other cluster information carriers for the digital information carrier shown in FIG. 29.

FIG. 31 shows the case wherein cluster information carriers surrounded by a rectangle or a circle are arranged out of alignment, a little more downward than the other cluster information carriers for the digital information carrier shown in FIG. 29.

Every fourth cluster information carriers is displaced downward out of alignment for all rows as can be clearly seen in FIG. 31. However, in order to avoid appearance of specific patterns on the display medium, etc. and to create a more uniform distribution, the columns of cluster information carrier that are displaced downward differ between odd rows (surrounded with the circle) and even rows (surrounded with the quadrangle).

According to this arrangement, the direction of the document is obtained as follows. First, four consecutive cluster information carriers of the direction of a row or the direction of a column are recognized as a bundle.

Next, four sorts of subsets formed by removing one cluster information carrier from the four cluster information carriers are made.

Then, straight line approximation is performed with the three constituting cluster information carriers of each subset, and the subset wherein the error value is the minimum in the approximation is selected.

Finally, the center of gravity of one cluster information carrier which does not constitute the selected subset, that is, of the cluster information carrier out of alignment downward, is substituted in the approximation straight line of the subset.

When the result of this substitution is positive, it is judged that the approximation straight line shows the X-axis direction, and that the direction from the left to the right is the positive direction.

On the other hand, when the result of the substitution is negative, it is judged that the approximation straight line was recognized in a reversed state and the X-axis direction is derived although it is necessary to perform 180-degree rotation of the image and to reverse the direction of the axis.

Or, when the result of subtraction is close to 0, it means that the four cluster information carriers are almost on the straight line, and in this case, since it is judged that the approximation straight line shows the Y-axis direction, the cluster information carrier is recognized in the direction perpendicular to this approximation straight line, the same processing is performed, and the direction confirmation of the X-axis is performed.

It should be noted that direction recognition is performed completely independently of the information which the cluster information carrier has individually. However, the above-mentioned arrangement is a mere illustration and the unit information carrier which constitutes a virtual block is not restricted to cluster information carrier, but may be an image object. In addition, other modes of arrangement of cluster information carriers may be used. Since the direction recognition based on the arrangement of cluster information carriers shown here and the direction recognition using the above-mentioned bit arrangement are mutually independent, these may be used in combination.

As explained above, the digital information carrier concerning this invention is constituted by the parameters which are mutually independent or have very loose mutual dependency, such as the configuration of cluster information carriers, the maximum number of bits which a cluster information carrier can display, the bit arrangement length, size of a virtual block, the arrangement interval of cluster information carriers, the arrangement of cluster information carrier, etc. A digital information carrier which has high flexibility is realized by using such a structure. This is because these elements can be used independently or in combination according to the situation.

First Embodiment

Next, an example of the system for outputting digital information carrier concerning this invention is shown.

Figure 32:
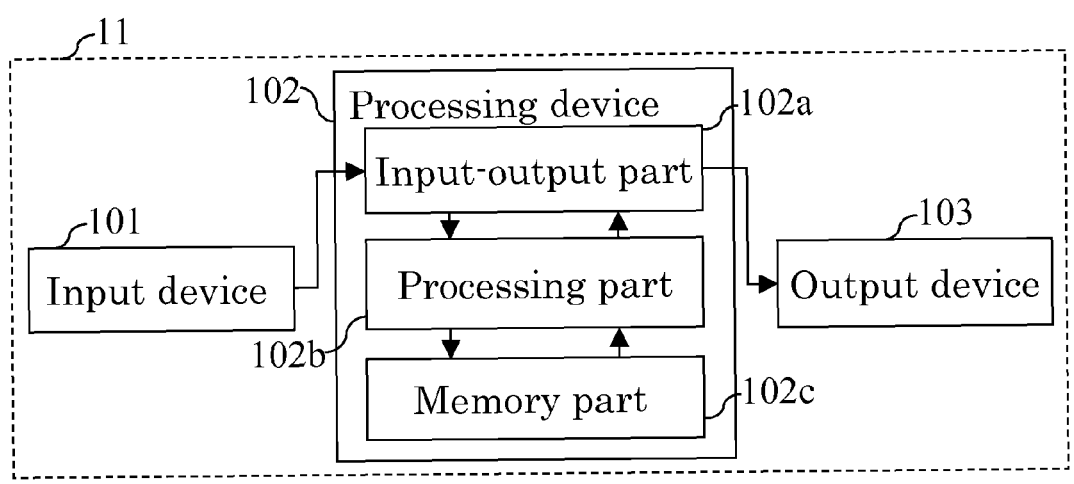
FIG. 32 is a conceptual figure of the digital information carrier generation system 11 concerning this invention.

FIG. 32 is the conceptual figure of the system for displaying digital information carrier concerning this invention.

The digital information carrier generation system 11 is equipped with an input device 101 for inputting the information which the digital information carrier outputted or at last should have, the processing device 102 for generating digital information carrier which has the information inputted into the input device 101 and for performing processing that converts the data format so that the output device 103 can output the digital information carrier, and the output device 103 for outputting the information concerning the digital information carrier based on the converted data. In addition, communication of information to at least one direction is enabled by communication means, such as a communication cable and radio, between each device.

The input device 101 may be a keyboard, a mouse, a microphone, etc. for people to input information, may be a scanner, a camera, etc. for optically reading media, such as paper, on which characters and symbols are displayed, or may be a reading device for reading a magnetic recording medium, an optical recording medium, a semiconductor recording medium, etc. wherein information is recorded in the format other than what human can directly recognize.

The processing device 102 comprises the input/output part 102a for exchanging data with the input device 101 or the output device 103, the memory part 102c which has a memory region for storing data temporarily, and the processing part 102b which handles processing of data. The data inputted from the input device 101 is stored in the memory part 102c through the input/output part 102a, the processing part 102b forms the data concerning the digital information carrier while reading the required data from and writing on the memory part 102c suitably, and it is outputted to the output device 103 through the input/output part 102a.

The output device 103 may be a printing machine, a printer, etc. for displaying the digital information carrier on a paper-like medium, may be a liquid-crystal-display element, CRT, etc. for variably displaying the digital information carrier, or may be a write-in device for writing information on storage media, such as a magnetic recording medium, an optical recording medium, a semiconductor recording medium, etc., in the format other than what human can directly recognize.

In addition, although FIG. 32 was explained as a digital information carrier generation system wherein the input device 101, the processing device 102, and the output device 103 are independent of each other, some of them may be unified physically. Moreover, each device may be connected to networks, such as the Internet.

Figure 33:
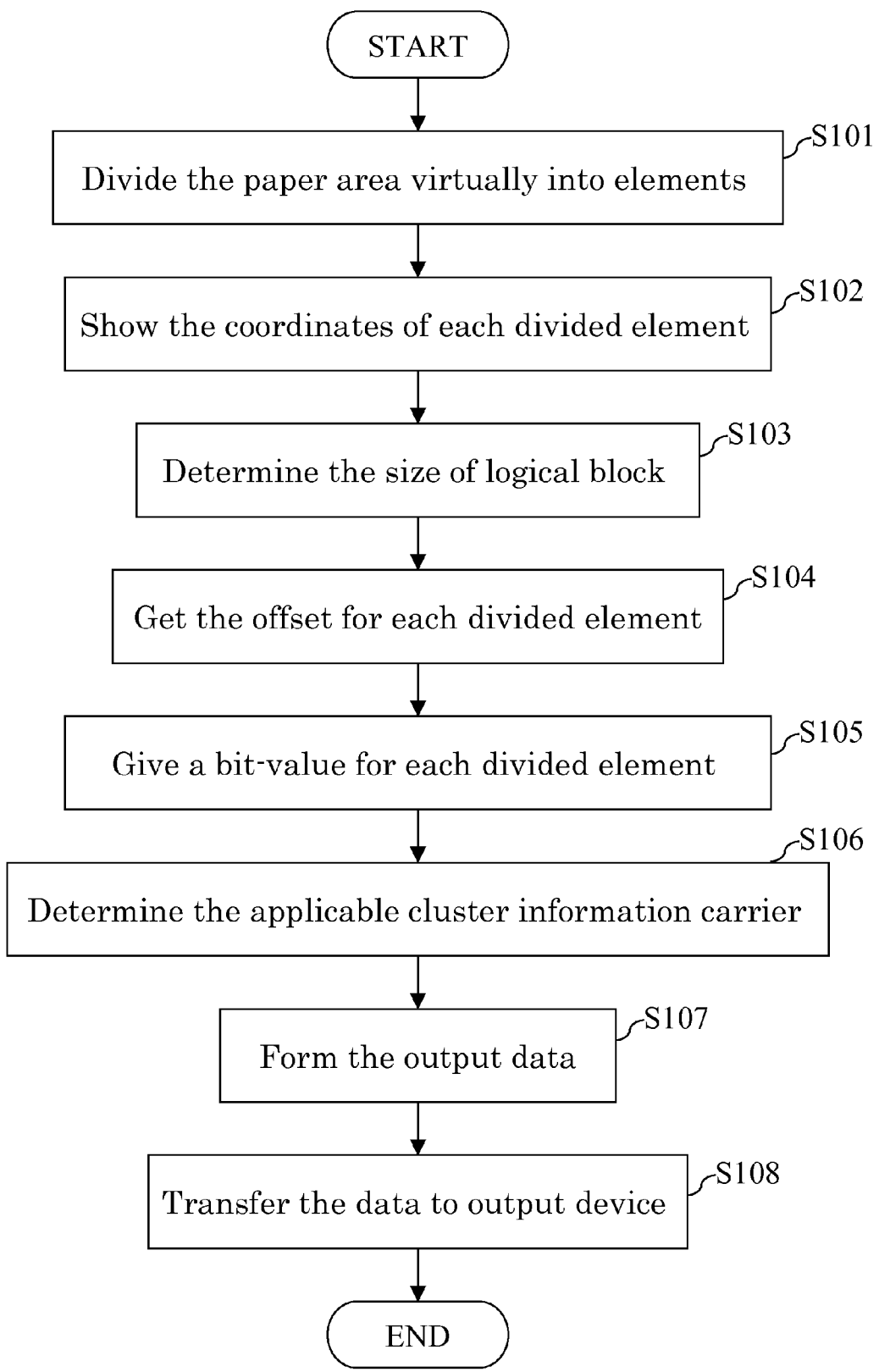
FIG. 33 is a flowchart conceptually showing an example of operation of the digital information carrier generation system 11.

Next, an example of operation of the digital information carrier generation system 11 is explained based on FIG. 33 and FIG. 34.

FIG. 33 is the flow chart conceptually showing an example of operation of the digital information carrier generation system 11.

FIG. 34 is the conceptual figure for explaining operation of the digital information carrier generation system 11.

Hereafter, as shown in FIG. 34 (a), explanation is given using as an example the process for virtually dividing the surface of the paper-like medium 111 into 25 regions of five rows and five columns and generating the carrier wherein the digital information carrier which has the coordinate information of the paper-like medium 111 is displayed on the paper-like medium 112 using the digital information carrier generation system 11.

To simplify, the surface of the paper-like medium 111 is virtually divided into 25 regions of five rows and five columns (Step S101). In the case currently examined, the simple bit arrangement shown in FIG. 4 can be used. As a group of X coordinate value and Y coordinate value, the coordinates of each element (it may also be called a cell or a block) can be defined as shown in FIG. 34 (a) (Step S102). In addition, it should be noted that the logical block including the bit value which continues directly from the coordinate information shown in FIG. 34 (a) cannot be formed.

Next, the argument is proceeded using the logical block of two rows and two columns as the simplest logical block that can be though of. The main scan is to the right using the upper left end as the starting point, and the direction of the sub-scan is downward (Step S103). From the coordinate information on FIG. 34 (a), the target digital information carrier can be generated as follows.

The X coordinate value (data) can be coded as shown in FIG. 34 (b). The first 5 bit values, that is, 0, 1, 2, 3, and 4, of the offset value shown in FIG. 4 is used for the first row. The 2nd row uses the bit values from 2 to 6, and the 3rd row uses the bit values from 4 to 8. It is the same for each of the following rows (Step S104).

It should be noted that only 13 (bit value 0-12) is required as the bit arrangement length in spite of having 25 elements (cells). Since the required bit arrangement length is 13, a bit arrangement having the arrangement length of 15 as shown in FIG. 4 can be used safely.

Next, an actual bit value is applied to each element. The bit arrangement correlating to the offset value of FIG. 4 is read and those values are made to correlate to each element. For example, since the offset value of row zero and column zero is 0, the bit arrangement is 0001 and each value is applied to row zero and column zero, row zero and column one, row zero and column two, and row zero and column three. Since the offset value of row zero and column one is 1, the bit arrangement is 0011 and each value is applied to row zero and column one, row zero and column two, row zero and column three, and row zero and column four. Since the offset value of row zero and column two is 2, the bit arrangement is 0111 and each value is applied to row zero and column two, row zero and column three, and row zero and column four, but it is not necessary to apply the last 1 anywhere. Hereafter, a bit value is similarly applied to each line and each column. FIG. 34 (c) was obtained this way (Step S105).

Y coordinate value (data) is carried out similarly and FIG. 34 (d) is obtained correlating to FIG. 34 (b). Subsequently, an actual bit value is applied to each element of FIG. 34 (d), and FIG. 34 (e) is obtained. However, in the case of the Y coordinates, unlike the case where the direction to apply was related to the X coordinates, it is applied in the Y-axis direction. For example, since the offset value of the row zero and column zero is 0, the bit arrangement is 0001 and each value is applied to row zero and column zero, row one and column zero, row two and column zero, and row three and column zero (although the steps concerning the Y coordinates are not specifically shown, they are the same as Steps S104 and S105 for the X coordinates).

Here, by combining the X coordinate and the Y coordinate values, FIG. 34 (f) is obtained. This can be easily obtained by combining FIG. 34 (b) and FIG. 34 (d). In addition, it should be noted that FIG. 34 (f) was not obtained by coding directly the coordinate value of each element of FIG. 34 (a). For any block of 2×2 in FIG. 34 (f), four consecutive X bit values and four consecutive Y bit values are surely included there.

If FIG. 34 (f) is expressed with an actual bit value, FIG. 34 (g) can be obtained from FIG. 34 (c) and FIG. 34 (e). Therefore, as the next operation, the bit value of this FIG. 34 (g) will be expressed on a paper-like medium using cluster information carrier.

Here, the use of a cluster information carrier which has 2-bit information is considered. Those shown in FIG. 13, FIG. 14, FIG. 15, FIG. 22, and FIG. 23 can be used as a cluster information carrier which has 2-bit information. It is good to adopt the configuration shown in FIG. 11 in the case being examined now using cluster information carrier shown in FIG. 10 (Step S106).

Naturally, the bit value expressed by each cluster information carrier must be the same as FIG. 34 (g). For example, the cluster information carrier at the upper left of FIG. 34 (g) are 0, 0, and this means X=0, Y=0. Then, when the cluster information carrier correlating to X=0, Y=0 is called for, in FIG. 10, the one on the leftmost-hand side can be found. Therefore, this cluster information carrier is printed to the element at the upper left of the paper-like medium. Hereafter, the cluster information carrier correlating to the bit value of each element is determined similarly, and the data for output is formed (Step S107). This data for output is once stored in the memory part 102c of the processing device 102, is outputted to the output device 103 through the input/output part 102a, and is printed. FIG. 34 (h) shows the typical appearance of the printout. The paper-like medium 112 will have digital information carrier this way. In addition, the cluster information carrier correlating to the bit value of each element may be constituted so that the cluster information carrier shown in FIG. 10 is stored on the memory part 102c of the processing device 102 and it can be automatically found by the processing part 102b.

About decoding, it is as follows.

An arbitrary 2×2 block is selected on the paper-like medium on which digital information carrier is printed. The cluster information carrier written in each block (element) is read, and the bit arrangement is generated according to FIG. 10. The bit arrangement can be obtained for the X and the Y coordinates, respectively. For example, it is 1110 for the X coordinate, and it is 1101 for the Y coordinate. However, for the X coordinate, it is read in the order of the upper left, the upper right, the lower left, and the lower right, and for the Y coordinate, it is read in the order of the upper left, the lower left, the upper right, and the lower right.

The obtained bit arrangement is compared with the reference bit arrangement of FIG. 4. to find the portion in agreement. For example, for the X coordinate value, since it is 1110, the offset value 4 is acquired from the reference bit arrangement of FIG. 4. This can be determined unambiguously. Similarly, for the Y coordinate value, since it is 1101, the offset value 5 is acquired. Since the offset values are (4, 5), in the original region divided virtually, it can be found that it is (2, 1) using FIG. 34 (a) and FIG. 34 (f). In addition, the method stated in FIG. 30 can be applied to the conversion to FIG. 34 (a) showing the original coordinate value from FIG. 34 (f) showing the coded coordinate value. Positional information can be obtained as mentioned above. In addition, although a 2-bit information arrangement was used as cluster information carrier, cluster information carriers with 1-bit information can also be used naturally.

Second Embodiment

Next, an example of a system which enables recognition of the information included wherein the digital information carrier concerning this invention is displayed is shown.

Figure 35:
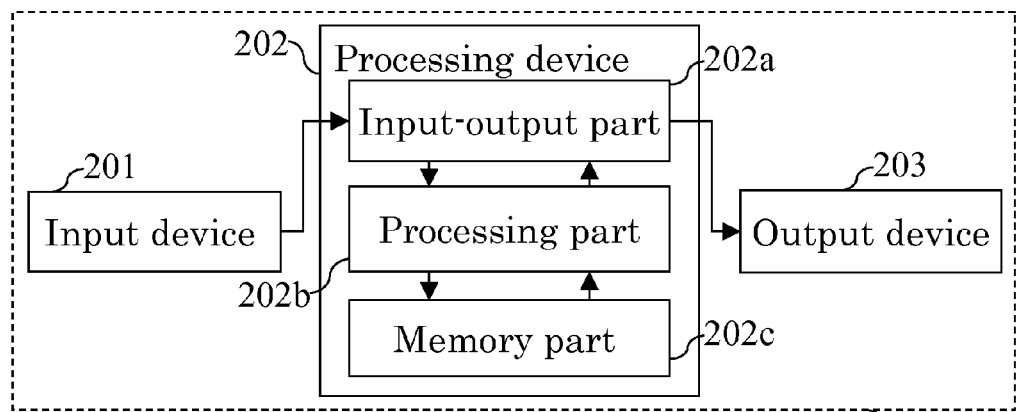
FIG. 35 is a conceptual figure of the digital information carrier decoding system 21 concerning this invention.

FIG. 35 is the conceptual figure of the system for recognizing the information included in the digital information carrier concerning this invention.

The digital information carrier generation system 21 is equipped with the input device 201 for inputting the digital information carrier displayed on the predetermined medium, the processing device 102 for decoding a digital information carrier from an image object inputted into the input device 201 and generating the information which the digital information carrier has, and for performing processing that converts the data format so that the output device 203 can output the information, and the output device 203 for outputting the information which the digital information carrier has based on the converted data. In addition, communication of information in at least one direction is enabled by communication means, such as a communication cable or radio, between each device.

As the input device 201, an optical image input device, such as a scanner, a CCD camera, a CMOS camera, and a photo-coupler, or other display input devices can be used. The following explanation is given by using an image input device as an example.

The processing device 202 comprises the input/output part 202a for exchanging data with the input device 201 or the output device 203, the memory part 202c which has a memory region for storing data temporarily, and the processing part 202b which handles processing of data. The data inputted from the input device 201 is stored in the memory part 202c through the input/output part 202a, the processing part 202b forms the predetermined data while reading the required data from and writing on the memory part 202c suitably, and it is outputted to the output device 203 through the input/output part 202a.

The output device 203 may be a printing machine, a printer, etc. for displaying the digital information carrier on a paper-like medium, may be a liquid-crystal-display element, CRT, etc. for variably displaying the digital information carrier, or may be a write-in device for writing information on storage media, such as a magnetic recording medium, an optical recording medium, a semiconductor recording medium, etc., in the format other than what human can directly recognize.

In addition, although FIG. 35 was explained as a digital information carrier generation system wherein the input device 201, the processing device 202, and the output device 203 are independent of each other, some of them may be unified physically. Moreover, each device may be connected to networks, such as the Internet.

Figures 1, 36:
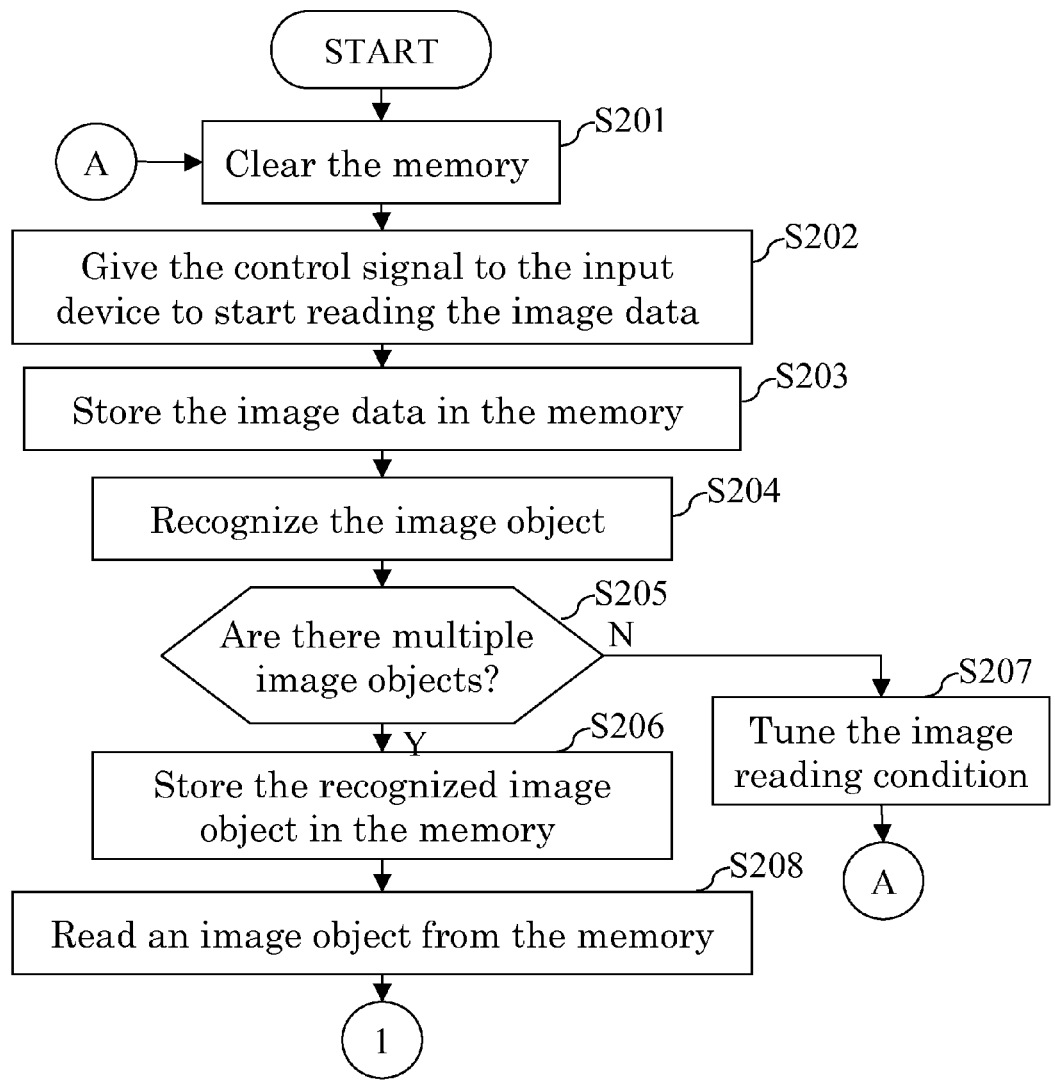
Figures 2, 36:
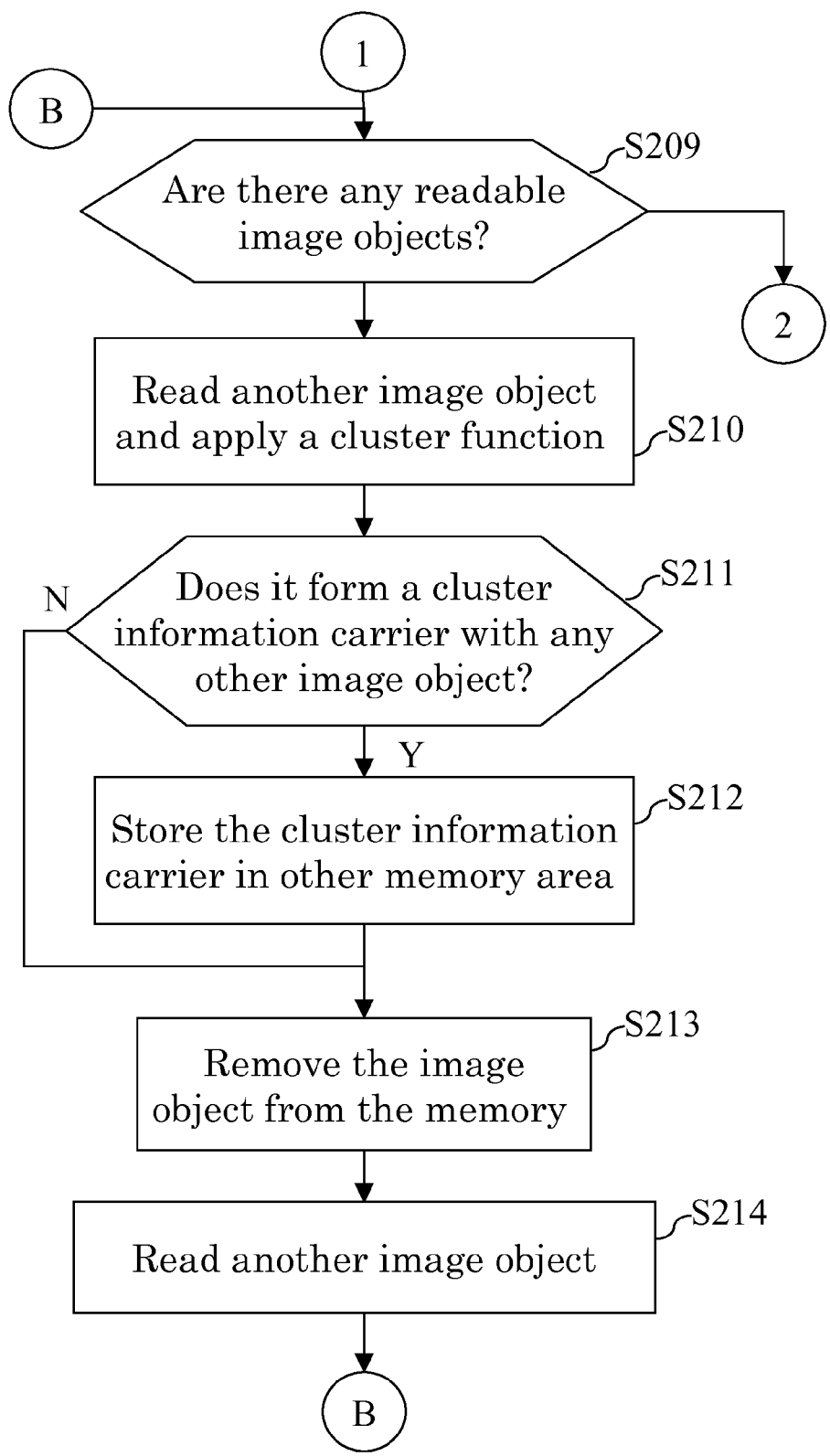
Figures 3, 36:
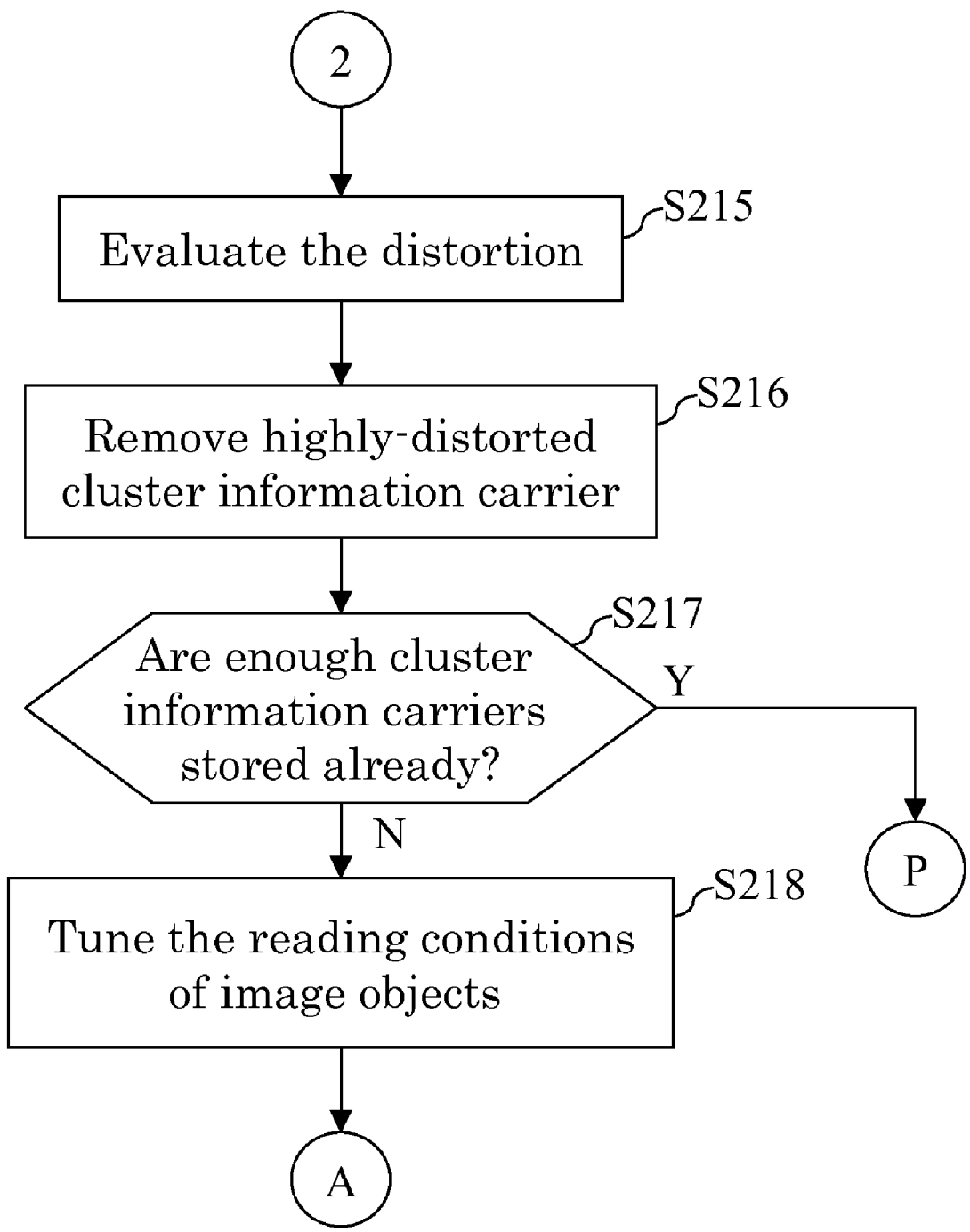

Next, an example of operation of the digital information carrier decoding system 21 is explained based on the flow charts shown in FIG. 36.

FIG. 36 (1)-(3) are the flow charts conceptually showing an example of the first half of operation of the digital information carrier decoding system 21.

First, the predetermined storage area of the memory part 202c with which the processing device 202 is equipped is cleared, and workspace is secured (Step S201).

Next, the control signal for performing image reading is outputted on predetermined image input conditions to the input device 201 (Step S202). The input device 201 into which this control signal was inputted reads an image, and outputs it to the processing device 202 as image data.

After this image data is stored in the predetermined storage area of the memory part 202c with which the processing device 202 is equipped (Step S203), the recognition processing as an image object is performed (Step S204).

When judgment is performed at Step S205 on whether a plurality of image objects have been recognized and when it is judged that a plurality of image objects were recognized, a number is assigned to each recognized image object so that it can be distinguished from others, these are stored with each positional coordinate in the storage area for pooling image object data (Step S206).

Here, in order to store positional coordinate, the information about the coordinate system is needed. When recognition of the information on this coordinate system is possible in the stage of Step S204 for recognizing an image object, this is used, and when the information is not acquired, the coordinate system of image data is used as it is.

On the other hand, when it is judged that a plurality of image objects were not recognized, after adjusting image reading conditions, such as brightness and contrast (Step S207), it is proceeded to Step S201 and the control signal of image reading is outputted again.

Here, it may be control wherein image data is continuously outputted from the input device 201, and the processing device 202 reads as needed through the input part 202a. In such control, Step S202 is unnecessary. In addition, when Step S207 is performed, the image reading condition set by this processing is made so that it is reflected in the next image reading. Moreover, when Step S207 is performed continuously for a predetermined number of times, for example, 10 times, the operator of the system may be notified by an error signal.

Next, the processing for recognizing a cluster information carrier from a plurality of image objects stored in the storage area for pooling image object data.

First, among a plurality of the image objects stored in the storage area for pooling image object data, arbitrary image object is read (Step S208).

Next, a judgment is made whether an image object that can be further read is stored in the storage area for pooling image object data (FIG. 36 (2), Step S209).

When it is judged that there are image objects that can be read at Step S209, those image objects are read from the predetermined storage area of the memory part 202c one by one, and it is judged whether cluster information carrier is constituted. That is, the cluster function is applied (Step S210). An example of the judgment processing is as shown in FIG. 2.

Judgment processing is performed on whether the image objects read at Steps S208 and S210 constitute a cluster information carrier with any of the other image objects (Step S211).

When it is judged that the image object is a constituent element of cluster information carrier at Step S211, the image data of the cluster information carrier to which the image object belongs is stored with the positional coordinate to the storage area for pooling the data of cluster information carrier (Step S212). Then, the image object is deleted from the storage area for pooling the image object (Step S213). The image object read at Step S213 is deleted at this step for preventing the same cluster information carrier from being recognized twice.

Here, in order to store the positional coordinate of cluster information carrier, the information about the coordinate system is needed. This information is used when such recognition is possible in the stage of Step S210 where the cluster function is applied, and the coordinate system of image data is used as it is when it is not obtained. For example, when the information on coordinates is included in the arrangement of cluster information carriers as shown in FIG. 24 or FIG. 31, the information on the coordinate system is acquired by obtaining the center-of-gravity coordinates etc. of the plurality of cluster information carriers.

On the other hand, when it is judged that the image object is not the constituent element of cluster information carrier at Step S211, the image object is deleted from the storage area for pooling image object data (Step S213).

When the image object concerning the processing is a ghost dot, a possibility of being judged to constitute cluster information carrier at Step S211 is low. For this reason, that image object has a high possibility of being eliminated at Step S213 without becoming the constituent element of cluster information carrier.

When the predetermined image object is deleted at Step S213, another image object is read from the predetermined storage area of the memory part 202c (Step S214), and it proceeds to Step S209 to apply the cluster function again.

On the other hand, when it is judged that there is no image data to be read at Step S209, the image object read at Step S208 or S214 is the last image object stored in the storage area for pooling image object data, and since there is only one image object, judgment processing of whether to constitute cluster information carriers cannot be performed.

Thus, it is judged that execution of Step 210 which applies the cluster function is unnecessary, and the display distortion value is evaluated for all cluster information carriers stored in the storage area for pooling the data of cluster information carrier (FIG. 36 (3), Step S215).

Here, as for the evaluation of the display distortion value, it is desirable to use not only the form of the image objects which constitute cluster information carrier but also the relative arrangement of those. It is because a cluster information carrier consists of a plurality of image objects and it has a display area larger than the image object itself which constitutes cluster information carrier, and thus, display distortion is easily measured. In addition, when the relative arrangement of the image objects is included in the judgment conditions (cluster function) for judging whether to constitute cluster information carrier, the relative arrangement concerning the judgment conditions fulfills predetermined conditions. Thus, it can be used as an evaluation result of display distortion by quantifying the sufficiency of the conditions.

In addition, although only display distortion was explained as the object of evaluation here, it is also good to have color difference etc. as the object of evaluation.

As a result of evaluation of the display distortion value in Step S215, cluster information carriers judged that the display distortion value is large and the degree of display distortion is high have a high possibility of generating a numerical bit value that differs from the true numerical bit value in decoding. Thus, such cluster information carriers are deleted from the storage area for pooling the data of cluster information carrier (Step S216), and are not taken as objects of decoding.

Then, judgment processing is performed on whether the number of cluster information carriers stored in the storage area for pooling the data of cluster information carrier has reached the number needed for subsequent processing (Step S217).

When it is judged that the data of cluster information carrier of a predetermined number is stored, it proceeds to Step S231 of the processing shown in FIG. 37 (1) described later.

On the other hand, since the subsequent processing cannot be performed when it is judged that the numbers of data is insufficient, after adjusting image input conditions (Step S218), it proceeds to Step S201. S218 as well as Step S207 may be made so that they support the continuation image input system or they emit an error signal when an unsuitable image is input repeatedly.

Figures 1, 37:
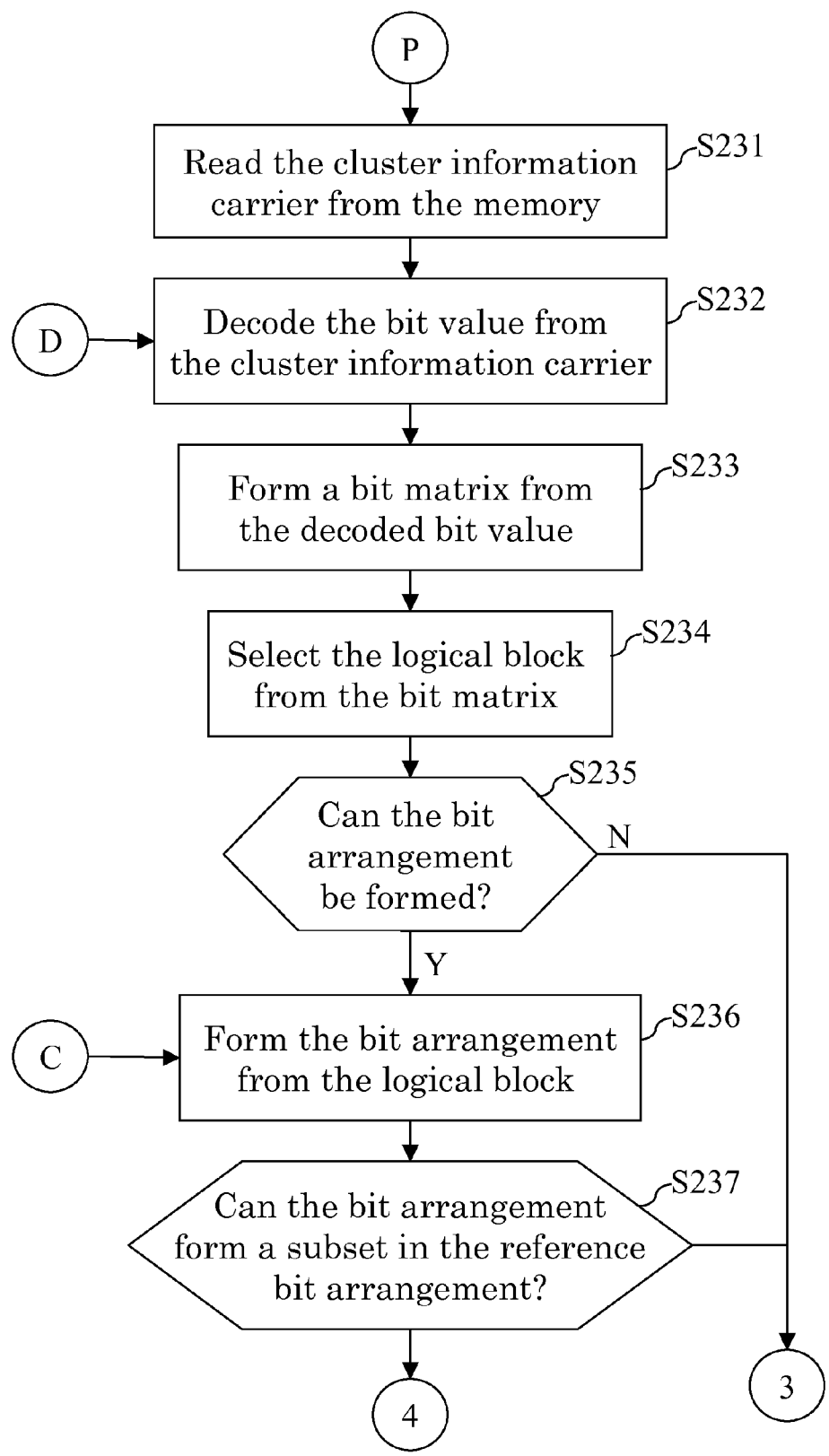
Figures 2, 37:
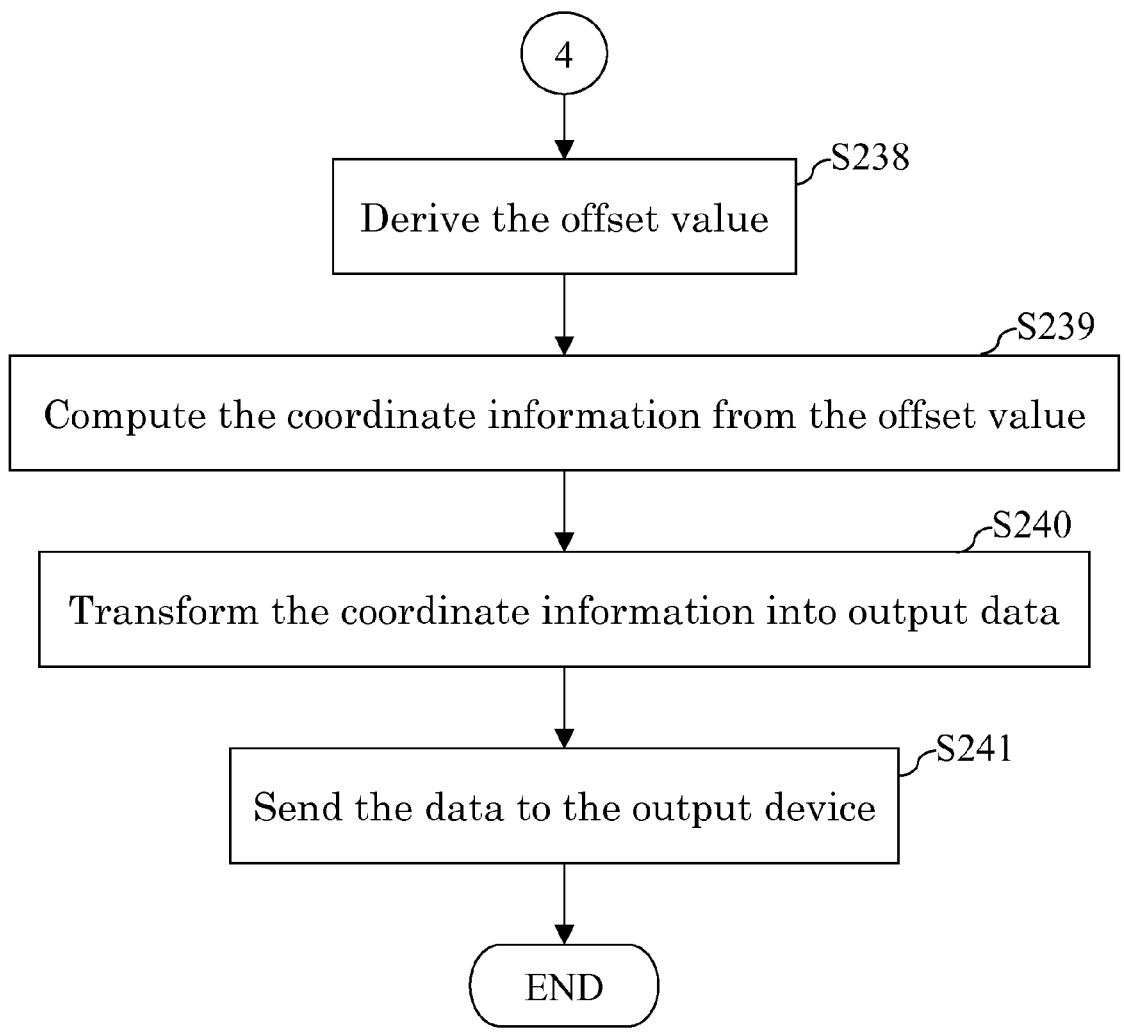
Figures 3, 37:
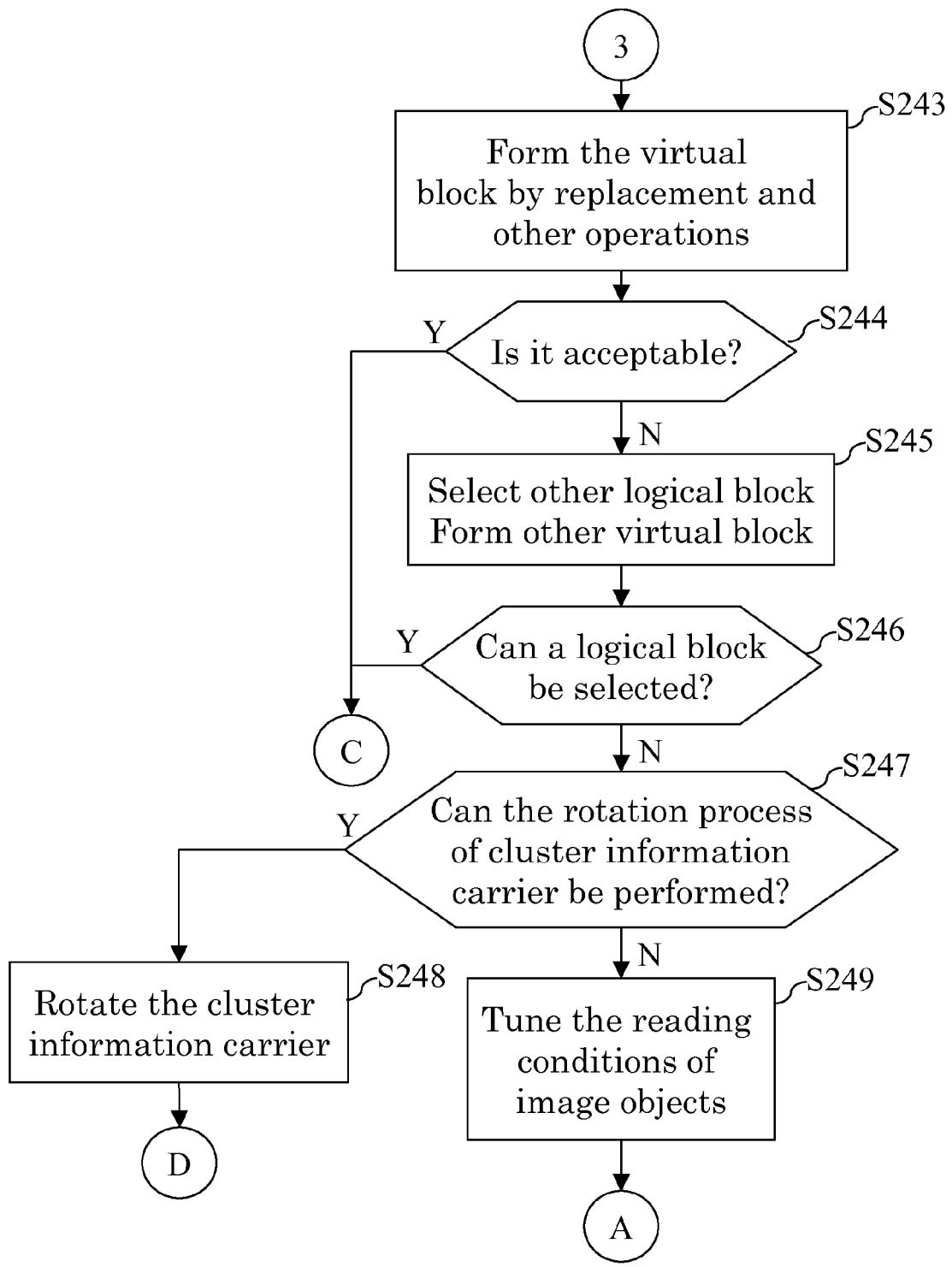

Next, explanation on an example of operation of the digital information carrier decoding system 21 is continued according to FIG. 37.

FIG. 37 is the flow chart conceptually showing an example in the second half of operation of the digital information carrier decoding system 21.

When cluster information carrier of a predetermined number is judged to be stored in a predetermined storage area by the judgment processing shown in Step S217 of FIG. 36 (3), those cluster information carriers are read (Step S231), and each cluster information carrier is decoded (Step S232).

An example of the decoding in Step S232 is shown below. First, the correspondence relationship data concerning the correspondence relationship of the relative relationship of a plurality of image objects which are the constituent elements of cluster information carrier and bit data is beforehand stored in the memory part 202c. At Step S232, the data of one cluster information carrier is read from the storage area for pooling the data of cluster information carrier in the memory part 202c, it is judged which bit data the cluster information carrier correlated to by referring to the correspondence relationship data stored in the memory part 202c, and the bit data obtained as a result of the judgment is considered as the result of decoding. This processing is performed for all cluster information carriers stored in the storage area for pooling the data of cluster information carrier in this processing.

Here, when the information on the coordinate system as digital information carrier is acquired as a result of decoding, the coordinate system is suitably adjusted using the information, and it is decoded again if needed. On the other hand, when the information on the coordinate system is not acquired, the coordinate system of image data is used as it is. As an example from which the information on the coordinate system is acquired in the process of decoding, cluster information carrier as shown in FIG. 1 is mentioned. The information about the X-axis is acquired from the longest principal diameter of the line segment, and the information about the positive X-axis direction is acquired from the relationship of the relative position of the line segment and the dot. When the X-axis direction becomes clear, the Y-axis and its positive direction become clear, too. This way, the information about the coordinate system is acquired.

Next, the bit matrix which consists of the bit numerical values acquired by decoding of each cluster information carrier is formed (Step S233). Arrangement of the matrix elements in this bit matrix is based on the positional coordinate of each cluster information carrier. Specifically, one bit numerical value is arranged in the position of the center of gravity of the correlating cluster information carrier or in the central position defined for every type of cluster information carrier.

About the coordinate system in arrangement of the bit matrix, when the coordinate system as digital information carrier is clear by the processing so far, this coordinate system is used, and when it is not clear, the coordinate system of image data is used.

Here, when the bit numerical value which correlates to some elements of the matrix is not acquired due to problems in image recognition etc., information on this is given to the elements and the matrix is built. This is an expedient processing in construction of subsequent logical block.

Figure 38:
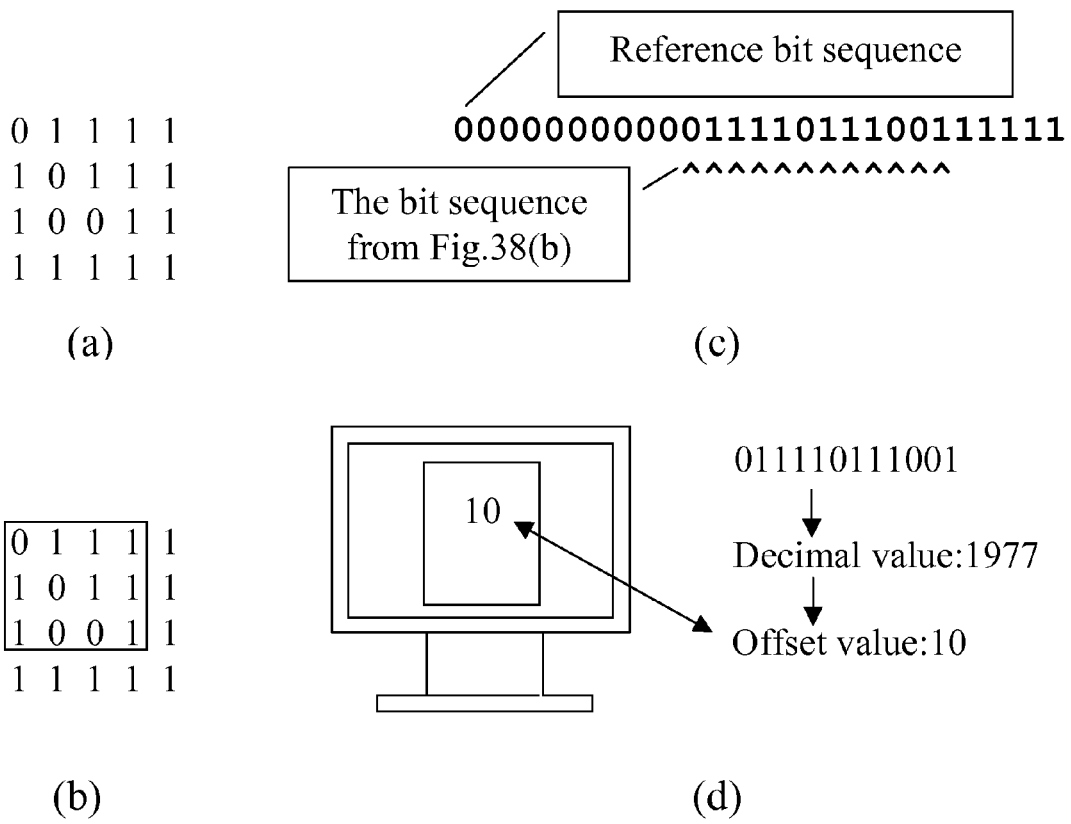
FIG. 38 is a diagram conceptually showing an example of processing concerning the logical block.

An example of the bit matrix obtained by such processing is shown in FIGS. 38 (a) and 39 (a). In addition, in FIG. 39 (a), the matrix elements of which the bit numerical value is not acquired by decoding are shown by "x" which is an error value.

Next, a logical block is selected from a bit matrix (Step S234). Selection of a logical block is performed as follows. First, a matrix element having a high possibility of being most suitable as the starting point of a logical block is selected from the matrix element of the obtained bit matrix. For example, a logical block consists of three rows and four columns, and when the matrix element of the upper left end is the starting point, the matrix element of the upper left end of the obtained bit matrix is selected as the starting point of a logical block. Next, the partial matrix of three rows and four columns is selected using this matrix element as the starting point, and this is considered as a logical block.

Figure 39:
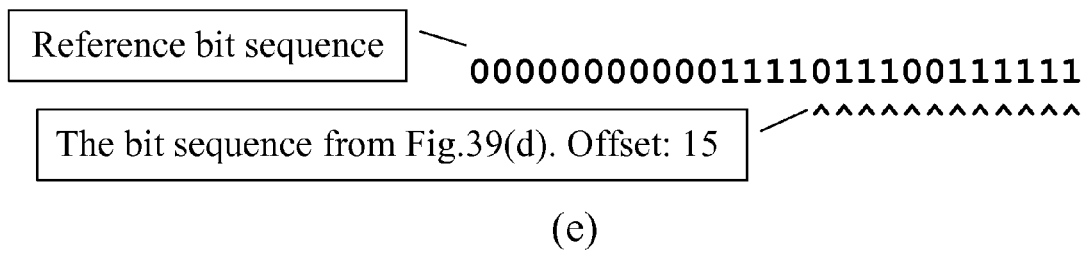
FIG. 39 is a diagram conceptually showing another example of processing concerning the logical block.

The examples wherein the logical block is selected from the bit matrix shown in FIGS. 38 (a) and 39 (a) according to the above-mentioned selection rule are shown in FIG. 38 (b) and FIG. 39 (b), respectively.

Judgment is performed on whether each constituent element of the logical block selected this way is a bit numerical value, and whether it is possible to form the bit arrangement by unifying these bit numerical values (Step S235).

When it is judged that it is possible to form the bit arrangement, the bit arrangement is formed from the bit numerical values included in this logical block (Step S236).

This formation of bit arrangement from the logical block is performed based on the formation rule defined beforehand. For example, when the rule is "appointing the horizontal direction facing the right as the main scanning direction and the horizontal direction facing down as the sub-scanning direction for the bit matrix shown in FIG. 38 (a), and unifying the logical block", the bit arrangement obtained according to this becomes as it is shown in FIG. 38 (c).

Then, judgment is performed on whether the obtained bit arrangement forms the partial arrangement that uses any one element of the reference bit arrangement as the starting point (Step S237). An offset value is calculated when it is judged to form the partial arrangement of the reference bit arrangement (FIG. 37 (2), Step S238). For example, offset is m when the bit arrangement correlates to the partial arrangement which uses the m-th element of the reference bit arrangement as the starting point.

When the offset obtained this way shows the display position of cluster information carrier which serves as a starting point of the logical block in a paper-like medium, positional coordinate can be calculated from the offset value (Step S239). After converting the calculation result into the data format which the output device 203 can process (Step S240), by outputting to the output device 203 (Step S241), predetermined information is extracted from digital information carrier displayed on the paper-like medium, and the result is outputted to the output device 203.

The bit arrangement obtained from FIG. 38 (b) is "011110111001", and this is in agreement with "011110111001" from the 11th of the reference bit arrangement "00000000000111101110011111 . . . " Therefore, the value in the decimal system is 1977 and an offset value becomes "10." The positional information on a paper-like medium is calculated from the numerical value, and it is shown in FIG. 38 (d) using as an example the state where "10" is displayed on the predetermined position on a liquid crystal screen 203a to correlated to a paper-like medium.

In addition, the obtained offset may mean other information, or it may show information without the bit arrangement obtained needing the reference bit arrangement.

Next, processing when the logical block selected at Step S234 cannot form bit arrangement is explained. The case where some elements of a logical block column do not show the bit numerical values is mentioned as the case where the bit arrangement cannot be formed, for example, as shown in FIG. 39 (b).

In such a case, examination is performed on whether a virtual block can be built by replacing the matrix element which does not show the bit numerical value in a logical block with the element of the bit matrix of those, other than the constituent element of the logical block (FIG. 37 (3), Step S243).

An example of replacing a matrix element and building a virtual block is explained in the case where bit arrangement is formed according to the main scanning direction and the sub-scanning direction which were appointed beforehand from the predetermined starting point as mentioned above based on FIG. 39 (b). The bit numerical value of the upper left end of FIG. 39 (b) is regarded as the matrix element of row zero and column zero, and the bit numerical value of the lower right end as the matrix element of row three and column four as related in the explanation.

Since each element is arranged so that the matrix element of row one and column zero wherein the bit numerical value is not defined in FIG. 39 (b) can be replaced with an element outside the logical block adjacent on the right to the matrix element of row zero and column three (namely, the matrix element of row zero and column four), a new logical block can be built as shown in FIG. 39 (c). This is because 5th element in the bit arrangement, obtained by applying the bit arrangement formation rule shown previously, to the new logical block becomes a bit numerical value which forms the matrix element of row zero and column four and it is the same as the bit numerical value which forms the matrix element of row one and column zero, and as a result, the bit arrangement obtained from the logical block after replacement is the same as the bit arrangement before replacement. Since the aggregate of the bit numerical value built this way conceptually differs from the logical block of the conventional matrix arrangement, it is called a virtual block.

In the judgment (Step S244) of whether it is possible to build a virtual block, when the judgment is possible, it proceeds to Step S236, bit arrangement is formed by this built virtual block, and the subsequent processing is also performed. In addition, although it is shown as "the logical block" in Step S236, even if it is the case of a virtual block, the virtual block is built so that the same rule as the bit arrangement formation rule applied to a logical block can be applied.

On the other hand, when it is judged that construction of a virtual block is impossible at Step S244, examination is performed on the re-selection with different starting point of the logical block, and whether the virtual block can be built from the re-selected logical block (Step S245).

Here, an example where re-selection of a logical block is performed in the above-mentioned bit arrangement formation method is explained. Suppose the case where the matrix element of row zero and column four does not have a bit numerical value, as in FIG. 39 (a). In this case, the virtual block which uses as the starting point the matrix element of the row zero and column zero as shown in FIG. 39 (c) cannot be formed, either. Thus, it is examined whether the starting point of a logical block can be moved one by one from row zero and column zero to form a logical block of three rows and four columns. First, since the matrix element of row zero and column four does not have a bit numerical value like the above, the matrix element of a row zero and column one cannot be used as the starting point to build a logical block. Since the matrix element of the row one and column zero does not have the a numerical value itself, a logical block cannot be built either by using this as the starting point. However, the matrix element of the row one and column one can be used as the starting point to build a logical block. Therefore, a bit arrangement is formed based on the logical block using the matrix element of the row one and column one as the starting point. In the example shown in FIG. 39 (d), "011100111111" is obtained as bit arrangement and it is in agreement with "011100111111" from the 16th of the reference bit arrangement "00000000000111101110011111 . . . " Therefore, the value by in decimal system is 1855 and the offset value becomes "15."

This way, in the judgment (Step S246) of whether it is possible to perform selection of a logical block or construction of a virtual block, when it is judged that selection or construction is possible, it proceeds to Step S236, a bit arrangement is formed with the application of the bit arrangement formation rule to this selected logical block or built virtual block, and subsequent processing is also performed.

On the other hand, when it is judged in Step S246 that selection of a logical block etc. is impossible even after the above processing, it is judged whether rotation processing of cluster information carrier is possible (Step S247).

The case where rotation processing of cluster information carrier is impossible is a case where at least one rotation processing was already performed and there is no room to perform rotation processing further.

When it is judged that rotation processing of cluster information carrier is possible at Step S247, rotation processing of cluster information carrier is performed (Step S248). The rotation angle may be 90 degrees or 180 degrees. Then, it proceeds to Step S232 and a bit value is again decoded for the cluster information carrier after rotation processing.

On the other hand, when it is judged that rotation processing of cluster information carrier is impossible in Step S247, image reading conditions are adjusted (Step S249), and it proceeds to Step S201 of FIG. 36 (1). In addition, Step S249 as well as Step S207 may support a continuous image input system, or may emit an error signal when an unsuitable image is input continuously for at least two times.

In addition, judgment processing of the rotation processing possibility for the bit matrix formed by decoding cluster information carrier may be added between Step S246 and Step S247. When it is judged that it is possible to perform rotation processing, it may be made so that predetermined rotation processing is performed to the bit matrix, and it proceeds to Step S234 to perform processing after logical block selection to the bit matrix which is obtained by rotating.

In addition, judgment processing of the rotation processing possibility for a read-in image may be added between Step S247 and Step S249. When it is judged to be possible to perform rotation processing, it may be made so that predetermined rotation processing is performed to the read-in image, and it proceeds to Step S204 to perform processing recognition of an image object to the read-in image which is obtained by rotating.

When the information which can identify the position of a constituent element is coded in the digital information carrier concerned, the information regarding the position of the recognition range can be acquired by recognizing a part of the digital information carrier displayed. For this reason, identification of the position of a display recognition device on a display medium is performed without difficulty. If a display recognition device is attached to a pen and paper is used as a display medium, tracking of the position of the pen which writes letters on paper and display on a computer can also be realized, for example.

In addition, the digital information carrier does not stand out when displayed and can be easily blended with the existing visual information, for example, a character or a photograph, due to the diversity of the display modes. For this reason, when a display recognition device is put closer to a photograph on a printed document, a computer can tie up appropriately the printed document and the information outside the document relevant to this document, such as an explanation of that photograph.

Hence, it will be appreciated that the present invention is not a barcode in any conventional sense of the term "barcode" whatsoever. A barcode could be present on a graphical-object bearing surface according to the present invention, just as any other visually recognizable printed content may underlie the especially patterned graphical objects that are an essential constituent of the invention. Indeed, one of the many possible functions of a graphical-object bearing surface of the present invention is to identify the location on that surface of a given item of visually recognizable printed content.

Nor does an encoding scheme in accordance with the present invention, printed as a computer-oriented digital layer onto a physical surface, define an arrangement of data. Therein the present invention is not some sort of abstract mathematical array or matrix. Therein the present invention is a physical surface that bears graphical objects patterned so as to predetermine groupings thereof that interrelate by a clustering definition. While the clustering definition itself is conceptual, so is any patterning criterion: No pattern recognizable as such to an intelligent man or machine can exist without criteria that establish the patterning arrangement.

The graphical objects constituting the encoding scheme printed on any suitable physical surface bear a relationship with that physical surface: The surface bears the graphical objects. The graphical objects are patterned in a way that has never before existed, in that the unique patterning predetermines special groupings of the graphical objects, and those groupings interrelate according to a clustering definition. The clustering definition establishes clusters of the graphical objects, and in thus establishing clusters of the graphical objects, the special groupings, determined by the way in which the graphical objects are patterned, encode primary information. And that primary information at least identifies the placement of the graphical-object clusters within the entire pattern of said graphical objects on said surface.

Thus, each graphical-object cluster identifies its own position in relation to every other cluster—and thus in relation to graphical-object bearing surface as a whole—without requiring that the data-capturing means that recognizes that cluster be positioned in a fixed location on the surface or otherwise in a location previously identified to the data-capturing means.

As should be abundantly clear from the foregoing explanation and illustrations, the present invention in an essential aspect is a unique physical surface specially conditioned by bearing graphical objects in an unprecedented manner of patterning, and not only is that patterning is independent of conventional barcodes, but may even overlie conventional barcodes.

The paper entitled, "Print-Based Interfaces with Direct Point-and-Click Functionality," *Proceedings of the Eighth International Conference on Humans and Computers*, Aizu-Wakamatsu, Aug. 31-Sep. 2, 2005, pages 128-135, by the inventors of the present invention is hereby incorporated by reference in its entirety.

The paper entitled, "Surface Code Readers for Image-Based Human-Computer Interfaces," *Proceedings of the Eleventh International Conference on Humans and Computers*, Research Institute of Electronics, Shizuoka University, Nov. 20-23, 2008, pages 57-62, by K. Kanev (one of the inventors of the present invention) et al. is hereby incorporated by reference in its entirety.

What is claimed is:

1. A physical surface bearing graphical objects recognizable by digital information capturing means and patterned so as to predetermine groupings of said graphical objects that interrelate by a clustering definition establishing clusters of said graphical objects, and that thereby encode primary information at least identifying the orientation of the clusters of said graphical objects within the entire pattern of said graphical objects on said surface; said primary information therein identifying coordinate axes for a directed arrangement of the clusters of said graphical objects, in a lattice whose vertical interval differs from its horizontal interval.

2. A graphical-object bearing surface as set forth in claim 1, wherein said graphical objects are patterned so as further to predetermine at least one interrelationship that does not encode said primary information.

3. A graphical-object bearing surface as set forth in claim 1, wherein said graphical objects are patterned in a manner such that the predetermined groupings each include at least one graphical object in common.

4. A graphical-object bearing surface as set forth in claim 1, wherein said graphical objects are patterned so as further to predetermine an arrangement of said graphical-object clusters relative to each other that encodes secondary information different from the primary information.

* * * * *